US012479711B2

(12) United States Patent
Sato et al.

(10) Patent No.: US 12,479,711 B2
(45) Date of Patent: Nov. 25, 2025

(54) CAPPING HEAD BODY, CAPPING HEAD, SPINDLE ASSEMBLY, CAPPING DEVICE, AND CAPPING SYSTEM

(71) Applicants: AMTS Co., Ltd., Gotemba (JP); ALTEMIRA Can Co., Ltd., Tokyo (JP)

(72) Inventors: Takafumi Sato, Yokohama (JP); Eiji Yamamoto, Yokohama (JP); Hideyasu Muto, Yokohama (JP)

(73) Assignees: AMTS Co., Ltd., Gotemba (JP); ALTEMIRA Can Co., Ltd., Tokyo (JP)

( * ) Notice: Subject to any disclaimer, the term of this patent is extended or adjusted under 35 U.S.C. 154(b) by 0 days.

(21) Appl. No.: 18/863,933

(22) PCT Filed: Aug. 25, 2023

(86) PCT No.: PCT/JP2023/030780
§ 371 (c)(1),
(2) Date: Nov. 7, 2024

(87) PCT Pub. No.: WO2024/043338
PCT Pub. Date: Feb. 29, 2024

(65) Prior Publication Data

US 2025/0304419 A1 Oct. 2, 2025

(30) Foreign Application Priority Data

Aug. 26, 2022 (JP) ................................ 2022-134830
Aug. 29, 2022 (JP) ................................ 2022-135769

(51) Int. Cl.
*B67B 3/00* (2006.01)
*B67B 3/20* (2006.01)
*B67C 7/00* (2006.01)

(52) U.S. Cl.
CPC .......... *B67B 3/2066* (2013.01); *B67C 7/0006* (2013.01); *B67C 2007/006* (2013.01); *B67C 2007/0066* (2013.01)

(58) Field of Classification Search
CPC ..... B67B 3/2066; B67B 2201/08; B67B 3/00; B67B 3/14; B67C 7/0006;
(Continued)

(56) References Cited

U.S. PATENT DOCUMENTS 1,560,059 A 11/1925 Johnson
2,078,040 A * 4/1937 Taylor .................. B67C 7/0006 53/302
(Continued)

FOREIGN PATENT DOCUMENTS

JP 34010995 B 12/1959
JP 53137791 A 12/1978
(Continued)

OTHER PUBLICATIONS

Japanese Office Action mailed May 20, 2025 for the corresponding Japanese Patent Application No. 2024-542891; 19 pages including English translation.
(Continued)

*Primary Examiner* — Jacob A Smith
(74) *Attorney, Agent, or Firm* — Leason Ellis LLP; Melvin C. Garner; Mitsuhiro Haraguchi

(57) ABSTRACT

The capping head body is a body of a capping head used for the capping head that attaches a cap having a topped cylindrical shape to a mouthpiece portion of a can having a bottomed cylindrical shape, the capping head body including: a body main portion having a cylindrical shape; a spindle attachment portion disposed inside the body main portion and attached to a spindle; and a swing shaft housing portion disposed between an outer peripheral portion and an
(Continued)

inner peripheral portion of the body main portion, in which the swing shaft housing portion is disposed around a periphery of the spindle attachment portion, and has a through-hole into which a swing shaft that swings a forming roller toward a peripheral wall of the cap is inserted, and the through-hole penetrates the body main portion in an up-down direction.

19 Claims, 18 Drawing Sheets

(58) Field of Classification Search
CPC ...... B67C 2007/006; B67C 2007/0066; B67C 7/00; B67C 2003/226
USPC .................. 53/283, 302, 308, 314, 315, 317
See application file for complete search history.

(56) References Cited

U.S. PATENT DOCUMENTS 2,108,932 A 2/1938 Segebaden et al.
4,086,747 A * 5/1978 Gorton ...................... B67B 3/18 53/340
5,157,897 A * 10/1992 McKee ................. B67B 3/2033 53/308
11,186,472 B2 * 11/2021 Cutaio ...................... B67B 3/14
2019/0330038 A1 * 10/2019 Melrose ................ B65B 7/2835

FOREIGN PATENT DOCUMENTS

JP 63021296 A 2/1988
JP 06156585 A 6/1994
JP 2003146392 A 5/2003
JP 2005096842 A 4/2005
JP 2005212904 A 8/2005
JP 2007015727 A 1/2007
JP 2008013210 A 1/2008

OTHER PUBLICATIONS

International Search Report mailed Nov. 14, 2023 for the corresponding PCT International Patent Application No. PCT/JP2023/030780 (4 pages including English translation).

* cited by examiner

CAPPING HEAD BODY, CAPPING HEAD, SPINDLE ASSEMBLY, CAPPING DEVICE, AND CAPPING SYSTEM

CROSS-REFERENCE TO RELATED PATENT APPLICATIONS

This application is a U.S. National Phase Application under 35 U.S.C. § 371 of International Patent Application No. PCT/JP2023/030780 filed on Aug. 25, 2023, which claims the benefit of priority to Japanese Patent Application No. 2022-134830, filed on Aug. 26, 2022 and Japanese Patent Application No. 2022-135769, filed on Aug. 29, 2022, the contents of all of which are incorporated herein by reference in their entireties. The International Application was published in Japanese on Feb. 29, 2024 as International Publication No. WO/2024/043338 under PCT Article 21(2).

FIELD OF THE INVENTION

The present invention relates to a capping head body, a capping head, a spindle assembly, a capping device, and a capping system.

BACKGROUND OF THE INVENTION

In the related art, a capping head that attaches a cap to a mouthpiece portion of a threaded can filled with a content such as a beverage is known (for example, Patent Document 1).

The capping head of Japanese Unexamined Patent Application, First Publication No. H06-156585 includes a body, a cam follower disposed on an upper side of the body, a forming roller disposed on a lower side of the body, a swing shaft that connects the cam follower and the forming roller, and a biasing member that biases the cam follower and the forming roller toward a radially inner side via the swing shaft. An intermediate portion located between both end portions of the swing shaft in an up-down direction and a biasing member provided in the intermediate portion are disposed on an outer peripheral portion of the body and exposed from the body to a radially outer side.

CITATION LIST

Patent Document

Patent Document 1: Japanese Unexamined Patent Application, First Publication No. H06-156585

Technical Problem

In the capping head in the related art, the body has a complicated shape, and it is difficult to increase the strength of the body. In addition, in order to ensure the strength of the body, it is necessary to use a material having high rigidity, such as stainless steel, which resulted in an increase in weight.

An object of the present invention is to provide a capping head body, a capping head, a spindle assembly, a capping device, and a capping system, in which a shape of the body can be simplified, a strength of the body can be increased, and weight reduction can be achieved.

SUMMARY OF THE INVENTION

Solution to Problem

Aspect 1 of Present Invention

A capping head body used for a capping head that attaches a cap to a mouthpiece portion of a can having a bottomed cylindrical shape, the capping head body including: a body main portion having a cylindrical shape; a spindle attachment portion disposed inside the body main portion and attached to a spindle; and a swing shaft housing portion disposed between an outer peripheral portion and an inner peripheral portion of the body main portion, in which the swing shaft housing portion is disposed around a periphery of the spindle attachment portion, and has a through-hole into which a swing shaft that swings a forming roller toward a peripheral wall of the cap is inserted, and the through-hole penetrates the body main portion in an up-down direction.

Aspect 2 of Present Invention

A capping head that attaches a cap having a topped cylindrical shape to a mouthpiece portion of a can having a bottomed cylindrical shape, the capping head including: the capping head body according to Aspect 1; a forming roller disposed on a lower side of the body; and a swing shaft configured to swing the forming roller toward a peripheral wall of the cap, in which the body main portion, the spindle attachment portion, and the swing shaft housing portion are connected to each other.

Aspect 3 of Present Invention

The capping head according to Aspect 2, further including: a cam follower disposed on an upper side of the body and configured to engage with a cam; and a biasing member configured to bias the cam follower and the forming roller toward a radially inner side via the swing shaft, in which the biasing member surrounds a part of the swing shaft in an up-down direction around an axis of the swing shaft, and is accommodated in the through-hole.

In the present invention, the body main portion has a cylindrical shape, and the outer shape of the body is simply configured. In addition, the body is provided with the through-hole that penetrates the body in the up-down direction, and the swing shaft that swings the forming roller is inserted into the through-hole. In addition, the swing shaft housing portion in which the through-hole is provided is disposed around the periphery of the spindle attachment portion. Since the capping head body according to the present invention has a simple configuration including the body main portion having a cylindrical shape, the spindle attachment portion mounted on a spindle, and the swing shaft housing portion in which the through-hole is disposed, the shape of the body is prevented from being complicated, and the structure of the body is simplified while the rigidity of the body is increased. In particular, when the body main portion, the spindle attachment portion, and the swing shaft housing portion are connected to each other, the above-described operations and effects are further enhanced.

In addition, the cam follower and the forming roller are connected to both end portions of the swing shaft in the up-down direction, and an intermediate portion of the swing shaft located between the both end portions in the up-down direction and a biasing member fitted over the intermediate portion are accommodated in the through-hole of the body.

The biasing member is provided to surround a part (intermediate portion) of the swing shaft around its axis and is accommodated in the through-hole.

According to the present invention, since the configuration is adopted in which a part (intermediate portion) of the swing shaft and the biasing member (hereinafter, referred to as the biasing member or the like) are accommodated inside the body, a notch-shaped recess portion or the like, such as in the related art, which is provided to dispose the biasing member or the like in an exposed state on the outer peripheral portion of the body is not necessary. Therefore, in the present invention, it is possible to configure the body in a simple shape, and is easy to manufacture. In addition, the strength of the body can be increased by simplifying the shape of the body.

Further, by accommodating the biasing member or the like in the body, it is possible to suppress the adhesion of a content (particularly a content with sugar content that easily solidifies) of the beverage or the like scattered from the outside of the body to the biasing member and the like. Therefore, the performance (function) of the biasing member and the like can be well maintained for a long period of time, and the maintainability is also good.

In addition, as the rigidity of the body is increased, it is possible to form the body from a material having a lower specific gravity compared to stainless steel or the like, which has been used to form the body in the related art, such as an aluminum alloy, for example, duralumin, an engineering plastic, and a resin material (including a composite resin material), such as a fiber reinforced plastic (FRP), and the like. Therefore, it is easy to achieve weight reduction of the capping head. A preferred example of an engineering plastic includes polyether ether ketone (PEEK).

As described above, with the capping head body and the capping head, and the spindle assembly and the capping device including the capping head body and the capping head according to the present invention, the shape of the body can be simplified, the strength of the body can be increased, and the weight reduction of the body can be achieved.

Aspect 4 of Present Invention

The capping head according to Aspect 3, in which the biasing member is accommodated in the through-hole without being entirely exposed to an outer peripheral portion of the body main portion.

In this case, the above-described operations and effects obtained by accommodating the biasing member in the through-hole is more remarkable.

Aspect 5 of Present Invention

The capping head according to Aspect 3 or 4, in which a plurality of the through-holes are provided at intervals from each other in the circumferential direction, each of the through-holes has an opening portion that is open to an upper end surface of the body main portion, and a dimension of the opening portion along the circumferential direction is reduced toward the radially inner side.

Aspect 6 of Present Invention

The capping head according to Aspect 5, in which the opening portion has a triangular hole shape when seen from above.

In this case, the circumferential dimension (that is, the thickness dimension) of the portion (hereinafter, referred to as the frame) of the swing shaft housing portion, which is located between the through-holes adjacent to each other in the circumferential direction, is less likely to vary at each position in the radial direction, and the strength of the frame is stably increased. Therefore, it is possible to ensure the strength of the body while keeping the intervals between the through-holes arranged in the circumferential direction small. It is possible to achieve further compactness and weight reduction of the capping head.

Aspect 7 of Present Invention

The capping head according to Aspect 5 or 6, in which the body has a body recess portion depressed downward from an upper surface of the body and configured to accommodate at least a lower end portion of the cam, and a radially inner end portion of the opening portion is open to an inner peripheral surface of the body recess portion.

In this case, by inserting at least the lower end portion of the cam into the body recess portion that is open to the upper surface of the body, the cam and the body can be disposed closer to each other in the up-down direction. As a result, the dimensions of the body in the up-down direction can be reduced, and the compactness and weight reduction can be achieved. Further, the opening portion of the through-hole reaches the inner peripheral surface of the body recess portion, and the opening portion is formed large. Therefore, further weight reduction of the body can be achieved by the opening portion.

Aspect 8 of Present Invention

The capping head according to any one of Aspects 3 to 7, in which the body has the body main portion, and a body flange having an annular shape fixed to an upper end portion of the body main portion, the through-hole has a main body hole portion configured to penetrate the body main portion in the up-down direction, and a flange hole portion configured to penetrate the body flange in the up-down direction, and the biasing member is disposed in the main body hole portion.

In this case, by disposing the biasing member in the main body hole portion and fixing the body flange to the upper end portion of the body main portion, the biasing member can be easily accommodated inside the body. The capping head is easy to manufacture.

Aspect 9 of Present Invention

The capping head according to Aspect 8, in which the main body hole portion has an accommodation hole portion in which the biasing member is disposed, and a bearing hole portion disposed at a lower end portion of the main body hole portion, and the swing shaft is rotatably supported by the body via a pair of bearing members that are provided in the flange hole portion and the bearing hole portion.

In this case, the swing shaft is stably supported by the pair of bearing members that are provided in the flange hole portion disposed at the upper end portion of the body and the bearing hole portion disposed at the lower end portion of the body and that are disposed away from each other in the up-down direction.

Aspect 10 of Present Invention

The capping head according to Aspect 8 or 9, in which the biasing member is a torsion coil spring extending spirally around an axis of the swing shaft, and the biasing member has both end portions in the up-down direction with an upper end portion being locked to the body flange and a lower end portion being locked to the swing shaft.

With the configuration described above, by locking the upper end portion of the biasing member to the body flange, and locking the lower end portion to the swing shaft, the biasing member can be easily assembled inside the body while applying a desired biasing force.

Aspect 11 of Present Invention

The capping head according to any one of Aspects 2 to 10, in which at least a part of the body is made of any one of an aluminum alloy, an engineering plastic, or an FRP.

In this case, it is possible to achieve weight reduction of the body as compared to the body made of stainless steel or the like in the related art while ensuring the rigidity of the body.

Aspect 12 of Present Invention

The capping head according to any one of Aspects 2 to 11, further including: a pressure block disposed on the lower side of the body and configured to press a top wall of the cap.

Aspect 13 of Present Invention

The capping head according to any one of Aspects 2 to 12, in which six or more forming rollers are provided and arranged in the circumferential direction, a plurality of the forming rollers include a plurality of thread forming rollers configured to form a thread portion to be threaded with the mouthpiece portion on a peripheral wall of the cap, and at least one tuck under forming roller configured to tuck under forming a lower end of the peripheral wall of the cap onto the mouthpiece portion, and the number of the thread forming rollers is larger than the number of the tuck under forming rollers.

As in the above-described configuration, in a case in which the number of thread forming rollers is large, the forming load (pressing force) per thread forming roller can be reduced. Therefore, even in a case in which the thickness of the threaded can (can) is reduced, the deformation of the mouthpiece portion due to the thread forming processing can be more stably suppressed.

Aspect 14 of Present Invention

The capping head according to Aspect 13, in which positions of the thread forming rollers adjacent to each other in the circumferential direction are displaced from each other in the up-down direction.

In this case, the forming portions of the thread forming rollers adjacent to each other in the circumferential direction with respect to the peripheral wall of the cap are displaced from each other in the up-down direction, so that a problem of an excessively large thread forming amount at the same portion (particularly in the vicinity of an upper groove, which is a thread start position) of the peripheral wall of the cap can be suppressed. Variations in the thread forming amount at each position in the up-down direction is suppressed, and the thread forming amount is equalized in the up-down direction.

In addition, since the adjacent thread forming rollers are disposed to be displaced in the up-down direction, these thread forming rollers can be disposed closer to each other without causing interference. As a result, the outer diameter dimension of the capping head can be reduced, and further compactness and weight reduction can be achieved.

Aspect 15 of Present Invention

The capping head according to any one of Aspects 3 to 14, in which a plurality of the forming rollers are provided and arranged in the circumferential direction, a plurality of the biasing members are provided in the same number as the number of the forming rollers and are arranged in the circumferential direction, and a plurality of the through-holes are provided in the same number as the number of the biasing members and are arranged in the circumferential direction.

In this case, each biasing member can be accommodated in each through-hole. That is, one biasing member can be disposed in one through-hole. Therefore, the through-hole can be simply configured, and the body is more easily manufactured and the rigidity is further increased.

Aspect 16 of Present Invention

The capping head according to any one of Aspects 3 to 15, in which the swing shaft has a support shaft extending in the up-down direction, an upper arm configured to connect the support shaft and the cam follower, and a lower arm configured to connect the support shaft and the forming roller, the upper arm has an upper clamp portion configured to surround the support shaft around its axis and being deformable to press an outer peripheral surface of the support shaft, the lower arm has a lower clamp portion configured to surround the support shaft around its axis and being deformable to press the outer peripheral surface of the support shaft, and at least one of the upper clamp portion or the lower clamp portion has a deformation assist groove disposed on a clamp portion peripheral surface and extending in the up-down direction.

In this case, by providing the deformation assist groove extending in the up-down direction on the peripheral surface (clamp portion peripheral surface) of the upper clamp portion or the lower clamp portion (hereinafter, may be simply referred to as a clamp portion), the clamp portion is easily deformed in a direction of pressing the outer peripheral surface of the support shaft. As a result, the outer diameter dimension (diameter dimension) of the support shaft can be reduced (that is, the support shaft can be made thinner), and accordingly, the outer diameter dimension of the entire capping head can also be reduced, so that further weight reduction can be achieved.

Aspect 17 of Present Invention

A spindle assembly including: the capping head according to any one of Aspects 2 to 16; an elevation shaft extending in the up-down direction and to which a pressure block configured to press a top wall of the cap is attached; a spindle having a cylindrical shape, into which the elevation shaft is inserted, and to which the body is attached; and an elevation cylinder having a cylindrical shape and into which the elevation shaft and the spindle are inserted, wherein the elevation shaft has an upper cam follower configured to move the elevation shaft in the up-down direction, the spindle has a spindle gear configured to rotate the spindle around a center axis, and the elevation cylinder has a cam having a cylindrical shape, and a lower cam follower configured to move the elevation cylinder in the up-down direction.

Aspect 18 of Present Invention

A capping device including: a turret configured to rotate around a turret axis; the spindle assembly according to Aspect 17 disposed on an outer peripheral portion of the turret; a fixed gear configured to mesh with the spindle gear and extending around the turret axis; an upper cam extending around the turret axis and with which the upper cam follower engages; and a lower cam extending around the turret axis and with which the lower cam follower engages.

Aspect 19 of Present Invention

A capping system including: a filler configured to fill a can with a content; and the capping device according to Aspect 18 to which the can discharged from the filler is supplied, in which a transport direction of the can discharged from the filler and directed toward the capping device extends along a tangent of the outer peripheral portion of the turret when seen in a turret axis direction.

With the capping system according to the present invention, the can discharged from the filler is smoothly supplied to the capping device without rapidly changing the transport direction, that is, without being easily affected by a centrifugal force. Therefore, the processing speed of the capping can be stably increased, and thus the production efficiency can be further improved.

In addition, as a capping head in the related art, Japanese Unexamined Patent Application, First Publication No. 2003-146392 (hereinafter, referred to as Well-Known Document 1) is known. In the capping head of Well-Known Document 1, five or six forming rollers are provided. By providing a large number of forming rollers in this way, a forming load (pressing force) per forming roller can be reduced, and thus it is easier to suppress deformation of the mouthpiece portion even in a case in which a thickness of the threaded can is reduced.

However, in a case in which a large number of forming rollers are provided, an outer shape (that means a dimension of the outer shape, and the same applies hereinafter) or a weight of the capping head is also increased. Therefore, it is difficult to increase the processing speed of the capping and improve the production efficiency.

One of the objects (another object) of the present invention is to provide a capping head, a spindle assembly, a capping device, and a capping system that can keep a compact outer shape of the capping head, achieve weight reduction, and increase the processing speed of the capping to improve the production efficiency.

Aspect 20 of Present Invention

A capping head for attaching a cap having a topped cylindrical shape to a mouthpiece portion of a threaded can having a bottomed cylindrical shape, the capping head including: a body centered on a center axis extending in an up-down direction; a cam follower disposed on an upper side of the body and configured to roll on an outer peripheral surface of a cone cam; a forming roller disposed on a lower side of the body, connected to the cam follower, and configured to move in a radial direction as the cam follower moves in the radial direction; and a biasing member configured to bias the cam follower and the forming roller toward a radially inner side, in which a plurality of the cam followers are provided and arranged in a circumferential direction, a plurality of the forming rollers are provided in the same number as the number of the cam followers and arranged in the circumferential direction, the plurality of forming rollers include a plurality of thread forming rollers configured to form a thread portion to be threaded with the mouthpiece portion on a peripheral wall of the cap, and at least one tuck under forming roller configured to tuck under forming a lower end of the peripheral wall of the cap onto the mouthpiece portion, and the body has a body recess portion depressed downward from an upper surface of the body and configured to accommodate at least a lower end portion of the cone cam.

Aspect 21 of Present Invention

The capping head according to Aspect 20, in which an inner diameter dimension of the body recess portion is larger than an outer diameter dimension of a lower end portion of the cone cam with which the cam follower comes into contact.

Aspect 22 of Present Invention

The capping head according to Aspect 20 or 21, in which the body has a spindle attachment portion attached to a spindle inserted into the cone cam, and the spindle attachment portion is disposed at a bottom portion of the body recess portion having a bottomed hole shape.

Aspect 23 of Present Invention

The capping head according to Aspect 22, in which an inner diameter dimension of the body recess portion is larger than a diameter dimension of the spindle attachment portion.

Aspect 24 of Present Invention

The capping head according to any one of Aspects 20 to 23, in which, in a case in which a dimension of the cone cam in the up-down direction from an upper end position with which the cam follower comes into contact to a lower end position is defined as a forming dimension H, a depth dimension h of the body recess portion in the up-down direction is 1.58H or less.

Aspect 25 of Present Invention

The capping head according to any one of Aspects 20 to 24, in which the cam follower has a shaft portion extending in the up-down direction, and a rolling element rotationally supported by a lower end portion of the shaft portion and pressed against the outer peripheral surface of the cone cam by a biasing force of the biasing member.

Aspect 26 of Present Invention

The capping head according to any one of Aspects 20 to 25, further including: a pressure block disposed on the lower side of the body and configured to press a top wall of the cap.

Aspect 27 of Present Invention

The capping head according to any one of Aspects 20 to 26, in which six or more forming rollers are provided, and the number of the thread forming rollers is larger than the number of the tuck under forming rollers.

Aspect 28 of Present Invention

The capping head according to Aspect 27, in which four thread forming rollers are provided, and two tuck under forming rollers are provided.

Aspect 29 of Present Invention

The capping head according to any one of Aspects 20 to 28, in which positions of the thread forming rollers adjacent to each other in the circumferential direction are displaced from each other in the up-down direction.

Aspect 30 of Present Invention

The capping head according to any one of Aspects 20 to 29, in which the body has a spindle attachment portion attached to a spindle inserted into the cone cam, and the spindle attachment portion is disposed to overlap the body recess portion when seen in the radial direction.

Aspect 31 of Present Invention

The capping head according to any one of Aspects 20 to 30, in which a plurality of the biasing members are provided in the same number as the number of the cam followers and are arranged in the circumferential direction, the body has a biasing member accommodation hole extending in the up-down direction, a plurality of the biasing member accommodation holes are provided in the same number as the number of the biasing members and are arranged in the circumferential direction, and each of the biasing members is accommodated in each of the biasing member accommodation holes.

Aspect 32 of Present Invention

The capping head according to any one of Aspects 20 to 30, in which a plurality of the biasing members are provided in the same number as the number of the cam followers and are arranged in the circumferential direction, the body has a pocket having a recessed shape, depressed from an outer peripheral surface of the body toward the radially inner side, and extending in the up-down direction, a plurality of the pockets are provided in the same number as the number of the biasing members and are arranged in the circumferential direction, each of the biasing members is accommodated in each of the pockets, and the capping head further includes a cover having a cylindrical shape and configured to surround the body from a radially outer side over a whole circumference in the circumferential direction.

Aspect 33 of Present Invention

The capping head according to any one of Aspects 20 to 32, in which the body is made of an aluminum alloy.

Aspect 34 of Present Invention

The capping head according to any one of Aspects 20 to 33, further including: a pressure block disposed on the lower side of the body and configured to press a top wall of the cap, in which the body has an accommodation cylinder protruding downward from a lower surface of the body, and a part of the pressure block is accommodated in the accommodation cylinder.

Aspect 35 of Present Invention

The capping head according to any one of Aspects 20 to 34, further including: a support member configured to support the cam follower and the forming roller, in which the support member has a support shaft extending in the up-down direction, an upper arm configured to connect the support shaft and the cam follower, and a lower arm configured to connect the support shaft and the forming roller, the upper arm has an upper clamp portion configured to surround the support shaft around its axis and being deformable to press an outer peripheral surface of the support shaft, the lower arm has a lower clamp portion configured to surround the support shaft around its axis and being deformable to press the outer peripheral surface of the support shaft, and at least one of the upper clamp portion or the lower clamp portion has a deformation assist groove disposed on a clamp portion peripheral surface and extending in the up-down direction.

Aspect 36 of Present Invention

The capping head according to Aspect 35, in which the lower arm has a step portion disposed on a surface facing the radially inner side.

Aspect 37 of Present Invention

A spindle assembly including: the capping head according to any one of Aspects 20 to 36; an elevation shaft extending in the up-down direction and to which a pressure block configured to press a top wall of the cap is attached; a spindle having a cylindrical shape, into which the elevation shaft is inserted, and to which the body is attached; and an elevation cylinder having a cylindrical shape and into which the elevation shaft and the spindle are inserted, in which the elevation shaft has an upper cam follower configured to move the elevation shaft in the up-down direction, the spindle has a spindle gear configured to rotate the spindle around the center axis, and the elevation cylinder has the cone cam having a cylindrical shape, and a lower cam follower configured to move the elevation cylinder in the up-down direction.

Aspect 38 of Present Invention

A capping device including: a turret configured to rotate around a turret axis; the spindle assembly according to Aspect 37 disposed on an outer peripheral portion of the turret; a fixed gear configured to mesh with the spindle gear and extending around the turret axis; an upper cam extending around the turret axis and with which the upper cam follower engages; and a lower cam extending around the turret axis and with which the lower cam follower engages.

Aspect 39 of Present Invention

A capping system including: a filler configured to fill a threaded can with a content; and the capping device according to Aspect 38 to which the threaded can discharged from the filler is supplied, in which a transport direction of the threaded can discharged from the filler and directed toward the capping device extends along a tangent of the outer peripheral portion of the turret when seen in a turret axis direction.

Advantageous Effects of Invention

With the capping head body, the capping head, the spindle assembly, the capping device, and the capping system according to the aspect of the present invention, the shape of the body can be simplified, the strength of the body can be increased, and weight reduction can be achieved. In addition, it is possible to keep a compact outer shape of the capping head, achieve weight reduction, and increase the processing speed of the capping to improve the production efficiency.

DETAILED DESCRIPTION OF THE INVENTION

Figure 1:
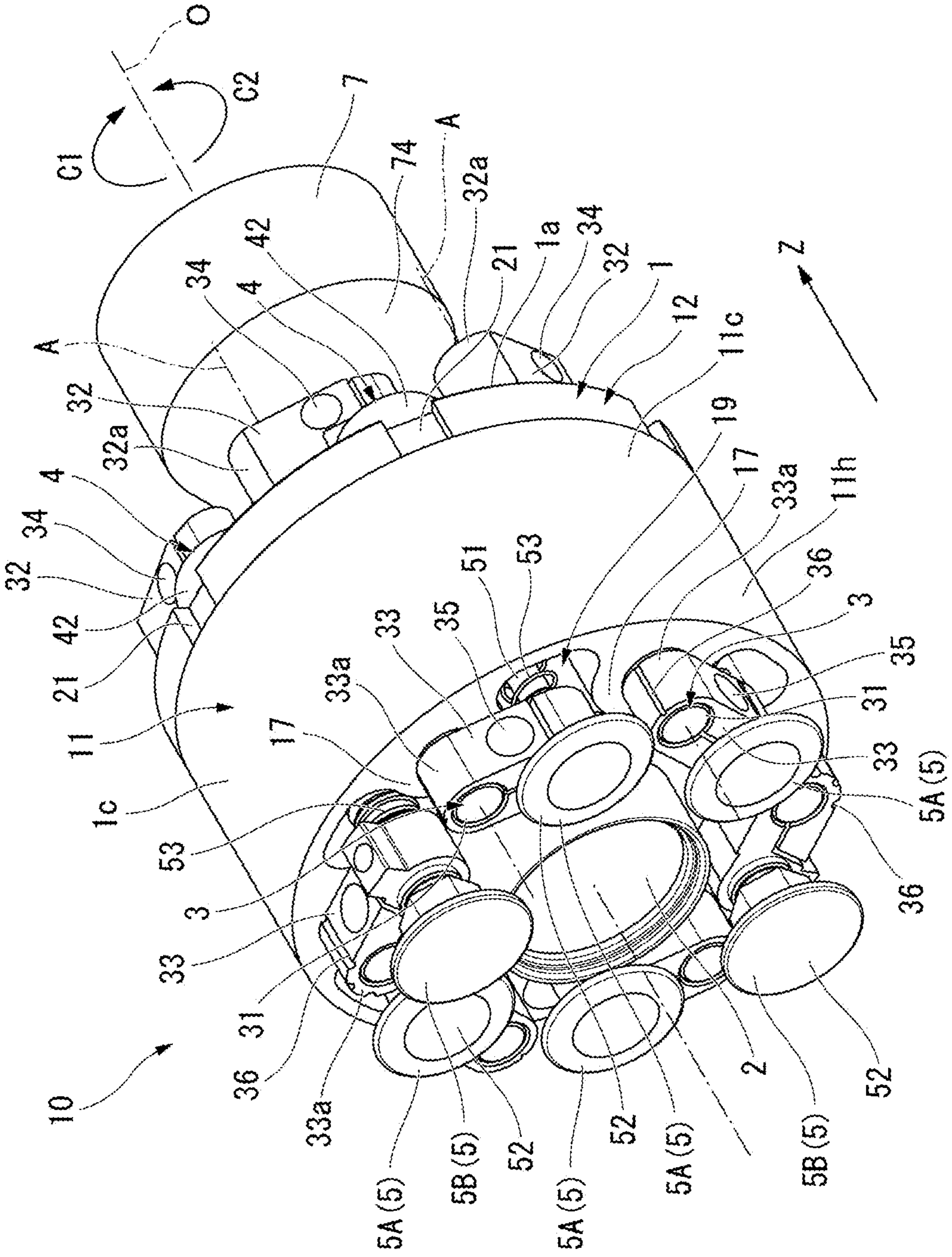
FIG. 1 is a perspective view showing a capping head and its body according to the present embodiment.

A body 1 of a capping head 10, the capping head 10, a spindle assembly 80, a capping device 120, and a capping system 100 according to embodiments of the present invention will be described with reference to FIGS. 1 to 13. It should be noted that, in the present specification, the capping head 10, the spindle assembly 80, and the like may be simply referred to as a device.

The capping head 10, the spindle assembly 80, and the capping device 120 according to the present embodiment are devices for attaching a cap to a mouthpiece portion of a threaded can (can) having a bottomed cylindrical shape to seal the threaded can. As the threaded can and the cap, for example, a threaded can and a cap described in Japanese Unexamined Patent Application, First Publication No. 2019-011103 can be used. It should be noted that the threaded can may also be referred to as a bottle can. The cap has, for example, a topped cylindrical shape.

Although detailed showing is omitted, schematic configurations of the threaded can and the cap are as follows.

The threaded can is made of, for example, an aluminum alloy. The threaded can includes a can body, which is a peripheral wall of the can, and a can bottom, which is a bottom wall of the can. An opening portion of the can body is a mouthpiece portion with a smaller diameter than the portions (body portion and shoulder portion) of the can other than the opening portion. The mouthpiece portion has a substantially cylindrical shape centered on a can axis. The mouthpiece portion includes a curl portion, a male thread portion, and a bulging portion in this order from an opening end toward a can bottom side along a can axis direction.

The bulging portion has an annular shape centered on the can axis. The bulging portion is formed to protrude beyond the male thread portion to an outer side in a can radial direction orthogonal to the can axis. As shown in (a) of FIG. 17, the bulging portion 201 has a protruding shape that bulges to an outer side in the can radial direction in a cross section (longitudinal cross-section) of the mouthpiece portion 200 along the can axis.

A cap 300 has a cap main body having a topped cylindrical shape and placed over the mouthpiece portion 200, and a liner (not shown) having a disk shape and disposed on an inner surface of a top wall of the cap main body. The liner comes into contact with the curl portion of the mouthpiece portion 200. The cap main body is made of, for example, an aluminum alloy, and the liner is made of, for example, a resin. It should be noted that, in the present specification, a case of simply referring to a peripheral wall 301 and the top wall of the cap 300 refers to the peripheral wall 301 and the top wall of the cap main body unless otherwise specified. As shown in (c) of FIG. 17 and the like, a lower end of the peripheral wall 301 of the cap 300 is tucked under forming onto the bulging portion 201.

Figure 2:
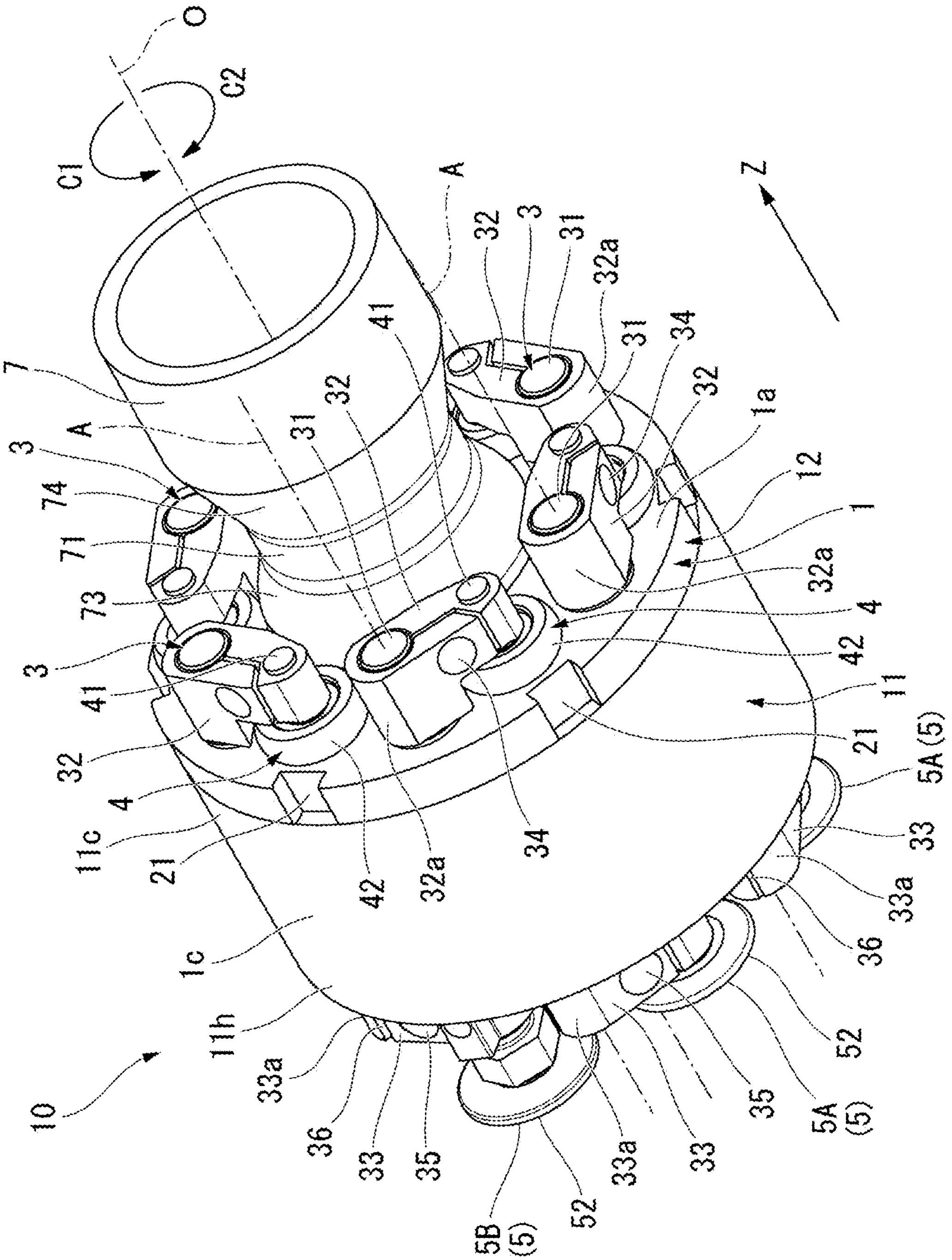
FIG. 2 is a perspective view showing the capping head and its body according to the present embodiment.
Figure 3:
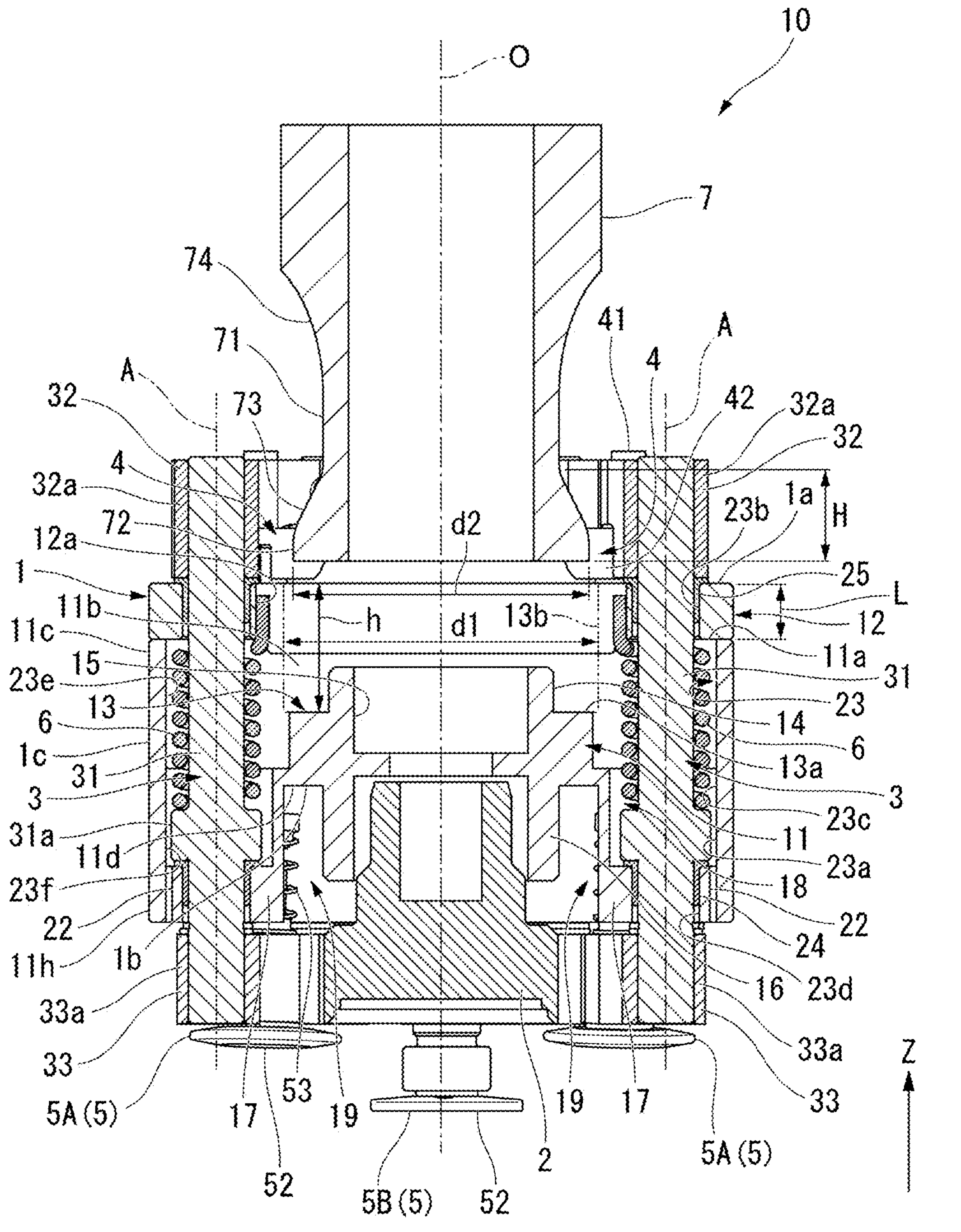
FIG. 3 is a cross-sectional view (longitudinal cross-sectional view) showing the capping head and its body according to the present embodiment.
Figure 12:
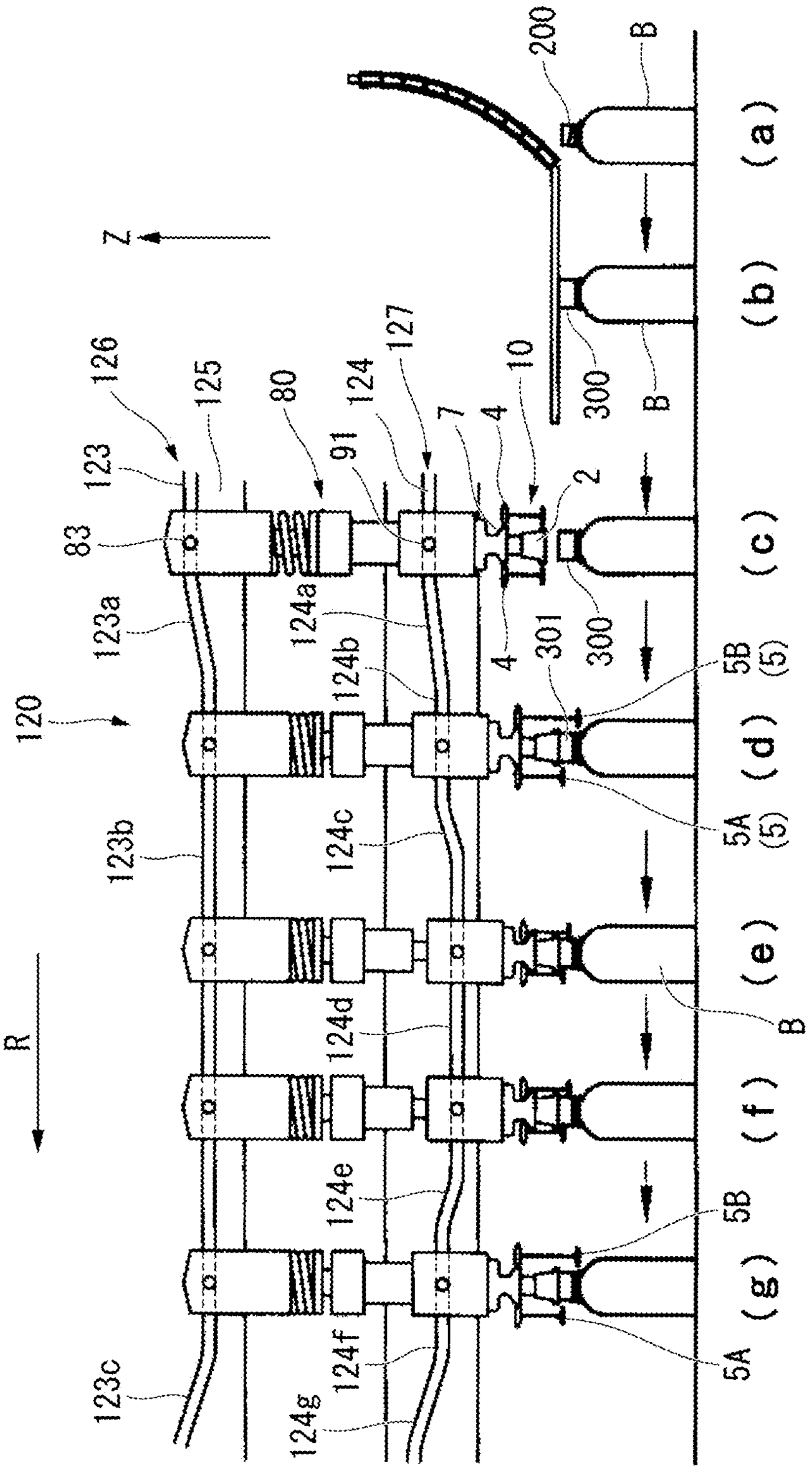
FIG. 12 is a side view schematically showing an outer peripheral portion of the capping device according to the present embodiment in an exploded manner on a plane and showing an operation of each of the spindle assembly and the capping head.

As shown in FIGS. 1 to 3, the capping head 10 includes a body 1 centered on a center axis O, a pressure block 2, a swing shaft (support member) 3, a cam follower 4, a forming roller 5, and a biasing member 6. As shown in FIG. 12, a center axis (can axis which is not shown) of each of a threaded can B to be capped by the capping head 10 and the cap 300 is disposed coaxially with the center axis O shown in FIGS. 1 to 3.

Here, a "direction definition" in the present embodiment will be described. In the present embodiment, a direction in which the center axis O of the body 1 extends is referred to as an up-down direction. That is, the center axis O extends in the up-down direction. The up-down direction corresponds to a Z-axis direction in each drawing. In the up-down direction, the cam follower 4 and the forming roller 5 are disposed at different positions from each other. In the up-down direction, a direction from the forming roller 5 toward the cam follower 4 is referred to as an upper side (+Z side), and a direction from the cam follower 4 toward the forming roller 5 is referred to as a lower side (−Z side). It should be noted that the up-down direction may also be referred to as an axis direction. In this case, the upper side corresponds to one axial side in the axis direction, and the lower side corresponds to the other axial side in the axis direction.

A direction orthogonal to the center axis O is referred to as a radial direction. In the radial direction, a direction approaching the center axis O is referred to as a radially inner side, and a direction spaced away from the center axis O is referred to as a radially outer side.

Figure 4:
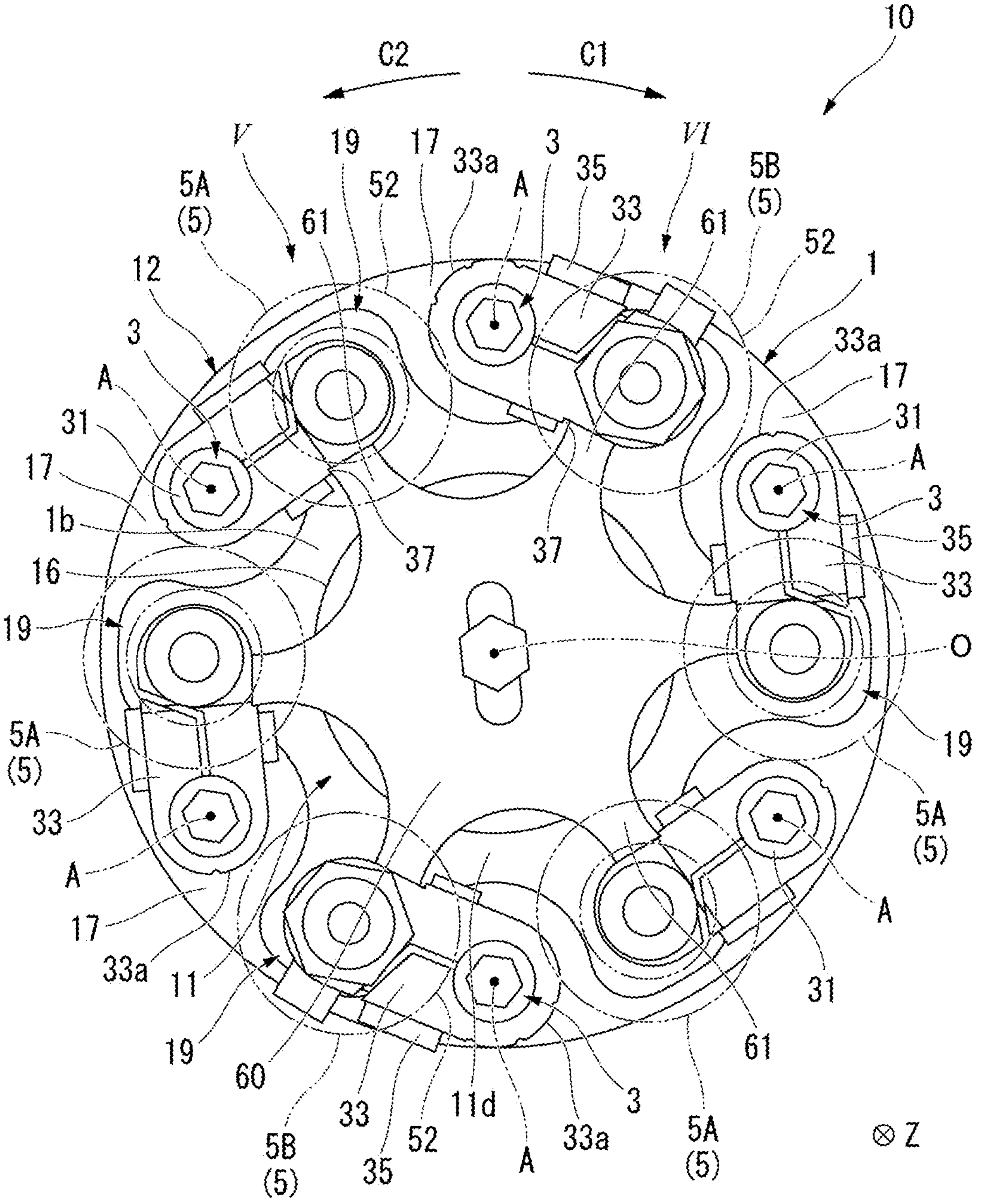
FIG. 4 is a bottom view showing the capping head and showing a state in which an assembly jig is locked to a plurality of lower arms. It should be noted that a forming roller is shown as a transparent view using a two-dot chain line.

A direction of circling around the center axis O is referred to as a circumferential direction. In the circumferential direction, a predetermined rotation direction is referred to as one circumferential side C1, and a rotation direction opposite to one circumferential side C1 is referred to as the other circumferential side C2. In the present embodiment, as shown in FIG. 4, in a bottom view of the capping head 10 seen from a lower side, a clockwise direction centered on the center axis O is the one circumferential side C1, and a counterclockwise direction is the other circumferential side C2.

In addition, a shaft center axis A, which is a center axis of a support shaft 31 described below of the swing shaft 3, is disposed on the radially outer side of the center axis O and extends in the up-down direction (Z-axis direction) parallel to the center axis O. In the present embodiment, the direction definition with the shaft center axis A of the swing shaft 3 as a reference is distinguished from the direction definition with the center axis O of the body 1 as a reference, and is as follows.

A direction orthogonal to the shaft center axis A is referred to as a shaft radial direction. In the shaft radial direction, a direction approaching the shaft center axis A is referred to as an inner side in the shaft radial direction, and a direction spaced away from the shaft center axis A is referred to as an outer side in the shaft radial direction. A direction of circling around the shaft center axis A is referred to as a shaft circumferential direction.

Figure 10:
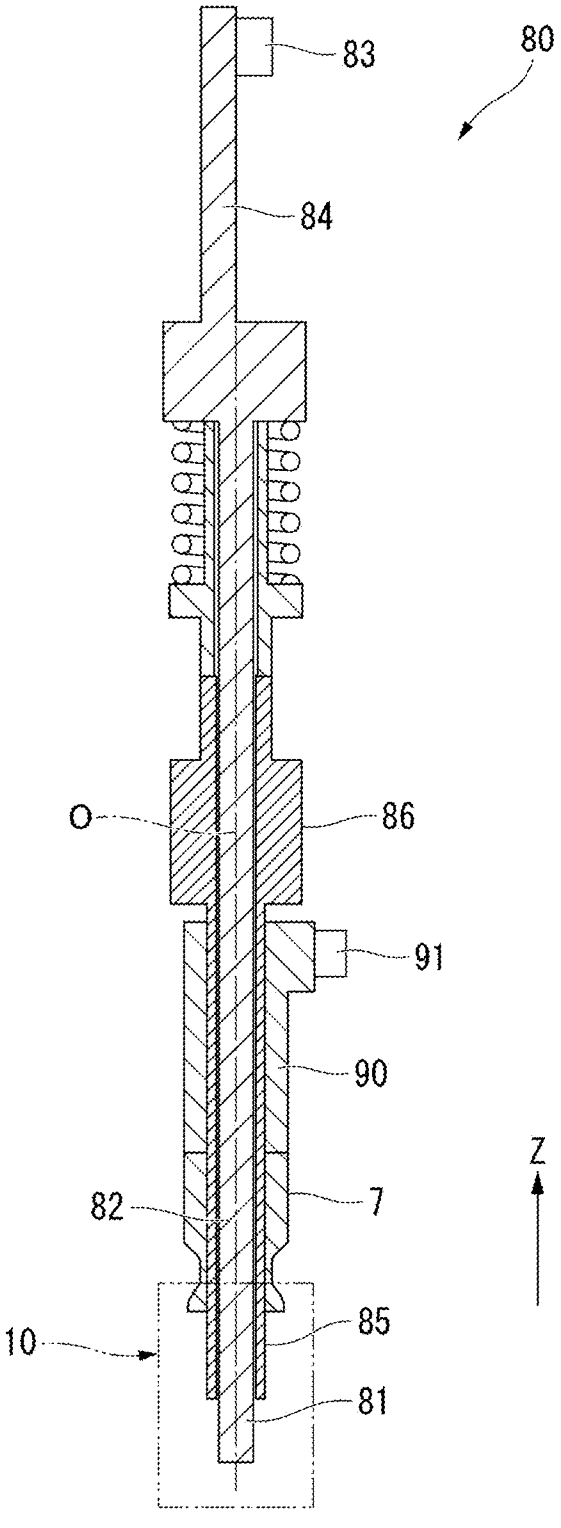
FIG. 10 is a cross-sectional view (longitudinal cross-sectional view) showing a spindle assembly according to the present embodiment and showing the capping head in a simplified manner.

As shown in FIG. 10, the capping head 10 is attached to the spindle assembly 80, which extends in the up-down direction, and constitutes a part of the spindle assembly 80. Specifically, the spindle assembly 80 is disposed on an upper side of the capping head 10, and a lower end portion of the spindle assembly 80 is inserted into the capping head 10 from an upper side. Specifically, a lower end portion of a spindle 85, which will be described below, of the spindle assembly 80 is attached to the body 1. In addition, an elevation shaft 81, which will be described below, is attached to the pressure block 2 of the spindle assembly 80. A center axis (spindle axis) of the spindle assembly 80 is disposed coaxially with the center axis O of the body 1. The capping head 10 is supported by the spindle assembly 80 and moves in the up-down direction together with the spindle assembly 80. In addition, the body 1 is rotated centered on the center axis O by the spindle 85.

In addition, the spindle 85 is fixed to the body 1 in a state of being inserted into a cone cam (cam) 7 having a cylindrical shape of an elevation cylinder 90, which will be described below, of the spindle assembly 80. As shown in FIGS. 1 to 3, the cone cam 7 is disposed on an upper side of the body 1 and extends in the up-down direction centered on the spindle axis (center axis O).

Although details will be described below, in FIGS. 10 and 11, the elevation shaft 81, the spindle 85, the capping head 10, and the elevation cylinder 90 including the cone cam 7 are connected to separate cam mechanisms 126 and 127, which will be described below, and each of the cam mechanisms 126 and 127 moves these components in the up-down direction. Further, the spindle 85 and the body 1 rotate around the center axis O with respect to the cone cam 7.

It should be noted that the cone cam 7 may be one of the components of the capping head 10. That is, in this case, the capping head 10 further includes the cone cam 7.

As shown in FIGS. 1 to 3, the body 1 has a substantially cylindrical shape. In the present embodiment, at least a part of the body 1 is made of an aluminum alloy, and specifically, is made of, for example, duralumin. In the present embodiment, a body main portion 11 and a body flange 12, which will be described below, of the body 1 are made of an aluminum alloy. However, the material of the body 1 is not limited to the examples of the present embodiment. Specifically, at least a part of the body 1 may be made of an aluminum alloy, an engineering plastic, or an FRP. Note that, a preferred example in the case of an engineering plastic includes materials such as polyether ether ketone (PEEK). At least a part of the body 1 is made of a material having a specific gravity smaller than that of stainless steel, for example.

The body 1 has a body main portion 11 and a body flange 12. It should be noted that the body main portion 11 may also be referred to as a body substrate or a body base portion.

Figure 7:
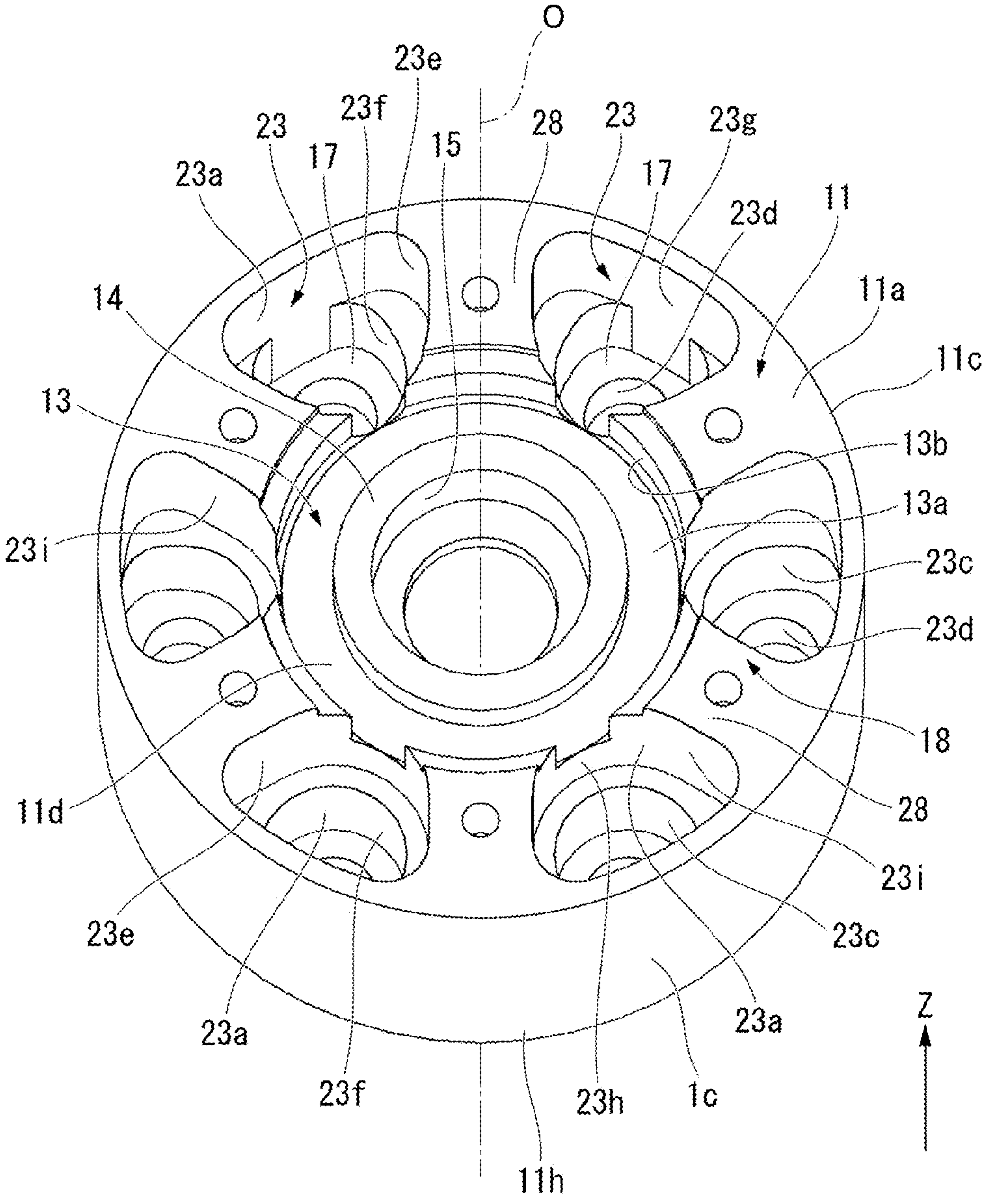
FIG. 7 is a perspective view showing a body main portion of the capping head according to the present embodiment.
Figure 8:
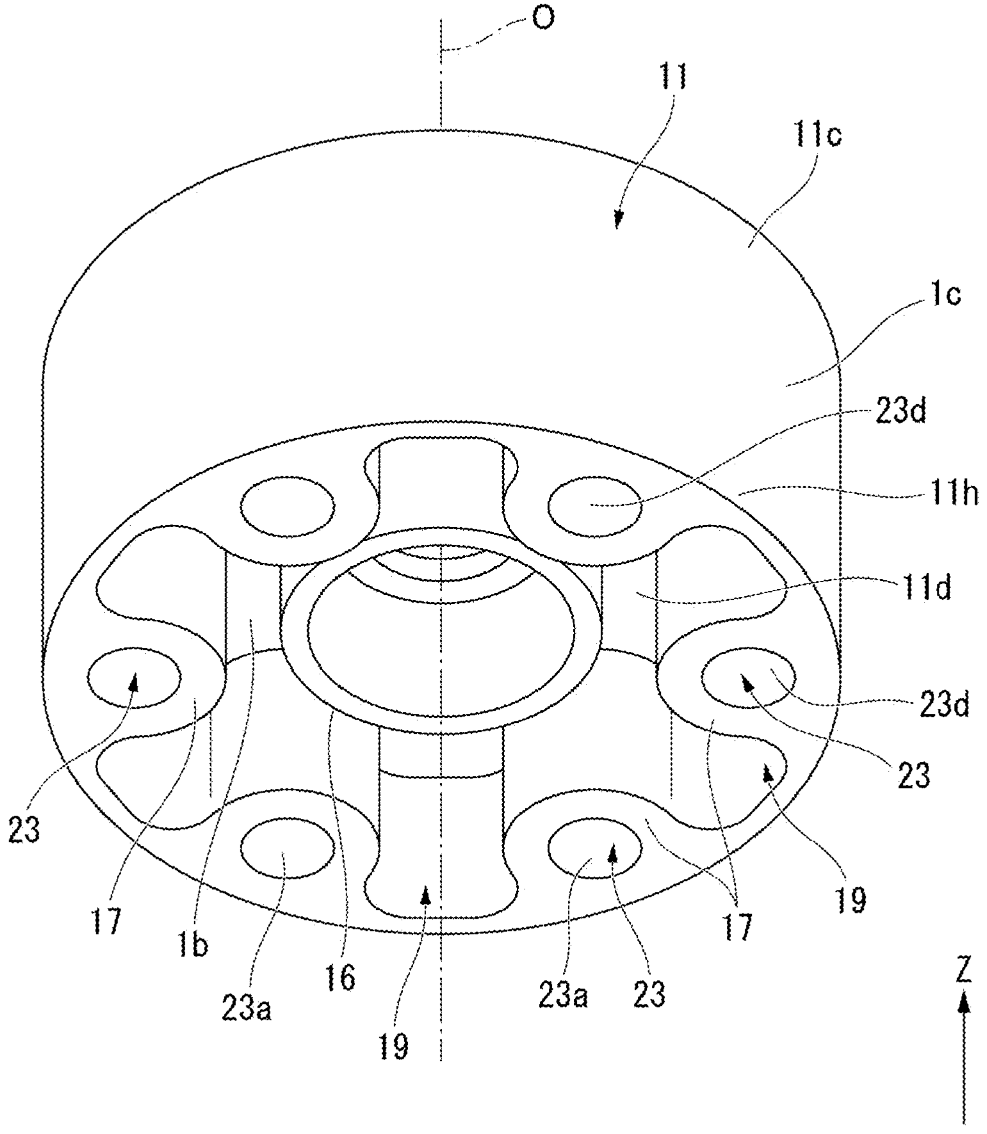
FIG. 8 is a perspective view showing the body main portion of the capping head according to the present embodiment.
Figure 9:
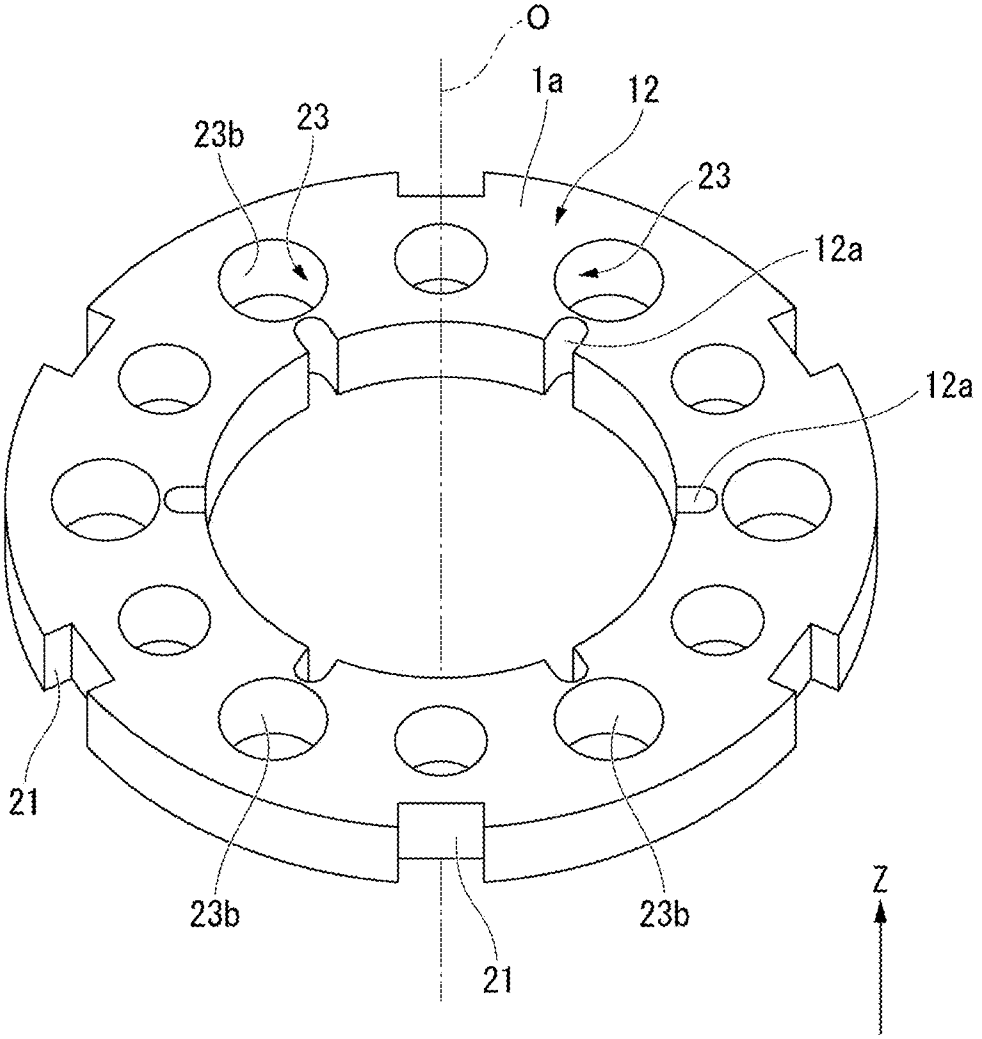
FIG. 9 is a perspective view showing a body flange of the capping head according to the present embodiment.

As shown in FIGS. 7 and 8, the body main portion 11 has a cylindrical shape centered on the center axis O, and specifically, has a substantially cylindrical shape. The body main portion 11 has an outer peripheral wall having a cylindrical shape. Therefore, the body 1 has an outer peripheral surface 1*c* having a cylindrical shape. As shown in FIG. 9, the body flange 12 has an annular shape. Specifically, the body flange 12 has a substantially annular plate shape centered on the center axis O. The body flange 12 is fixed to an upper end portion of the body main portion 11 by a bolt or the like.

In addition, as shown in FIGS. 1 to 3 and 7 to 9, the body 1 includes a peripheral wall portion 11*c*, a bottom wall portion 11*d*, a body recess portion (cone cam accommodation recess portion) 13, a cylinder portion 14, a spindle attachment portion 15, an accommodation cylinder 16, a support protrusion piece 17, a skirt portion 11*h*, a through-hole (biasing member accommodation hole) 23, a swing shaft housing portion 18 provided with a frame 28, an operation portion 21, and a drainage hole 22.

The peripheral wall portion 11*c* has a substantially cylindrical shape centered on the center axis O. The peripheral wall portion 11*c* constitutes a cylindrical portion located on an upper side of the bottom wall portion 11*d* in the outer peripheral wall of the body 1.

The bottom wall portion 11*d* has a substantially annular plate shape centered on the center axis O. An outer peripheral portion of the bottom wall portion 11*d* is connected to a lower end portion of the peripheral wall portion 11*c*.

As shown in FIG. 3, the body recess portion 13 has a recessed shape depressed downward from an upper surface 1*a* of the body 1. The body recess portion 13 has a bottomed hole shape centered on the center axis O, and specifically, a substantially circular hole shape. The body recess portion 13 is open to the upper surface 1*a* and extends in the up-down direction. The body recess portion 13 is a recess portion defined by an inner peripheral surface of the body flange 12, an inner peripheral surface of the peripheral wall portion 11*c*, and an upper surface of the bottom wall portion 11*d*.

In the present embodiment, the body recess portion 13 is disposed from the body flange 12 to an upper side portion of the body main portion 11 in the up-down direction. The body recess portion 13 extends in a hole shape from the body flange 12 to the body main portion 11. Specifically, an upper portion of the body recess portion 13 is located inside the body flange 12 (insertion hole), and a lower portion of the body recess portion 13 is located in a recess 11*b* that is depressed downward from an upper end surface 11*a* of the body main portion 11. That is, the body recess portion 13 penetrates the body flange 12 in the up-down direction, and is disposed over the recess 11*b* of the body main portion 11.

The dimension in the up-down direction between the upper surface 1*a* of the body 1 and a bottom wall 13*a* of the body recess portion 13 is larger than the dimension in the up-down direction between a lower surface 1*b* of the body 1 and the bottom wall 13*a*. In other words, the dimension in the up-down direction between the upper surface 1*a* of the body 1 and the upper surface of the bottom wall portion 11*d* (that is, a depth dimension of the body recess portion 13) is larger than the dimension in the up-down direction between the upper surface and the lower surface of the bottom wall portion 11*d* (that is, a thickness dimension of the bottom wall portion 11*d*).

Although not shown, in a case in which the cone cam 7 moves relatively downward with respect to the spindle 85 and the body 1 fixed to the spindle 85, the body recess portion 13 accommodates at least a lower end portion of the cone cam 7. Specifically, the body recess portion 13 accommodates at least a large-diameter rolling surface 72 and a taper rolling surface 73, which are disposed at the lower end portion of the cone cam 7 and will be described later. Further, a part of a small-diameter rolling surface 71 of the cone cam 7, which will be described below, may be disposed in the body recess portion 13. It should be noted that the small-diameter rolling surface 71, the large-diameter rolling surface 72, and the taper rolling surface 73 are portions of the cone cam 7 with which the cam follower 4 comes into contact.

Reference numeral 13*b* in FIG. 3 indicates an inner peripheral surface 13*b* of the body recess portion 13. As shown in FIG. 3, an inner diameter dimension d1 of the body recess portion 13 is larger than an outer diameter dimension d2 of the lower end portion of the cone cam 7 with which the cam follower 4 comes into contact. Specifically, the inner diameter dimension d1 of the body recess portion 13 is a diameter dimension of an inner peripheral surface 13*b* of the body recess portion 13. As shown in FIG. 7, the inner peripheral surface 13*b* of the body recess portion 13 is a cylindrical surface rising upward from a radially outer end portion of the bottom wall 13*a* of the body recess portion 13.

The cylinder portion 14 protrudes upward from the bottom wall 13*a* of the body recess portion 13. The cylinder portion 14 protrudes upward from an inner peripheral portion of the bottom wall portion 11*d*. The cylinder portion 14 has a cylindrical shape centered on the center axis O. As shown in FIG. 3, an upper end surface of the cylinder portion 14 is located below the upper surface 1*a* of the body 1, and in the present embodiment, is located below the upper end surface 11*a* of the body main portion 11. In other words, the upper end surface of the cylinder portion 14 is located below a lower surface of the body flange 12.

In a case in which the cone cam 7 is moved downward from an ascent end position (standby position) shown in FIG. 3 and located at the descent end position (close position) (not shown) disposed on the lowermost side within a range of its up-down direction stroke, the lower end portion of the cone cam 7 faces the upper end surface of the cylinder portion 14 with a gap therebetween. The dimension in the up-down direction (insertion depth from the upper surface 1*a* of the body 1) in which the cone cam 7 set at the descent end position is inserted into the body recess portion 13 is the same as or equal to or larger than a dimension L of the body flange 12 in the up-down direction.

An outer peripheral surface of the cylinder portion 14 is disposed to be spaced away from the inner peripheral surface 13*b* (that is, the inner peripheral surface of the peripheral wall portion 11*c*) of the body recess portion 13 toward the radially inner side (see FIG. 7). Therefore, a groove portion having a circular ring shape centered on the center axis O is provided between the outer peripheral surface of the cylinder portion 14 and the inner peripheral surface 13*b* of the body recess portion 13. The groove portion is open to the upper side and extends in the circumferential direction. In a case in which the cone cam 7 moves relatively downward with respect to the spindle 85 and the body 1 fixed to the spindle 85, a lower end portion of a peripheral wall of the cone cam 7 may be disposed in the groove portion.

As shown in FIG. 3, the spindle attachment portion 15 is disposed at a bottom portion of the body recess portion 13. The spindle attachment portion 15 is disposed inside the body main portion 11. The spindle attachment portion 15 is open to the upper end surface of the cylinder portion 14 and extends in the up-down direction. The spindle attachment portion 15 has a substantially circular hole shape centered on the center axis O. The inner diameter dimension d1 of the body recess portion 13 is larger than the diameter dimension of the spindle attachment portion 15. The lower end portion of the spindle 85 is inserted into the spindle attachment portion 15. The spindle attachment portion 15 and the spindle 85 are fastened to each other by, for example, threading or the like. That is, the spindle attachment portion 15 is attached to the spindle 85.

An upper portion of the spindle attachment portion 15 is disposed inside the cylinder portion 14. Therefore, the spindle attachment portion 15 (at least the upper portion thereof) is disposed to overlap with the body recess portion 13 when seen in the radial direction. In the present embodiment, the lower portion of the spindle attachment portion 15 is located below the bottom wall 13*a*. In other words, the upper portion of the spindle attachment portion 15 is disposed on the inner peripheral portion of the cylinder portion 14, and the lower portion of the spindle attachment portion 15 is disposed on the inner peripheral portion of the bottom wall portion 11*d*.

Here, an example of each dimension related to the body recess portion 13 will be described in detail below. It should be noted that each of the following dimensions has a tolerance dimension (numerical range) of ±10%.

In the present embodiment, the inner diameter dimension d1 of the body recess portion 13 is 56 mm. The outer diameter dimension d2 of the lower end portion of the cone cam 7 is 52.7 mm. A clearance (one side clearance) in the radial direction between the body recess portion 13 and the lower end portion of the cone cam 7, that is, [(d1−d2)/2] is 1.65 mm.

In addition, the dimension (depth dimension of the body recess portion 13 in the up-down direction) h in the up-down direction between the upper surface 1*a* of the body 1 and the bottom wall 13*a* of the body recess portion 13 is 23 mm. A stroke amount of the cone cam 7 between the ascent end position (standby position) and the descent end position (close position) in the up-down direction is 14.3 mm. The dimension in the up-down direction between the upper surface 1*a* of the body 1 and the lower end surface of the cone cam 7 set at the descent end position, that is, a cone cam insertion amount is 10.39 mm. Therefore, the cone cam insertion amount/the cone cam stroke amount is approximately 73%.

In addition, in a case in which the dimension of the up-down direction from the upper end position where the cam follower 4 contacts the cone cam 7 to the lower end position (lower end of the cone cam 7) is defined as a forming dimension H, and the forming dimension H is 14.56 mm. That is, in the present embodiment, the depth dimension h of the body recess portion 13 in the up-down direction is larger than 0 mm and 1.58H (mm) or less. The depth dimension h is preferably 0.714H (mm) or less. It should be noted that, in the present embodiment, the cone cam insertion amount/the forming dimension H is approximately 71%.

In addition, the dimension in the up-down direction (stroke limit dimension and standby position) between the lower end surface of the cone cam 7 set at the ascent end position and the bottom wall 13*a* of the body recess portion 13 is 26.91 mm. The dimension in the up-down direction (stroke limit dimension and close position) between the lower end surface of the cone cam 7 set at the descent end position and the bottom wall 13*a* of the body recess portion 13 is 12.61 mm.

The accommodation cylinder 16 protrudes downward from the lower surface 1*b* of the body 1. The accommodation cylinder 16 extends downward from the lower surface of the bottom wall portion 11*d*. The accommodation cylinder 16 has a substantially cylindrical shape centered on the center axis O.

The support protrusion piece 17 protrudes downward from the lower surface 1*b* of the body 1. The support protrusion piece 17 extends downward from an outer peripheral portion of the lower surface of the bottom wall portion 11*d*. The support protrusion piece 17 is disposed on the radially outer side of the accommodation cylinder 16. A plurality of the support protrusion pieces 17 are provided to surround the accommodation cylinder 16 from the radially outer side and arranged in the circumferential direction (see FIG. 8). The number of the support protrusion pieces 17 is the same as the number of the forming rollers 5, and in the present embodiment, six support protrusion pieces 17 are provided. The plurality of support protrusion pieces 17 are disposed at intervals from each other in the circumferential direction.

Each support protrusion piece 17 is disposed radially outwardly away from the accommodation cylinder 16, and the support protrusion pieces 17 adjacent to each other in the circumferential direction are disposed to be spaced apart from each other. Therefore, the body 1 has a cutout portion between the support protrusion piece 17 and the accommodation cylinder 16, as well as between the support protrusion pieces 17 adjacent to each other in the circumferential direction. The cutout portion is a recessed space formed by removing a part of the body 1.

The cutout portion between the support protrusion pieces 17 adjacent to each other in the circumferential direction may be referred to as a roller shaft accommodation pocket 19. The roller shaft accommodation pocket 19 extends inside the body 1 in the up-down direction and is open to a lower side of the body 1. A plurality of the roller shaft accommodation pockets 19 are provided and arranged in the circumferential direction. The number of the roller shaft accommodation pockets 19 is the same as the number of the forming rollers 5.

The skirt portion 11*h* has a cylindrical shape centered on the center axis O. The skirt portion 11*h* is disposed on a lower side of the peripheral wall portion 11*c*. The skirt portion 11*h* constitutes a cylindrical portion of the outer peripheral wall of the body 1, which is located on a lower side of the bottom wall portion 11*d*. An upper end portion of the skirt portion 11*h* is connected to the lower end portion of the peripheral wall portion 11*c* and the outer peripheral portion of the bottom wall portion 11*d*. An outer peripheral surface of the skirt portion 11*h* and the outer peripheral surface of the peripheral wall portion 11*c* are continuous in the up-down direction, and the outer peripheral surfaces are integrally formed without any step difference. The outer peripheral surface of the skirt portion 11*h* and the outer peripheral surface of the peripheral wall portion 11*c* each constitute a part of the outer peripheral surface 1*c* of the body 1.

The support protrusion piece 17 is disposed on the radially inner side of the skirt portion 11*h*. An outer peripheral portion of a lower side portion of the support protrusion piece 17 is connected to the inner peripheral portion of the skirt portion 11*h*. The skirt portion 11*h* and the plurality of support protrusion pieces 17 are integrally formed. The skirt portion 11*h* surrounds the plurality of support protrusion pieces 17, the plurality of roller shaft accommodation pockets 19, the accommodation cylinder 16, and a part of the pressure block 2 from the radially outer side.

The swing shaft housing portion 18 is disposed between an outer peripheral portion and an inner peripheral portion of the body 1. Specifically, the swing shaft housing portion 18 includes a portion that is disposed between an outer peripheral portion and an inner peripheral portion of the body main portion 11, and a portion that is disposed between an outer peripheral portion and an inner peripheral portion of the body flange 12. As shown in FIGS. 3 and 7, the swing shaft housing portion 18 includes a through-hole 23 that penetrates the body main portion 11 and the body flange 12 in an up-down direction, and a frame 28 that is disposed to be adjacent to the through-hole 23 in a circumferential direction. The swing shaft housing portion 18 includes a plurality of through-holes 23 and a plurality of frames 28. The plurality of through-holes 23 are disposed at intervals from each other in the circumferential direction. The plurality of frames 28 are disposed at intervals from each other in the circumferential direction. The through-holes 23 and the frames 28 are arranged alternately in the circumferential direction.

The through-hole 23 extends in the up-down direction inside the body 1. The through-hole 23 penetrates the body 1 in the up-down direction. The plurality of through-holes 23 are provided in the same number as the biasing members 6 and are arranged in the circumferential direction. In the present embodiment, six through-holes 23 are provided in the body 1 at equal pitch in the circumferential direction. In addition, the distance between the center axis (shaft center axis A) of each through-hole 23 and the center axis O (that is, the radial direction dimension) is the same. That is, each through-hole 23 is disposed such that the distance from the center axis O is equal for all. Each biasing member 6 is accommodated in each through-hole 23. In addition, the support shaft 31 of each swing shaft 3, which will be described below, is inserted into each through-hole 23 and protrudes upward and downward from each through-hole 23. That is, the swing shaft 3 is inserted into the through-hole 23.

As shown in FIG. 7, the through-hole 23 is disposed around the periphery of the spindle attachment portion 15 (cylinder portion 14). The swing shaft housing portion 18 in which the through-hole 23 is provided is disposed between the spindle attachment portion 15 and the outer peripheral wall of the body main portion 11 in the radial direction. The body main portion 11, the spindle attachment portion 15, and the swing shaft housing portion 18 are connected to each other, and specifically, in the present embodiment, the body main portion 11, the spindle attachment portion 15, and the swing shaft housing portion 18 are integrally formed from a single member. In the present embodiment, the body main portion 11, the spindle attachment portion 15, and the swing shaft housing portion 18 may be collectively referred to as simply the body main portion 11.

The body main portion 11 is a single cylindrical body formed without any seams. That is, the body main portion 11 is integrally formed by hollowing out a single member by cutting processing or the like. In addition, the body main portion 11 is made of an aluminum alloy, but may be made of an engineering plastic or a fiber reinforced plastic (FRP). Note that, a preferred example in the case of an engineering plastic may include materials such as PEEK (polyether ether ketone).

The peripheral wall portion 11*c* of the body main portion 11 has an outer peripheral wall having a cylindrical shape of the body main portion 11 (a wall portion having an annular shape on which the outer peripheral surface 1*c* is formed), an inner peripheral wall having a cylindrical shape of the body main portion 11 (a wall portion having an annular shape adjacent to the radially outer side of the body recess portion 13), and a frame 28 that connects the outer peripheral wall and the inner peripheral wall in the radial direction.

The through-hole 23 is a hole (space) defined by the outer peripheral wall having a cylindrical shape of the body main portion 11, the inner peripheral wall having a cylindrical shape of the body main portion 11, and a frame 28 that connects the outer peripheral wall and the inner peripheral wall in the radial direction. Specifically, as shown in FIG. 7, the through-hole 23 is formed to be surrounded by an inner wall surface 23*g* of the outer peripheral wall of the body main portion 11, an outer wall surface 23*h* of the inner peripheral wall of the body main portion 11, and a side wall surface 23*i* of the frame 28 facing the circumferential direction. In addition, the spindle attachment portion 15 (the cylinder portion 14) is connected to the inner peripheral wall of the body main portion 11 via the bottom wall portion 11*d*.

As shown in FIG. 3 and FIGS. 7 to 9, the through-hole 23 includes a main body hole portion 23*a* disposed in the body main portion 11, and a flange hole portion 23*b* disposed in the body flange 12. The main body hole portion 23*a* and the flange hole portion 23*b* overlap each other when seen in the up-down direction.

The main body hole portion 23*a* extends inside the body main portion 11 in the up-down direction and penetrates the body main portion 11 in the up-down direction. Specifically, the main body hole portion 23*a* penetrates the peripheral wall portion 11*c*, the bottom wall portion 11*d*, and the support protrusion piece 17 in the up-down direction.

As shown in FIGS. 3, 7, and 8, the main body hole portion 23*a* includes an accommodation hole portion 23*c* and a bearing hole portion 23*d*.

The accommodation hole portion 23*c* is disposed in a portion of the main body hole portion 23*a* other than the lower end portion. The accommodation hole portion 23*c* is open to the upper end surface 11*a* of the body main portion 11 and is depressed downward from the upper end surface 11*a*. The accommodation hole portion 23*c* has a multi-stepped hole shape extending in the up-down direction, and the inner diameter dimension is gradually reduced toward the lower side.

The accommodation hole portion 23*c* includes an opening portion 23*e* that is open to the upper end surface 11*a* of the body main portion 11, and a lower-side hole portion 23*f* that is disposed on a lower side of the opening portion 23*e*. That is, the through-hole 23 has an opening portion 23*e* and a lower-side hole portion 23*f*.

The opening portion 23*e* has a triangular hole shape when seen from above. The dimension of the opening portion 23*e* along the circumferential direction (opening width dimension) is reduced toward the radially inner side. In the present embodiment, the maximum value of the dimension of the opening portion 23*e* along the circumferential direction is larger than the maximum value of the dimension of the support protrusion piece 17 along the circumferential direction. In addition, a radially inner end portion of the opening portion 23*e* is open to the inner peripheral surface 13*b* of the body recess portion 13. Specifically, the radially inner end portion of the opening portion 23*e* is open over the entire length of the inner peripheral surface 13*b* in the up-down direction. In other words, the inner peripheral surface 13*b* of the body recess portion 13 is divided at a plurality of portions in the circumferential direction by each opening portion 23*e* that is open to the inner peripheral surface 13*b*.

The lower-side hole portion 23*f* is disposed on the upper side of the bearing hole portion 23*d*. The inner diameter dimension of the lower-side hole portion 23*f* is smaller than the inner diameter dimension of the opening portion 23*e* and is larger than the inner diameter dimension of the bearing hole portion 23*d*. The lower-side hole portion 23*f* is disposed inside the support protrusion piece 17. The inner diameter dimension of the lower-side hole portion 23*f* is smaller than the outer diameter dimension of the support protrusion piece 17. A portion of the lower-side hole portion 23*f*, which is located on the radially outer side with respect to the shaft center axis A, has a substantially rectangular hole shape extending in the circumferential direction. A portion of the lower-side hole portion 23*f*, which is located on the radially inner side with respect to the shaft center axis A, has a semicircular hole shape that is convex toward the radially inner side.

The bearing hole portion 23*d* is disposed in the lower end portion of the main body hole portion 23*a*. The bearing hole portion 23*d* is disposed on a lower side of the accommodation hole portion 23*c*. The bearing hole portion 23*d* and the lower-side hole portion 23*f* penetrate the support protrusion piece 17 in the up-down direction. The bearing hole portion 23*d* has a circular hole shape extending in the up-down direction. The inner diameter dimension of the bearing hole portion 23*d* is smaller than the inner diameter dimension of the accommodation hole portion 23*c*. A bearing member 24 such as a sliding bearing (dry bearing) is fitted in the bearing hole portion 23*d*.

As shown in FIG. 7, the frame 28 is disposed between the through-holes 23 adjacent to each other in the circumferential direction. Specifically, the frame 28 is disposed between the opening portions 23*e* adjacent to each other in the circumferential direction. The frame 28 has a plate-like shape that expands in a direction perpendicular to the circumferential direction and extends in the radial direction. The frame 28 connects the outer peripheral portion and the inner peripheral portion of the body main portion 11. The circumferential dimension (width dimension) of the frame 28 is substantially constant along the radial direction.

As shown in FIGS. 3 and 9, the flange hole portion 23*b* penetrates the body flange 12 in the up-down direction. The flange hole portion 23*b* has a circular hole shape extending in the up-down direction. The inner diameter dimension of the flange hole portion 23*b* is smaller than the inner diameter dimension of the accommodation hole portion 23*c*. In the present embodiment, the inner diameter dimension of the flange hole portion 23*b* is the same as the inner diameter dimension of the bearing hole portion 23*d*. A bearing member 25 such as a sliding bearing is fitted in the flange hole portion 23*b*, for example.

In addition, the body flange 12 has a locking groove 12*a*. The locking groove 12*a* has a groove shape that is depressed from the inner peripheral surface of the body flange 12 toward the radially outer side. The locking groove 12*a* extends in the up-down direction and is open to the upper surface and the lower surface of the body flange 12.

As shown in FIGS. 1, 2, and 9, the operation portion 21 is a notch-shaped recess portion depressed to the radially inner side from the outer peripheral surface of the body 1. In the present embodiment, the operation portion 21 is disposed on the body flange 12 and is open to the outer peripheral surface of the body flange 12. A plurality of the operation portions 21 are provided at intervals from each other in the circumferential direction.

In a case of attaching or detaching the body 1 to and from the spindle 85, a work tool having a hook shape, such as a hook wrench (not shown), is locked to the operation portion 21. In a state in which the work tool is locked to the operation portion 21, the body 1 can be attached to and detached from the spindle 85 by operating the work tool and rotating the body 1 in the circumferential direction with respect to the spindle 85.

As shown in FIG. 3, the drainage hole 22 penetrates the support protrusion piece 17 in the up-down direction. The drainage hole 22 is disposed in each of the plurality of support protrusion pieces 17, that is, a plurality of the drainage holes 22 are provided. An upper end portion of the drainage hole 22 is open to an upper surface of the support protrusion piece 17 and is located on the radially inner side with respect to the skirt portion 11*h*. Specifically, the upper end portion of the drainage hole 22 is open to a step portion that is located between the bearing hole portion 23*d* and the lower-side hole portion 23*f* and faces the upper side. A lower end portion of the drainage hole 22 is open to a lower surface of the support protrusion piece 17. That is, the drainage hole 22 allows an inner portion of the through-hole 23 and an external portion of the body 1 to communicate each other. A liquid, such as water, accumulated in the through-hole 23 is discharged to the outside of the capping head 10 through the drainage hole 22.

The pressure block 2 is disposed on the lower side of the body 1. The pressure block 2 has a substantially bottomed cylindrical shape centered on the center axis O and extends in the up-down direction. The pressure block 2 is fastened to a lower end portion of the elevation shaft 81 by, for example, threading or the like, and is fixed to the elevation shaft 81. During the capping, a bottom wall of the pressure block 2 comes into contact with the top wall of the cap 300 from above and presses the top wall (see FIG. 12).

As shown in FIG. 3, a part of the pressure block 2 is accommodated in the accommodation cylinder 16 of the body 1. Specifically, the upper side portion of the pressure block 2 is inserted into the accommodation cylinder 16. The position of the upper end surface of the pressure block 2 in the up-down direction is substantially the same as the position of the lower surface 1*b* of the body 1 in the up-down direction. That is, the upper side portion of the pressure block 2 is accommodated in the accommodation cylinder 16 that protrudes downward from the lower surface 1*b*, and thus the pressure block 2 is not inserted into a portion of the body 1 located above the lower surface 1*b* (that is, a portion of the body 1 located above the bottom wall portion 11*d*).

It should be noted that the pressure block 2 need not necessarily be one of the components of the capping head 10. In this case, the pressure block 2 is one of the components of the spindle assembly 80. That is, in this case, the spindle assembly 80 further includes the pressure block 2.

As shown in FIGS. 1 to 4, the swing shaft 3 is attached to the body 1 and supports the cam follower 4 and the forming roller 5. The swing shaft 3 connects the cam follower 4 and the forming roller 5. The swing shaft 3 supports the cam follower 4 and the forming roller 5 at both end portions in the up-down direction. Specifically, the swing shaft 3 rotatably supports the cam follower 4 at an upper end portion thereof and rotatably supports the forming roller 5 at a lower end portion thereof. The swing shaft 3 is rotated around the shaft center axis A by the cam follower 4 and the biasing member 6, thereby swinging (approaching and spacing away) the forming roller 5 toward the peripheral wall 301 of the cap 300.

An intermediate portion of the swing shaft 3, which is located between both end portions in the up-down direction, is disposed (housed) inside the through-hole 23. A plurality of the swing shafts 3 are provided in the circumferential direction. The number of the swing shafts 3 is the same as the number of the cam followers 4 and is the same as the number of the forming rollers 5.

The swing shaft 3 has the support shaft 31, an upper arm 32, and a lower arm 33.

As shown in FIG. 3, the support shaft 31 has a substantially cylindrical shape centered on the shaft center axis A and extends in the up-down direction. An upper end portion of the support shaft 31 protrudes upward from the upper surface 1*a* of the body 1. A lower end portion of the support shaft 31 protrudes downward from the lower surface 1*b* of the body 1 and also protrudes downward from the support protrusion piece 17.

The support shaft 31 is, for example, supported by the body 1 via bearing members 24 and 25 such as sliding bearings. A plurality (a pair in the present embodiment) of the bearing members 24 and 25 that support each the support shaft 31 are provided at intervals from each other in the up-down direction. Specifically, an upper side portion of the support shaft 31 is supported by the body flange 12 via the bearing member 25 on the upper side. A lower side portion of the support shaft 31 is supported by the support protrusion piece 17 via the bearing member 24 on the lower side. That is, the support shaft 31 is rotatably supported by the body 1 via a pair of bearing members 24 and 25 that are provided in the flange hole portion 23*b* and the bearing hole portion 23*d*. An intermediate portion of the support shaft 31, which is located between the upper end portion and the lower end portion, is disposed in the through-hole 23. The support shaft 31 can rotationally move within a predetermined range around the shaft center axis A.

The support shaft 31 has a large-diameter portion 31*a*. The large-diameter portion 31*a* has an outer diameter dimension larger than that of portions of the support shaft 31 other than the large-diameter portion 31*a*. The large-diameter portion 31*a* has a notch-shaped locking recess portion (not shown) that is depressed from an outer peripheral surface of the large-diameter portion 31*a* toward the inner side in the shaft radial direction.

As shown in FIG. 2, the upper arm 32 is disposed on the upper side of the body 1 and connects the support shaft 31 to the cam follower 4. The upper arm 32 is fixed to the upper end portion of the support shaft 31 and extends toward the outer side in the shaft radial direction from the support shaft 31. Specifically, the upper arm 32 extends from the support shaft 31 toward one circumferential side C1.

The upper arm 32 has an upper clamp portion 32*a* that surrounds the support shaft 31 around its axis (shaft circumferential direction) and is deformable to press an outer peripheral surface of the support shaft 31. The upper clamp portion 32*a* is a curved wall portion extending in the shaft circumferential direction when seen in the up-down direction. By threading a fastening thread 34 into the upper arm 32, the upper clamp portion 32*a* is deformed to narrow its diameter in the shaft radial direction. Therefore, an inner peripheral surface of the upper clamp portion 32*a* and the outer peripheral surface of the support shaft 31 are tightly adhered to each other, thereby fixing the upper arm 32 to the support shaft 31.

As shown in FIG. 1, the lower arm 33 is disposed on the lower side of the body 1 and connects the support shaft 31 to the forming roller 5. The lower arm 33 is fixed to the lower end portion of the support shaft 31 and extends toward the outer side in the shaft radial direction from the support shaft 31. Specifically, the lower arm 33 extends from the support shaft 31 toward one circumferential side C1.

The lower arm 33 has a lower clamp portion 33*a* that surrounds the support shaft 31 around its axis (shaft circumferential direction) and is deformable to press an outer peripheral surface of the support shaft 31. The lower clamp portion 33*a* is a curved wall portion extending in the shaft circumferential direction when seen in the up-down direction. By threading a fastening thread 35 into the lower arm 33, the lower clamp portion 33*a* is deformed to narrow its diameter in the shaft radial direction. Therefore, an inner peripheral surface of the lower clamp portion 33*a* and the outer peripheral surface of the support shaft 31 are tightly adhered to each other, thereby fixing the lower arm 33 to the support shaft 31.

Figure 5:
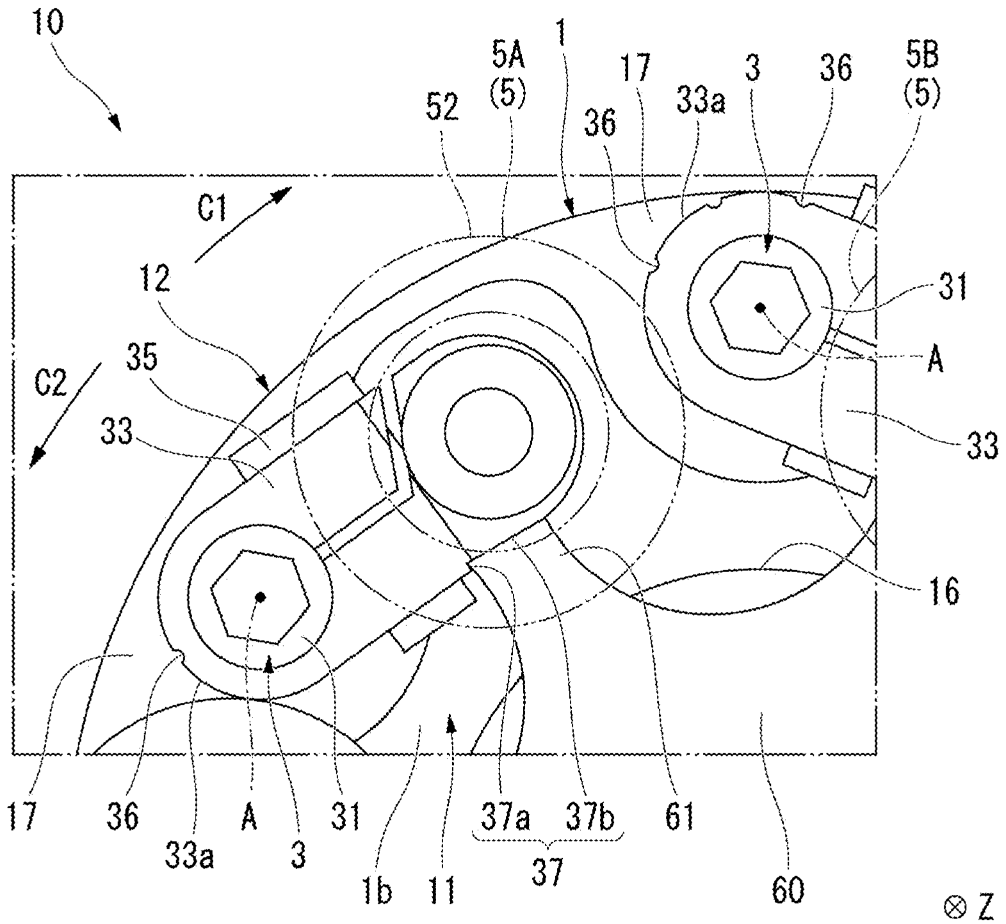
FIG. 5 is an enlarged view of a V part of FIG. 4.
Figure 6:
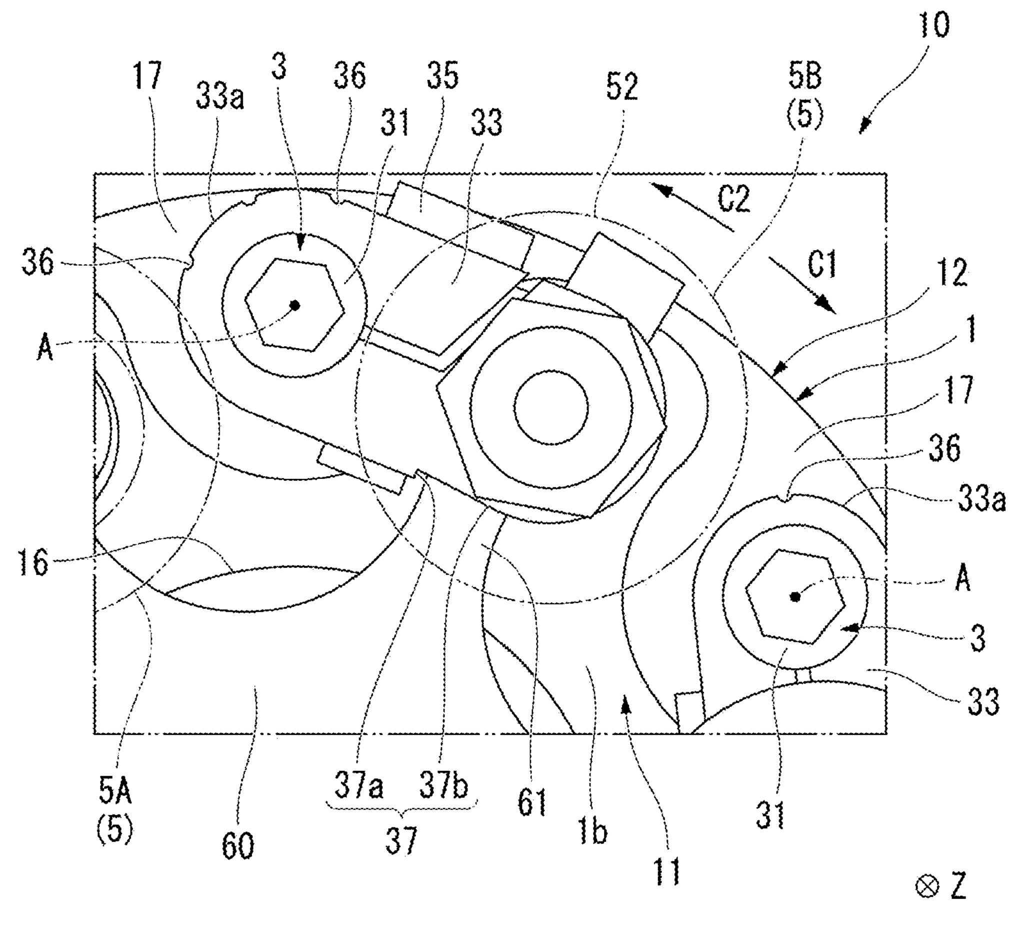
FIG. 6 is an enlarged view of a VI part of FIG. 4.

At least one of the upper clamp portion 32*a* or the lower clamp portion 33*a* has a deformation assist groove 36 disposed on the clamp portion peripheral surface and extending in the up-down direction. As shown in FIGS. 5 and 6, in the present embodiment, at least the lower clamp portion 33*a* has the deformation assist groove 36. The deformation assist groove 36 has a groove shape that is depressed to the inner side in the shaft radial direction from the outer peripheral surface (clamp portion peripheral surface) of the lower clamp portion 33*a* and that extends in the up-down direction.

A plurality of the deformation assist groove 36 may be provided in the outer peripheral surface of the lower clamp portion 33*a* (or the upper clamp portion 32*a*) and arranged in the shaft circumferential direction, or one deformation assist groove 36 may be provided.

In the present embodiment, one deformation assist groove 36 is provided in the lower clamp portion 33*a* of the lower arm 33 that supports a thread forming roller 5A, which will be described below, among a plurality of the lower arms 33. In addition, the plurality of deformation assist grooves 36 are provided in the lower clamp portions 33*a* of the lower arms 33 that support a tuck under forming roller 5B, which will be described below, among the plurality of lower arms 33 at intervals from each other in the shaft circumferential direction. However, the number of the deformation assist grooves 36 provided in each lower clamp portion 33*a* is not limited to the example of the present embodiment.

The deformation assist groove 36 is, for example, an R-groove (round groove), and a cross-sectional shape of the groove is a recessed arc shape. A groove width of the deformation assist groove 36 is, for example, 1.5 mm. The number of the deformation assist grooves 36 provided in the lower clamp portion 33*a* (or upper clamp portion 32*a*) is, for example, three.

In addition, the lower arm 33 has a step portion 37 disposed on a surface of the lower arm 33 facing the radially inner side. Specifically, the step portion 37 is disposed at an end portion of the one circumferential side C1 on the surface of the lower arm 33 facing the radially inner side. A depth in which the step portion 37 is depressed from the surface facing of the lower arm 33 the radially inner side to the radially outer side is larger toward the other circumferential side C2.

The step portion 37 has a wall surface 37*a* facing the one circumferential side C1, and an inclined surface 37*b* that faces the radially inner side extends to the radially outer side toward the other circumferential side C2.

As shown in FIGS. 2 and 3, the cam follower 4 is disposed on the upper side of the body 1. The cam follower 4 comes into contact with the outer peripheral surface of the cone cam 7 and rolls on the outer peripheral surface of the cone cam 7. Specifically, the cam follower 4 rolls on the large-diameter rolling surface 72, the taper rolling surface 73, and the small-diameter rolling surface 71, which will be described below, of the outer peripheral surface of the cone cam 7. The cam follower 4 engages with the cone cam (cam) 7.

A plurality of the cam followers 4 are provided and arranged in the circumferential direction. In the present embodiment, six cam followers 4 are provided at intervals from each other in the circumferential direction.

The cam follower 4 has a shaft portion 41 that extends in the up-down direction and a rolling element 42 that is rotatably supported by a lower end portion of the shaft portion 41 and is pressed against the outer peripheral surface of the cone cam 7 by a biasing force of the biasing member 6, which will be described below.

The shaft portion 41 extends parallel to the shaft center axis A and is supported by the end portion of the upper arm 32 on one circumferential side C1. The lower end portion of the shaft portion 41 faces the upper surface 1*a* of the body 1 with a gap therebetween from above.

The rolling element 42 has an annular shape with an outer diameter dimension larger than an outer diameter dimension of the shaft portion 41 and is disposed coaxially with the center axis of the shaft portion 41. The rolling element 42 is attached to the lower end portion of the shaft portion 41 via, for example, a bearing member such as a rolling bearing. The rolling element 42 is rotatable around the center axis of the shaft portion 41. The lower surface of the rolling element 42 faces the upper surface 1*a* of the body 1 with a gap therebetween.

As shown in FIGS. 1, 3, and 4, the forming roller 5 is disposed on the lower side of the body 1 and on the radially outer side of the pressure block 2. The forming roller 5 is connected to the cam follower 4 via the swing shaft 3 and moves in the radial direction as the cam follower 4 moves in the radial direction. That is, the capping head 10 has a swinging means that rotates the swing shaft 3 around its axis (shaft center axis A) to swing the forming roller 5 in the radial direction, and in the present embodiment, the swinging means includes a cone cam 7, a cam follower 4 that engages with the cone cam 7, and a biasing member 6 that biases the swing shaft 3 around the axis.

A plurality of the forming rollers 5 are provided in the same number as the number of the cam followers 4 and are arranged in the circumferential direction. In the present embodiment, six forming rollers 5 are provided at intervals from each other in the circumferential direction. The six (plurality of) forming rollers 5 are disposed around the center axis O at equal pitches. It should be noted that the phrase "are disposed around the center axis O at equal pitches" in the present embodiment means that, as shown in FIG. 4, when seen in the axis direction (from below), in a case in which a center angle formed between the center axes of two forming rollers 5 adjacent to each other in the circumferential direction with the central axis O as a center is defined, the difference between each of six center angles is, for example, within 5°, and is substantially equal. A roll diameter of the forming roller 5 (specifically, a roller main body 52 described below) is, for example, φ26 mm.

As shown in FIG. 1, the forming roller 5 includes a roller shaft 51 that extends in the up-down direction, a roller main body 52 that is connected to the roller shaft 51 and presses the peripheral wall 301 of the cap 300, and a roller biasing portion 53.

The roller shaft 51 is attached to the end portion of the lower arm 33 on one circumferential side C1 via a bearing member such as a sliding bearing (not shown). The roller shaft 51 is rotatable around the center axis of the roller shaft 51 (roller center axis) with respect to the lower arm 33 and is movable within a predetermined range in the up-down direction.

The roller main body 52 has a disk shape with an outer diameter dimension larger than an outer diameter dimension of the roller shaft 51 and is disposed coaxially with the center axis of the roller shaft 51. The roller main body 52 is connected to a lower end portion of the roller shaft 51. The roller main body 52 is integrally formed with the roller shaft 51 as a single member. The roller main body 52 is disposed below the bottom wall of the pressure block 2.

The roller biasing portion 53 is an elastic member such as a compression coil spring. The roller biasing portion 53 biases the roller shaft 51 and the roller main body 52 to the upper side with respect to the lower arm 33. The roller shaft 51 and the roller main body 52 are movable downward against a biasing force of the roller biasing portion 53.

An upper portion of the roller shaft 51 and the roller biasing portion 53 are accommodated in the roller shaft accommodation pocket 19 of the body 1.

As shown in FIG. 12, the plurality of forming rollers 5 include a plurality of thread forming rollers (RO rollers) 5A that form a thread portion to be threaded with the mouthpiece portion 200 of the threaded can B on the peripheral wall 301 of the cap 300, and at least one tuck under forming roller (PP roller) 5B that tucks under forming the lower end of the peripheral wall 301 of the cap 300 onto the mouthpiece portion 200. As shown in FIGS. 1 to 4, in the present embodiment, the number of the thread forming rollers 5A is four, and the number of the tuck under forming rollers 5B is two. That is, the number of the thread forming rollers 5A is larger than the number of the tuck under forming rollers 5B. The number of the thread forming rollers 5A is twice the number of the tuck under forming rollers 5B. The thread forming roller 5A and the tuck under forming roller 5B are each supported by a plurality of the support shafts 31. Each roller 5 is supported by the support shaft 31 via the lower arm 33.

Although not shown, the thread forming roller 5A forms the thread portion (female thread portion) that follows the shape of the male thread portion of the mouthpiece portion 200 by pressing the peripheral wall 301 of the cap 300 to the radially inner side. The positions of the roller main bodies 52 of the thread forming rollers 5A adjacent to each other in the circumferential direction are displaced from each other in the up-down direction. That is, the positions of the thread forming rollers 5A adjacent to each other in the circumferential direction are displaced from each other in the up-down direction.

The forming distal end load in which the thread forming roller 5A presses the peripheral wall 301 of the cap 300 is, for example, 110 N or less, more preferably 100 N or less, and still more preferably 90 N or less. The term "forming distal end load" in the present embodiment means a load at a contact point (distal end) on the outer peripheral edge of the roller main body 52 that comes into contact with the peripheral wall 301 of the cap.

A torque with which the thread forming roller 5A presses the peripheral wall 301 of the cap 300 around the axis (shaft center axis) A of the support shaft 31 is, for example, 3.0 N·m or less, and is more preferably 2.5 N·m or less.

Figure 17:
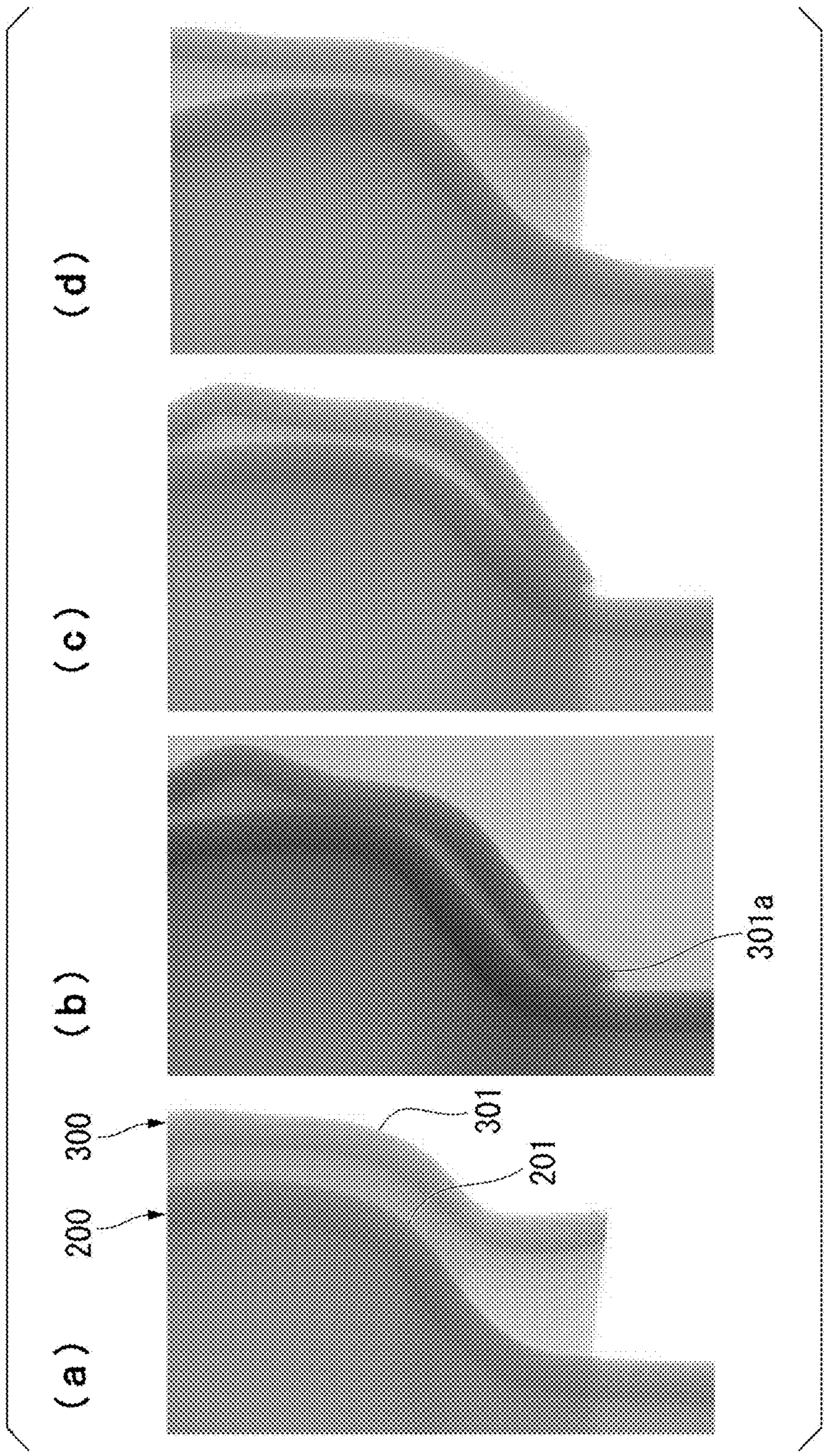
FIG. 17 is a cross-sectional (longitudinal cross-section) image showing a vicinity of a lower end of a peripheral wall of a cap after capping and is a view showing a tuck under forming evaluation.

The tuck under forming roller 5B performs the tuck under forming of the lower end of the peripheral wall 301 into a shape that follows the lower portion of the bulging portion 201 of the mouthpiece portion 200 by pressing the lower end of the peripheral wall 301 of the cap 300 to the radially inner side (see (c) of FIG. 17 and the like). The positions of a plurality of the tuck under forming rollers 5B in the up-down direction of each roller main body 52 are the same as each other. That is, the positions of the plurality of tuck under forming rollers 5B in the up-down direction are the same as each other.

The forming distal end load in which the tuck under forming roller 5B presses the lower end of the peripheral wall 301 of the cap 300 is, for example, 90 N or less, more preferably 80 N or less, and still more preferably 75 N or less.

A torque with which the tuck under forming roller 5B presses the lower end of the peripheral wall 301 of the cap 300 around the axis A of the support shaft 31 is, for example, 2.5 N·m or less, and is more preferably 2.0 N·m or less.

As shown in FIG. 4, the plurality of tuck under forming rollers 5B are disposed at positions that are rotationally symmetrical with respect to the center axis O, that is, the plurality of tuck under forming rollers 5B are disposed at equal pitches in the circumferential direction. In the present embodiment, two tuck under forming rollers 5B are disposed at positions that are rotationally symmetrical with respect to the center axis O by 180°. Therefore, four thread forming rollers 5A other than the two tuck under forming rollers 5B are disposed at unequal pitches in the circumferential direction.

As shown in FIG. 3, the biasing member 6 is an elastic member that is elastically deformable. In the present embodiment, the biasing member 6 is a torsion coil spring extending spirally around the axis (around the shaft center axis A) of the support shaft 31 (swing shaft 3). The support shaft 31 is inserted into the biasing member 6. The biasing member 6 surrounds a part of the support shaft 31 (the swing shaft 3) in the up-down direction around the support shaft 31. Specifically, the biasing member 6 surrounds the vicinity of the center portion of the support shaft 31 in the up-down direction from the outer side in the shaft radial direction around the shaft center axis A.

The biasing member 6 is disposed in the main body hole portion 23*a* of the body main portion 11, and specifically, is disposed (accommodated) in the accommodation hole portion 23*c*. The biasing member 6 is disposed over the opening portion 23*e* and the lower-side hole portion 23*f*. The inner diameter dimension of the biasing member 6 is smaller than the outer diameter dimension of the large-diameter portion 31*a* of the support shaft 31. In addition, the outer diameter dimension of the biasing member 6 is larger than the inner diameter dimension of the flange hole portion 23*b* of the body flange 12. Therefore, the biasing member 6 is disposed in the up-down direction to be interposed between the upper surface of the large-diameter portion 31*a* and the lower surface of the body flange 12.

The upper end portion is locked to the locking groove 12*a* of the body flange 12, of both end portions of the biasing member 6 in the up-down direction. In addition, the lower end portion of the biasing member 6 is locked to a locking recess portion provided in the large-diameter portion 31*a* of the support shaft 31. That is, the upper end portion of the biasing member 6 is locked to the body flange 12, and the lower end portion of the biasing member 6 is locked to the support shaft 31 (swing shaft 3).

The biasing member 6 biases the support shaft 31 in the shaft circumferential direction, thereby biasing the cam follower 4 and the forming roller 5, which are supported by the swing shaft 3, toward the radially inner side. That is, the biasing member 6 biases the cam follower 4 and the forming roller 5 toward the radially inner side via the swing shaft 3.

A plurality of the biasing members 6 are provided and arranged in the circumferential direction. The number of the biasing members 6 is the same as the number of the swing shafts 3, is the same as the number of the cam followers 4, and is the same as the number of the forming rollers 5. In the present embodiment, six biasing members 6 are provided at intervals from each other in the circumferential direction. Each biasing member 6 is disposed in each through-hole 23. In addition, the biasing member 6 is accommodated in the through-hole 23 without being entirely exposed to the outer peripheral portion of the body main portion 11.

The cone cam 7 has the small-diameter rolling surface 71, the large-diameter rolling surface 72, the taper rolling surface 73, and a relief taper surface 74.

The small-diameter rolling surface 71 is a portion having the smallest diameter on the outer peripheral surface of the cone cam 7. An outer diameter dimension (diameter dimension) of the small-diameter rolling surface 71 is constant along the up-down direction.

The large-diameter rolling surface 72 is disposed at the lower end portion of the outer peripheral surface of the cone cam 7. An outer diameter dimension of the large-diameter rolling surface 72 is larger than the outer diameter dimension of the small-diameter rolling surface 71.

The taper rolling surface 73 is disposed between the small-diameter rolling surface 71 and the large-diameter rolling surface 72 on the outer peripheral surface of the cone cam 7 in the up-down direction. The taper rolling surface 73 has a tapered shape that extends to the radially outer side toward the lower side. That is, the diameter of the taper rolling surface 73 is larger toward the lower side. An upper end portion of the taper rolling surface 73 is smoothly connected to a lower end portion of the small-diameter rolling surface 71. A lower end portion of the taper rolling surface 73 is smoothly connected to an upper end portion of the large-diameter rolling surface 72.

The relief taper surface 74 is disposed on an upper side of the small-diameter rolling surface 71 on the outer peripheral surface of the cone cam 7. The relief taper surface 74 is a tapered shape extending to the radially outer side toward the upper side. A lower end portion of the relief taper surface 74 is connected to an upper end portion of the small-diameter rolling surface 71.

In the present embodiment, a displacement amount (that is, an inclination with respect to the center axis O) of the relief taper surface 74 in the radial direction per unit length along the up-down direction in at least the lower side portion is smaller than a displacement amount of the taper rolling surface 73 in the radial direction per unit length along the up-down direction. That is, an inclination of the relief taper surface 74 with respect to the center axis O is smaller (gentler) than an inclination of the taper rolling surface 73 with respect to the center axis O.

As a result, a length of the relief taper surface 74 in the up-down direction is sufficiently ensured, thereby suppressing the interference between the shaft portion 41 of the cam follower 4, the upper arm 32, and the relief taper surface 74 even in a state in which the cone cam 7 is disposed at the descent end position with respect to the body 1, although not shown.

Hereinafter, a method (assembly method) of attaching the capping head 10 to the cone cam 7 will be described.

As shown in FIG. 4, in the present embodiment, an assembly jig (setting block) 60 is used in a case of attaching the capping head 10 to the cone cam 7. The assembly jig 60 is used by being inserted into the radially inner side of the plurality of lower arms 33 in a state in which the pressure block 2 on the lower side of the body 1 is detached from the elevation shaft 81.

The assembly jig 60 has a columnar shape centered on the center axis O. The assembly jig 60 has a substantially star shape when seen in the up-down direction. The assembly jig 60 has a plurality of locking arms 61 disposed at intervals from each other in the circumferential direction. The number of the locking arms 61 is the same as the number of the forming rollers 5, and is six in the present embodiment.

In a case of attaching the assembly jig 60 to the capping head 10, first, the assembly jig 60 is disposed on the lower side of the capping head 10, and each locking arm 61 is disposed between the roller main bodies 52 adjacent to each other in the circumferential direction, although not shown. In this state, the assembly jig 60 is moved upward toward the body 1, so that the assembly jig 60 is inserted up to the upper side of the roller main body 52.

Next, the assembly jig 60 is rotated in the other circumferential side C2 by using the work tool such as a hexagonal wrench (not shown). As a result, a radially outer end portion of the locking arm 61 is locked to the step portion 37 as shown in FIGS. 5 and 6 while sliding on the surface facing the radially inner side of the lower arm 33. In addition, in this case, the lower arm 33 is pressed to the radially outer side by the locking arm 61, the swing shaft 3 rotationally moves in the shaft circumferential direction against the biasing force of the biasing member 6, and the cam follower 4 and the forming roller 5 move to the radially outer side.

In addition, the rotation of the assembly jig 60 toward the other circumferential side C2 is restricted by the contact of the locking arm 61 with the wall surface 37*a* of the step portion 37 from the one circumferential side C1.

In this way, in a state in which the plurality of cam followers 4 are moved to the radially outer side (open state), the lower end portion of the cone cam 7 can be inserted into the radially inner side of these cam followers 4.

As shown in FIG. 3, after the cone cam 7 is inserted into the radially inner side of the plurality of cam followers 4, the assembly jig 60 is detached from the capping head 10 by reversing the procedure described above. As a result, the swing shaft 3 rotationally moves in the shaft circumferential direction by the biasing force of the biasing member 6, the cam follower 4 and the forming roller 5 move to the radially inner side, and each rolling element 42 of the plurality of cam followers 4 comes into contact with the outer peripheral surface of the cone cam 7.

After attaching the capping head 10 to the cone cam 7, the pressure block 2 is inserted into the accommodation cylinder 16 of the body 1, and the pressure block 2 is attached to the elevation shaft 81.

Hereinafter, the spindle assembly 80 according to the present embodiment will be described in detail.

As shown in FIG. 10, the spindle assembly 80 extends in the up-down direction. The capping head 10 is disposed at the lower end portion of the spindle assembly 80. The spindle assembly 80 according to the present embodiment includes the capping head 10, the elevation shaft 81, the spindle 85, and the elevation cylinder 90.

The elevation shaft 81 extends in the up-down direction. The pressure block 2 is attached and fixed to the lower end portion of the elevation shaft 81 by threading or the like (see FIG. 11).

The elevation shaft 81 includes a shaft portion 82 that extends in the up-down direction centered on the center axis O, an upper cam follower 83 that moves the elevation shaft 81 in the up-down direction, and a connection arm 84 that connects the shaft portion 82 and the upper cam follower 83.

The spindle 85 has a cylindrical shape extending in the up-down direction centered on the center axis O. The shaft portion 82 of the elevation shaft 81 is inserted into the spindle 85. The spindle 85 is rotatable around the center axis O with respect to the shaft portion 82. The body 1 is attached and fixed to the lower end portion of the spindle 85 by threading or the like.

Therefore, the body 1 is rotatable around the center axis O with respect to the pressure block 2.

The spindle 85 includes a spindle gear 86 that rotates the spindle 85 around the center axis O. The spindle gear 86 is an external gear centered on the center axis O. In the present embodiment, the spindle gear 86 is disposed at an upper end portion of the spindle 85.

The elevation cylinder 90 has a cylindrical shape extending in the up-down direction centered on the center axis O. The shaft portion 82 and the spindle 85 of the elevation shaft 81 are inserted into the elevation cylinder 90. In the present embodiment, the elevation cylinder 90 is disposed below the spindle gear 86. The elevation cylinder 90 is movable in the up-down direction with respect to the elevation shaft 81 and the spindle 85.

The elevation cylinder 90 includes the cone cam 7 having a cylindrical shape, and a lower cam follower 91 that moves the elevation cylinder 90 in the up-down direction.

The cone cam 7 is disposed at a lower end portion of the elevation cylinder 90. The lower cam follower 91 is disposed at an upper end portion of the elevation cylinder 90.

Next, the capping device 120 according to the present embodiment and the capping method using the same will be described.

Figure 11:
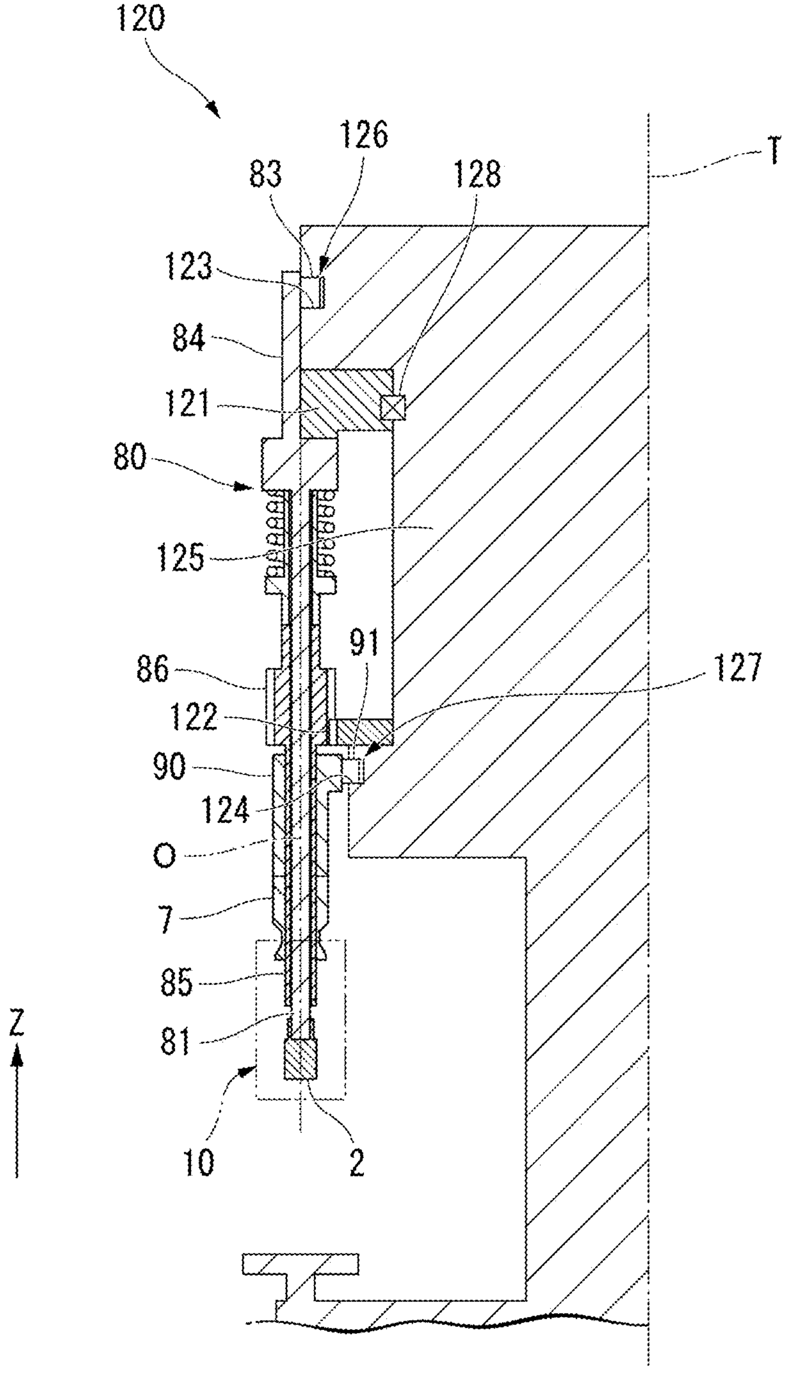
FIG. 11 is a cross-sectional view (longitudinal cross-sectional view) showing a part of the capping device according to the present embodiment and showing the capping head in a simplified manner.

As shown in FIG. 11, the capping device 120 includes a device base portion 125 centered on a turret axis T, a turret 121 that rotates around the turret axis T, a spindle assembly 80 disposed on an outer peripheral portion of the turret 121, a fixed gear 122 that meshes with the spindle gear 86 and extends around the turret axis T, an upper cam 123 that extends around the turret axis T and with which the upper cam follower 83 engages, and a lower cam 124 that extends around the turret axis T and with which the lower cam follower 91 engages.

The turret axis T is parallel to the center axis O and extends in the up-down direction. The turret 121 has a substantially cylindrical shape centered on the turret axis T. It should be noted that, in FIG. 11, only an upper end portion of the turret 121 is shown, and the portions other than the upper end portion are not shown. The turret 121 is connected to the device base portion 125 via a bearing member 128 that extends around the turret axis T. The turret 121 is rotationally driven around the turret axis T with respect to the device base portion 125 by a driving motor (not shown) or the like.

In the present embodiment, a direction in which the turret axis T extends is referred to as a turret axis direction. The turret axis direction corresponds to the up-down direction (Z-axis direction).

A direction orthogonal to the turret axis T is referred to as a turret radial direction. In the turret radial direction, a direction approaching the turret axis T is referred to as an inner side in the turret radial direction, and a direction spaced away from the turret axis T is referred to as an outer side in the turret radial direction.

Figure 13:
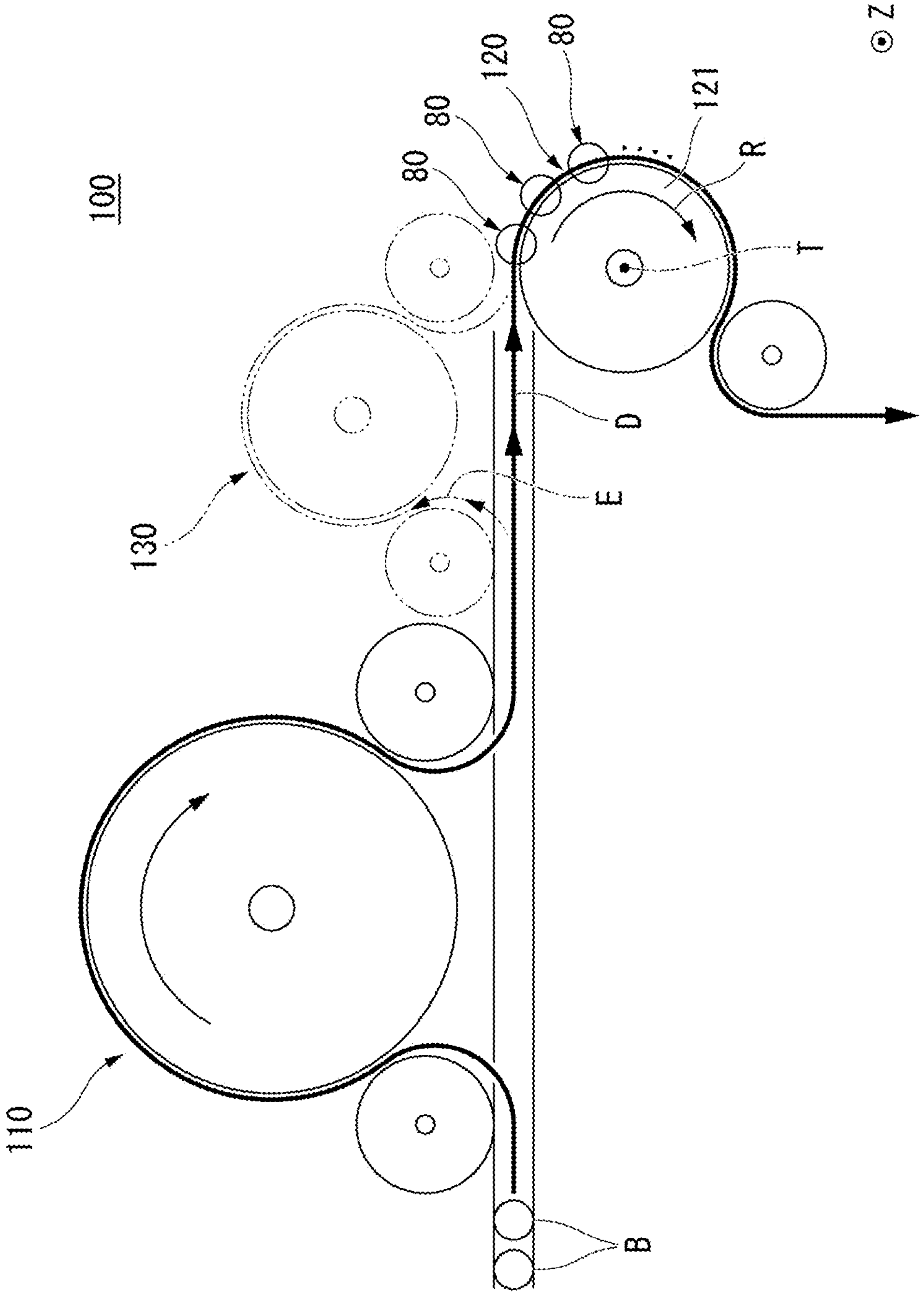
FIG. 13 is a top view schematically showing a capping system according to the present embodiment.

A direction of circling around the turret axis T is referred to as a turret circumferential direction. As shown in FIGS. 12 and 13, in the present embodiment, in the turret circumferential direction, a direction in which the turret 121 rotates is referred to as a turret rotation direction R, and a rotation direction opposite to the turret rotation direction R is referred to as an opposite side to the turret rotation direction R or a reverse turret rotation direction.

It should be noted that FIG. 12 is a side view schematically showing the outer peripheral portion of the capping device 120 in an exploded manner on a plane, and showing an operation of each of the spindle assembly 80 and the capping head 10 in a case in which the cap 300 is attached (subject to capping) to the mouthpiece portion 200 of the threaded can B.

As shown in FIG. 11, the spindle assembly 80 is held to be movable in the up-down direction on the outer peripheral portion of the turret 121. Specifically, a part of the elevation cylinder 90 and a part of the connection arm 84 in the spindle assembly 80 engage with a groove portion (not shown) disposed on the outer peripheral portion of the turret 121. The groove portion of the turret 121 extends in the up-down direction, and the spindle assembly 80 is slidable in the up-down direction with respect to the turret 121 in a state of being held by the groove portion of the turret 121.

A plurality of the spindle assemblies 80 are provided and arranged around the turret axis T on the outer peripheral portion of the turret 121. The plurality of spindle assemblies 80 are arranged around the turret axis T at equal pitches on the outer peripheral portion of the turret 121. The number of the spindle assemblies 80 is, for example, 10 or more.

The fixed gear 122 is an annular plate shape external gear centered on the turret axis T. The fixed gear 122 is fixed to the device base portion 125 and extends in the turret circumferential direction. A dimension of the spindle gear 86 in the up-down direction is larger than a dimension of the fixed gear 122 in the up-down direction. Therefore, even in a case in which the spindle assembly 80 moves in the up-down direction, the meshing state between the fixed gear 122 and the spindle gear 86 is well maintained.

The upper cam 123 is a groove having an annular shape and extending over the whole circumference around the turret axis T. The upper cam 123 is provided on an outer peripheral surface of the device base portion 125. In the present embodiment, the upper cam 123 is disposed above the fixed gear 122. The position of the upper cam 123 in the up-down direction is changed toward the circumference of the turret axis T.

As shown in FIG. 12, the upper cam 123 includes a head descent portion 123*a*, a horizontal portion 123*b*, and a head ascent portion 123*c*. The head descent portion 123*a*, the horizontal portion 123*b*, and the head ascent portion 123*c* are arranged in this order along the turret rotation direction R. The upper cam 123 has only one set of the head descent portion 123*a*, the horizontal portion 123*b*, and the head ascent portion 123*c*.

The head descent portion 123*a* extends downward toward the turret rotation direction R.

The horizontal portion 123*b* is connected to an end portion of the head descent portion 123*a* in the turret rotation direction R and extends in the turret rotation direction R. A position of the horizontal portion 123*b* in the up-down direction is constant along the turret rotation direction R.

The head ascent portion 123*c* is connected to an end portion of the horizontal portion 123*b* in the turret rotation direction R and extends upward toward the turret rotation direction R.

The upper cam 123 and the upper cam follower 83 that engages with the upper cam 123 constitute the upper cam mechanism 126. That is, the capping device 120 includes the upper cam mechanism 126.

The lower cam 124 is a groove having an annular shape and extending over the whole circumference around the turret axis T. The lower cam 124 is provided on the outer peripheral surface of the device base portion 125. In the present embodiment, the lower cam 124 is disposed below the fixed gear 122. The position of the lower cam 124 in the up-down direction is changed toward the circumference of the turret axis T.

The lower cam 124 includes a front descent portion 124*a*, a first horizontal portion 124*b*, a descent portion 124*c*, a forming portion 124*d*, an ascent portion 124*e*, a second horizontal portion 124*f*, and a rear ascent portion 124*g*. The front descent portion 124*a*, the first horizontal portion 124*b*, the descent portion 124*c*, the forming portion 124*d*, the ascent portion 124*e*, the second horizontal portion 124*f*, and the rear ascent portion 124*g* are arranged in this order along the turret rotation direction R. The lower cam 124 has only one set of the front descent portion 124*a*, the first horizontal portion 124*b*, the descent portion 124*c*, the forming portion 124*d*, the ascent portion 124*e*, the second horizontal portion 124*f*, and the rear ascent portion 124*g*. That is, the lower cam 124 is provided with only one set of the descent portion 124*c*, the forming portion 124*d*, and the ascent portion 124*e*.

The front descent portion 124*a* extends downward toward the turret rotation direction R. A position of the front descent portion 124*a* in the turret circumferential direction is the same as a position of the head descent portion 123*a* in the turret circumferential direction.

The first horizontal portion 124*b* is connected to an end portion of the front descent portion 124*a* in the turret rotation direction R and extends in the turret rotation direction R. A position of the first horizontal portion 124*b* in the up-down direction is constant along the turret rotation direction R. A position of the first horizontal portion 124*b* in the turret circumferential direction is the same as a position in the turret circumferential direction at the end portion of the horizontal portion 123*b* in the reverse turret rotation direction.

The descent portion 124*c* is connected to an end portion of the first horizontal portion 124*b* in the turret rotation direction R and extends downward toward the turret rotation direction R.

The forming portion 124*d* is connected to an end portion of the descent portion 124*c* in the turret rotation direction R and extends in the turret rotation direction R. The position of the forming portion 124*d* in the up-down direction is constant along the turret rotation direction R.

The ascent portion 124*e* is connected to an end portion of the forming portion 124*d* in the turret rotation direction R, and extends upward toward the turret rotation direction R.

The positions of the descent portion 124*c*, the forming portion 124*d*, and the ascent portion 124*e* in the turret circumferential direction are the same as the positions in the turret circumferential direction at the intermediate portion located between both end portions of the horizontal portion 123*b* in the turret circumferential direction.

The second horizontal portion 124*f* is connected to an end portion of the ascent portion 124*e* in the turret rotation direction R and extends in the turret rotation direction R. A position of the second horizontal portion 124*f* in the up-down direction is constant along the turret rotation direction R. A position of the second horizontal portion 124*f* in the turret circumferential direction is the same as a position in the turret circumferential direction at the end portion of the horizontal portion 123*b* in the turret rotation direction R.

The rear ascent portion 124*g* is connected to an end portion of the second horizontal portion 124*f* in the turret rotation direction R and extends upward toward the turret rotation direction R. A position of the rear ascent portion 124*g* in the turret circumferential direction is the same as the position of the head ascent portion 123*c* in the turret circumferential direction.

The lower cam 124 and the lower cam follower 91 that engages with the lower cam 124 constitute the lower cam mechanism 127. That is, the capping device 120 includes the lower cam mechanism 127.

In a process in which the spindle assembly 80 is rotated by the turret 121 in the turret rotation direction R around the turret axis T, the upper cam mechanism 126 moves the elevation shaft 81, the pressure block 2, the spindle 85, and the body 1 in the up-down direction. That is, the upper cam mechanism 126 moves the capping head 10 in the up-down direction. In addition, the lower cam mechanism 127 moves the elevation cylinder 90 and the cone cam 7 in the up-down direction.

Here, a process in which the cap 300 is attached (subject to capping) to the mouthpiece portion 200 of the threaded can B by using the capping device 120 will be described in detail.

First, as shown in (a) and (b) of FIG. 12, the cap 300 before the forming is supplied to and placed over the mouthpiece portion 200 of the threaded can B introduced into the capping device 120.

The threaded can B in which the cap 300 is placed over the mouthpiece portion 200 is transported along the outer peripheral portion of the capping device 120 and is disposed directly below the capping head 10 of the spindle assembly 80, as shown in (c) of FIG. 12. Specifically, the center axis O of the spindle assembly 80 and the can axis of the threaded can B are disposed coaxially with each other, and in this disposition relationship, the spindle assembly 80 and the threaded can B move in the turret rotation direction R from (c) of FIG. 12 to (g) of FIG. 12.

As shown in (d) of FIG. 12, the upper cam follower 83 of the spindle assembly 80 is guided from the head descent portion 123*a* of the upper cam 123 to the horizontal portion 123*b*, thereby causing the elevation shaft 81, the pressure block 2, the spindle 85, and the body 1 to move downward (see FIGS. 10 and 11). In addition, the lower cam follower 91 of the spindle assembly 80 is guided from the front descent portion 124*a* of the lower cam 124 to the first horizontal portion 124*b*, thereby causing the cone cam 7 of the elevation cylinder 90 to move downward following the body 1.

Therefore, the contact state between the rolling element 42 of the cam follower 4 and the large-diameter rolling surface 72 of the cone cam 7 is maintained from (c) of FIG. 12 to (d) of FIG. 12 (see FIG. 3).

In (d) of FIG. 12, the pressure block 2 presses the top wall of the cap 300 from above, and the thread forming roller 5A and the tuck under forming roller 5B face the peripheral wall 301 of the cap 300 with a gap therebetween from the radially outer side.

As shown in (e) and (f) of FIG. 12, the lower cam follower 91 is guided from the descent portion 124*c* of the lower cam 124 to the forming portion 124*d*, thereby causing the cone cam 7 of the elevation cylinder 90 to move downward with respect to the body 1. Due to this movement and the biasing force of the biasing member 6, the position at which the rolling element 42 of the cam follower 4 comes into contact with the cone cam 7 is changed from the large-diameter rolling surface 72 to the taper rolling surface 73, and is further changed from the taper rolling surface 73 to the small-diameter rolling surface 71.

As a result, each cam follower 4 is moved to the radially inner side, and each forming roller 5 connected to each cam follower 4 via each swing shaft 3 is also moved to the radially inner side. In addition, in a state in which the fixed gear 122 and the spindle gear 86 mesh with each other, the spindle assembly 80 is moved in the turret rotation direction R, thereby causing the spindle 85 and the body 1 to rotate around the center axis O.

Therefore, each roller 5 of the thread forming roller 5A and the tuck under forming roller 5B comes into contact with the peripheral wall 301 of the cap 300 and rolls on the peripheral wall 301 around the center axis O (can axis). As a result, the thread forming roller 5A forms the thread portion (female thread portion) to be threaded with the male thread portion of the mouthpiece portion 200, on the peripheral wall 301 of the cap 300. In addition, the tuck under forming roller 5B performs the tuck under forming of the lower end of the peripheral wall 301 of the cap 300 onto the lower portion of the bulging portion 201 of the mouthpiece portion 200.

Next, the lower cam follower 91 is guided from the forming portion 124*d* of the lower cam 124 to the ascent portion 124*e*, thereby causing the cone cam 7 of the elevation cylinder 90 to move to the upper side with respect to the body 1. Due to this movement and the biasing force of the biasing member 6, the position at which the rolling element 42 of the cam follower 4 comes into contact with the cone cam 7 is changed from the small-diameter rolling surface 71 to the taper rolling surface 73, and is further changed from the taper rolling surface 73 to the large-diameter rolling surface 72.

As a result, each cam follower 4 is moved to the radially outer side, and each forming roller 5 connected to each cam follower 4 via each swing shaft 3 is also moved to the radially outer side. Therefore, each roller 5 of the thread forming roller 5A and the tuck under forming roller 5B of the rollers 5 is spaced away from the peripheral wall 301 of the cap 300 to the radially outer side.

As shown in (g) of FIG. 12, the upper cam follower 83 is guided from the horizontal portion 123*b* of the upper cam 123 to the head ascent portion 123*c*, thereby causing the elevation shaft 81, the pressure block 2, the spindle 85, and the body 1 to move upward (see FIGS. 10 and 11). As a result, the pressure block 2 is spaced away from the top wall of the cap 300 to the upper side. In addition, the lower cam follower 91 is guided from the second horizontal portion 124*f* of the lower cam 124 to the rear ascent portion 124*g*, by causing the cone cam 7 of the elevation cylinder 90 to move upward following the body 1.

In this manner, the mouthpiece portion 200 of the threaded can B is capped with the cap 300, and the threaded can B is sealed. In the present embodiment, the series of operations in which each roller 5 of the thread forming roller 5A and the tuck under forming roller 5B comes into contact with the peripheral wall 301 of the cap 300, rolls on the peripheral wall 301, and then is spaced away from the peripheral wall 301 is set to be performed once. That is, the capping device 120 performs the capping via a single action.

In addition, in the present embodiment, during the series of operations (single action) in which each roller 5 comes into contact with the peripheral wall 301 of the cap 300, rolls on the peripheral wall 301, and then is spaced away from the peripheral wall 301, each roller 5 (thread forming roller 5A and tuck under forming roller 5B) makes two rotations around a cap center axis (can axis) on the peripheral wall 301 of the cap.

It should be noted that, as described above, the capping head 10 includes the pressure block 2, the thread forming roller 5A, and the tuck under forming roller 5B, and the spindle assembly 80 includes the capping head 10. Therefore, in the present embodiment, it may be said that the spindle assembly 80 includes the pressure block 2, the thread forming roller 5A, and the tuck under forming roller 5B.

Specifically, the spindle assembly 80 includes the pressure block 2 that is disposed in the capping head 10 and that presses the top wall of the cap 300 as the upper cam follower 83 moves to the lower side, the plurality of thread forming rollers 5A that are provided in the capping head 10, that come into contact with the peripheral wall 301 of the cap 300 as the lower cam follower 91 moves to the lower side, that form a thread portion to be threaded with the mouthpiece portion 200 on the peripheral wall 301, and at least one tuck under forming roller 5B that is provided in the capping head 10, that comes into contact with the peripheral wall 301 of the cap 300 as the lower cam follower 91 moves to the lower side, that tucks under forming the lower end of the peripheral wall 301 onto the mouthpiece portion 200.

Hereinafter, the capping system 100 according to the present embodiment will be described.

As shown in FIG. 13, the capping system 100 includes a filler (filling machine) 110 that fills the threaded can B with a content, such as a beverage, and the capping device 120 to which the threaded can B discharged from the filler 110 is supplied.

Reference numeral 130 shown in FIG. 13 represents the layout of a capping device 130 in the related art. In the related art, a transport direction E of the threaded can B, which is discharged from the filler 110 and directed toward the capping device 130, is curved when seen from above.

On the other hand, in the present embodiment, the transport direction D of the threaded can B discharged from the filler 110 and directed toward the capping device 120 extends along a tangent of the outer peripheral portion of the turret 121 when seen in the turret axis direction (that is, when seen from above).

In the present embodiment described above, the body main portion 11 has an outer peripheral wall having a cylindrical shape (outer peripheral surface 1*c*), that is, the body main portion 11 has a cylindrical shape, and the outer shape of the body 1 is simply configured. In addition, the body 1 is provided with the through-hole 23 that penetrates the body 1 in the up-down direction, and the swing shaft 3 that swings the forming roller 5 is inserted into the through-hole 23. In addition, the swing shaft housing portion 18 in which the through-hole 23 is provided is disposed around the periphery of the spindle attachment portion 15. Since the body 1 of the capping head 10 according to the present embodiment has a simple configuration including the body main portion 11 having a cylindrical shape, the spindle attachment portion 15 mounted on a spindle 85, and the swing shaft housing portion 18 in which the through-hole 23 is disposed, the shape of the body 1 is prevented from being complicated, and the structure of the body 1 is simplified while the rigidity of the body 1 is increased. In particular, as in the present embodiment, when the body main portion 11, the spindle attachment portion 15, and the swing shaft housing portion 18 are connected to each other, the above-described operations and effects are further enhanced. It is more preferable that the body main portion 11, the spindle attachment portion 15, and the swing shaft housing portion 18 are integrally formed from a single member.

In addition, the cam follower 4 and the forming roller 5 are connected to both end portions of the swing shaft 3 in the up-down direction, and an intermediate portion of the swing shaft 3 located between the both end portions in the up-down direction and a biasing member 6 fitted over the intermediate portion are accommodated in the through-hole 23 of the body 1. The biasing member 6 is provided to surround a part (intermediate portion) of the swing shaft 3 around its axis and is accommodated in the through-hole 23.

According to the present embodiment, since the configuration is adopted in which a part (intermediate portion) of the swing shaft 3 and the biasing member 6 (hereinafter, referred to as the biasing member 6 or the like) are accommodated inside the body 1, a notch-shaped recess portion or the like, such as in the related art, which is provided to dispose the biasing member or the like in an exposed state on the outer peripheral portion of the body is not necessary. Therefore, in the present embodiment, it is possible to configure the body 1 in a simple shape, and is easy to manufacture. In addition, the strength of the body 1 can be increased by simplifying the shape of the body 1.

Further, by accommodating the biasing member 6 or the like in the body 1, it is possible to suppress the adhesion of a content (particularly a content with sugar content that easily solidifies) of the beverage or the like scattered from the outside of the body 1 to the biasing member 6 and the like. Therefore, the performance (function) of the biasing member 6 and the like can be well maintained for a long period of time, and the maintainability is also good.

In addition, as the rigidity of the body 1 is increased, it is possible to form the body 1 from a material having a lower specific gravity compared to stainless steel or the like, which has been used to form the body in the related art, such as an aluminum alloy, for example, duralumin, an engineering plastic, and a resin material (including a composite resin material), such as a fiber reinforced plastic (FRP), and the like. Therefore, it is easy to achieve weight reduction of the capping head 10. As in the present embodiment, when the body main portion 11 is an integrated body main portion in which the spindle attachment portion 15 and the swing shaft housing portion 18 are provided integrally with the body main portion 11, it is easy to achieve weight reduction of the body main portion 11 by performing cutout or the like while ensuring the rigidity of the body main portion 11.

As described above, with the body 1 of the capping head 10 and the capping head 10, and the spindle assembly 80 and the capping device 120 including the body 1 of the capping head 10 and the capping head 10 according to the present embodiment, the shape of the body 1 can be simplified, the strength of the body 1 can be increased, and the weight reduction of the body 1 can be achieved.

In addition, in the present embodiment, the entire of the biasing member 6 is accommodated in the through-hole 23 without being entirely exposed to the outer peripheral portion of the body main portion 11.

In this case, the above-described operations and effects by accommodating the biasing member 6 in the through-hole 23 is more remarkable.

In addition, in the present embodiment, a plurality of the through-holes 23 are provided at intervals from each other in the circumferential direction, and each through-hole 23 has an opening portion 23*e* that is open to an upper end surface 11*a* of the body main portion 11, and a dimension of the opening portion 23*e* along the circumferential direction is reduced toward the radially inner side. In addition, the opening portion 23*e* has a triangular hole shape when seen from above.

In this case, the circumferential dimension (that is, the thickness dimension) of the portion (the frame 28) of the swing shaft housing portion 18, which is located between the through-holes 23 adjacent to each other in the circumferential direction, is less likely to vary at each position in the radial direction, and the strength of the frame 28 is stably increased. Therefore, it is possible to ensure the strength of the body 1 while keeping the intervals between the through-holes 23 arranged in the circumferential direction small. It is possible to achieve further compactness and weight reduction of the capping head 10.

In addition, in the present embodiment, the body 1 has a body recess portion 13 depressed downward from the upper surface 1*a* of the body 1 and configured to accommodate at least the lower end portion of the cone cam 7. In addition, a radially inner end portion of the opening portion 23*e* is open to the inner peripheral surface 13*b* of the body recess portion 13.

In this case, by inserting at least the lower end portion of the cone cam 7 into the body recess portion 13 that is open to the upper surface 1*a* of the body 1, the cone cam 7 and the body 1 can be disposed closer to each other in the up-down direction. As a result, the dimensions of the body 1 in the up-down direction can be reduced, and the compactness and weight reduction can be achieved. Further, the opening portion 23*e* of the through-hole 23 reaches the inner peripheral surface 13*b* of the body recess portion 13, and the opening portion 23*e* is formed large. Therefore, further weight reduction of the body 1 can be achieved by the opening portion 23*e*.

In addition, in the present embodiment, the through-hole 23 has a main body hole portion 23*a* configured to penetrate the body main portion 11 in the up-down direction, and a flange hole portion 23*b* configured to penetrate the body flange 12 in the up-down direction, and the biasing member 6 is disposed in the main body hole portion 23*a*.

In this case, by disposing the biasing member 6 in the main body hole portion 23*a* and fixing the body flange 12 to the upper end portion of the body main portion 11, the biasing member 6 can be easily accommodated inside the body 1. The capping head 10 is easy to manufacture.

In addition, in the present embodiment, the support shaft 31 (swing shaft 3) is rotatably supported by the body 1 via a pair of bearing members 24 and 25 that are provided in the flange hole portion 23*b* and the bearing hole portion 23*d*.

In this case, the support shaft 31 (swing shaft 3) is stably supported by the pair of bearing members 24 and 25 that are provided in the flange hole portion 23*b* disposed at the upper end portion of the body 1 and the bearing hole portion 23*d* disposed at the lower end portion of the body 1 and that are disposed away from each other in the up-down direction.

In addition, in the present embodiment, the biasing member 6 is a torsion coil spring extending spirally around the axis of the support shaft 31 (swing shaft 3), and the upper end portion of the biasing member 6 is locked to the body flange 12 and the lower end portion of the biasing member 6 is locked to the support shaft 31.

With the configuration described above, by locking the upper end portion of the biasing member 6 to the body flange 12, and locking the lower end portion to the support shaft 31 (swing shaft 3), the biasing member 6 can be easily assembled inside the body 1 while applying a desired biasing force.

In addition, in the present embodiment, the plurality of through-holes 23 are provided in the same number as the number of the biasing members 6 and are arranged in the circumferential direction.

In this case, each biasing member 6 can be accommodated in each through-hole 23. That is, one biasing member 6 can be disposed in one through-hole 23. Therefore, the through-hole 23 can be simply configured, and the body 1 is more easily manufactured and the rigidity is further increased.

In addition, at least a part of the body 1 is made of an aluminum alloy, an engineering plastic, or an FRP. Note that, a preferred example in the case of an engineering plastic includes materials such as polyether ether ketone (PEEK).

In this case, it is possible to achieve weight reduction of the body 1 as compared to the body made of stainless steel or the like in the related art while ensuring the rigidity of the body 1.

Specifically, in the present embodiment, as a result of achieving compactness and weight reduction of the capping head 10, the following processing performance is obtained.

Although not shown, for example, in a spindle assembly including a capping head of a four-roll type (with four forming rollers) in the related art, a capping device including 10 such spindle assemblies, and a capping system including the capping device, the capping processing speed of the threaded can is at maximum 300 cpm. It should be noted that the term “cpm” is a unit representing the number of processed cans (the number of capped cans) per minute.

On the other hand, in the spindle assembly 80 including the capping head 10 of a six-roll type (six forming rollers 5) according to the present embodiment, the capping device 120 including 10 spindle assemblies 80, and the capping system 100 including the capping device 120, the capping processing speed of the threaded can B is increased to at maximum 600 cpm.

In addition, in the capping head 10 of the present embodiment, the rolling element 42 of the cam follower 4 is rotatably supported by the lower end portion of the shaft portion 41. Therefore, the rolling element 42 can be disposed closer to the upper surface 1*a* of the body 1 than in the capping head in the related art. In a case in which this configuration is applied to the capping head in the related art, the lower end portion of the cone cam may contact the upper surface of the body. However, in the present embodiment, the body 1 is provided with the body recess portion 13. That is, the body recess portion 13 can accommodate at least the lower end portion of the cone cam 7, so that the cone cam 7 and the body 1 are disposed close to each other in the up-down direction, but the contact (interference) between these members are prevented.

Therefore, the pressure block 2 and the forming roller 5 for forming the cap 300, and the cone cam 7 can be disposed closer to each other in the up-down direction, and thus the dimension of the body 1 in the up-down direction can be reduced.

Therefore, with the capping head 10, the spindle assembly 80, and the capping device 120 according to the present embodiment, it is possible to keep a compact outer shape of the capping head 10, achieve weight reduction, and increase the processing speed of the capping to improve the production efficiency.

In addition, in the present embodiment, the inner diameter dimension d1 of the body recess portion 13 is larger than the outer diameter dimension d2 of the lower end portion of the cone cam 7 with which the cam follower 4 comes into contact.

With the above-described configuration, the lower end portion of the cone cam 7 can be reliably inserted into the body recess portion 13.

In addition, in the present embodiment, the spindle attachment portion 15 is disposed at the bottom portion of the body recess portion 13 having a bottomed hole shape.

In this case, by providing the body recess portion 13, the spindle 85 can be stably attached to the spindle attachment portion 15 provided at the bottom portion of the body recess portion 13, while achieving compactness and weight reduction of the body 1.

Further, in the present embodiment, the inner diameter dimension d1 of the body recess portion 13 is larger than the diameter dimension of the spindle attachment portion 15.

In this case, the interval can be provided in the radial direction between the inner peripheral surface 13*b* of the body recess portion 13 and the spindle attachment portion 15. For example, in a case in which a part of the lower end portion of the cone cam 7, which is set at the descent end position, is accommodated in this interval, further compactness of the body 1 can be achieved.

In addition, in the present embodiment, in a case in which the dimension of the cone cam 7 in the up-down direction from the upper end position with which the cam follower 4 comes into contact to the lower end position is defined as the forming dimension H, the depth dimension h of the body recess portion 13 in the up-down direction is 1.58H or less.

In a case in which the depth dimension h of the body recess portion 13 in the up-down direction is $h \leq 1.58H$, the above-described operations and effects can be achieved while sufficiently ensuring the rigidity of the body 1 by forming the body recess portion 13.

In addition, in the present embodiment, the body recess portion 13 has a hole shape extending in the up-down direction from the body flange 12 to the body main portion 11, and the dimension in the up-down direction in which the cone cam 7 set at the descent end position is inserted into the body recess portion 13 is the same as or equal to or larger than a dimension L of the body flange 12 in the up-down direction.

In this case, the dimension in the up-down direction in which the cone cam 7 set as at the descent end position is inserted into the body recess portion 13 (cone cam insertion amount) is equal to or larger than the dimension L of the body flange 12 in the up-down direction. Since the insertion dimension of the cone cam 7 into the body recess portion 13 is sufficiently ensured, further compactness and weight reduction of the body 1 can be achieved.

In addition, in the present embodiment, six forming rollers 5 are provided, and the number of the thread forming rollers 5A is larger than the number of the tuck under forming rollers 5B.

As in the above-described configuration, in a case in which the number of thread forming rollers 5A is large, the forming load (pressing force) per thread forming roller 5A can be reduced. Therefore, even in a case in which the thickness of the threaded can B is reduced, the deformation of the mouthpiece portion 200 due to the thread forming processing can be more stably suppressed.

In addition, in the present embodiment, four thread forming rollers 5A are provided in the capping head 10, and two tuck under forming rollers 5B are provided. As a result, the forming processing accuracy of the capping can be stably improved.

In addition, in the present embodiment, the positions of the thread forming rollers 5A (roller main bodies 52) adjacent to each other in the circumferential direction are displaced from each other in the up-down direction.

In this case, the forming portions of the thread forming rollers 5A adjacent to each other in the circumferential direction with respect to the peripheral wall 301 of the cap are displaced from each other in the up-down direction, so that a problem of an excessively large thread forming amount at the same portion (particularly in the vicinity of an upper groove, which is a thread start position) of the peripheral wall 301 of the cap 300 can be suppressed. Variations in the thread forming amount at each position in the up-down direction is suppressed, and the thread forming amount is equalized in the up-down direction.

In addition, since the adjacent thread forming rollers 5A are disposed to be displaced in the up-down direction, these thread forming rollers 5A can be disposed closer to each other without causing interference. As a result, the outer diameter dimension of the capping head 10 can be reduced, and further compactness and weight reduction can be achieved.

In addition, in the present embodiment, the spindle attachment portion 15 of the body 1 overlaps the body recess portion 13 when seen in the radial direction.

As in the above-described configuration, by disposing the spindle attachment portion 15 and the body recess portion 13 to overlap each other when seen in the radial direction, the dimension of the body 1 in the up-down direction can be further reduced.

In addition, in the present embodiment, the body 1 has the biasing member accommodation hole (through-hole) 23 extending in the up-down direction, and the biasing member 6 is disposed in the biasing member accommodation hole 23.

In this case, the biasing member 6 is accommodated in the biasing member accommodation hole 23 provided to extend through the body 1 in the up-down direction. Therefore, the biasing member 6 can be covered from its periphery while maintaining high rigidity of the body 1. In addition, as compared to a case in which the body 1 is provided with a pocket 11*e* and a separate cover 8 that covers the pocket 11*e* as in a second modification example of the present embodiment which will be described below, it is easy to manufacture the body 1 because the processing of cutting the biasing member accommodation hole 23 in the body 1 is not complicated. It should be noted that, in a case of the integral body main portion 11 as in the present embodiment, it is easy to achieve weight reduction of the body main portion 11 by performing cutout or the like while ensuring the rigidity of the body main portion 11.

In addition, in the present embodiment, the skirt portion 11*h* suppresses the exposure of the plurality of support protrusion pieces 17, the plurality of roller shaft accommodation pockets 19, the accommodation cylinder 16, and a part of the pressure block 2 to the outside of the device. Therefore, the appearance of the device is improved.

In addition, the skirt portion 11*h* and the plurality of support protrusion pieces 17 are connected to each other. Therefore, the rigidity of each support protrusion piece 17 is increased, and each support shaft 31, which is supported by the support protrusion piece 17 via the bearing member 24, rotationally moves accurately centered on the shaft center axis A. Therefore, each forming roller 5 connected to each support shaft 31 can perform more accurate forming processing on the peripheral wall 301 of the cap.

In addition, in the present embodiment, a part of the pressure block 2 is accommodated in the accommodation cylinder 16 that protrudes downward from the lower surface 1*b* of the body 1.

In this case, by accommodating a part of the pressure block 2 in the accommodation cylinder 16, it is not necessary to provide an accommodation space (insertion space) for the pressure block 2 inside the body 1, and the dimension in the up-down direction between the lower surface 1*b* of the body 1 and the body recess portion 13 can be further reduced. Therefore, further compactness and weight reduction of the body 1 can be achieved.

In addition, in the present embodiment, the body 1 has the cutout portion between the support protrusion piece 17 and the accommodation cylinder 16, as well as between the support protrusion pieces 17 adjacent to each other in the circumferential direction.

Therefore, further weight reduction of the body 1 can be achieved.

In addition, in the present embodiment, the deformation assist groove 36 is provided in at least one of the upper clamp portion 32*a* or the lower clamp portion 33*a* of the swing shaft 3.

In this case, by providing the deformation assist groove 36 extending in the up-down direction on the peripheral surface (clamp portion peripheral surface) of the upper clamp portion 32*a* or the lower clamp portion 33*a* (hereinafter, may be simply referred to as a clamp portion), the clamp portion is easily deformed in a direction (to the inner side in the shaft radial direction) of pressing the outer peripheral surface of the support shaft 31. As a result, the outer diameter dimension (diameter dimension) of the support shaft 31 can be reduced (that is, the support shaft 31 can be made thinner), and accordingly, the outer diameter dimension of the entire capping head 10 can also be reduced, so that further weight reduction can be achieved.

In addition, in the present embodiment, the step portion 37 is formed on the surface of the lower arm 33 facing the radially inner side.

In this case, by locking the locking arm 61 to the step portion 37 of the lower arm 33 in a state (open state) by using the assembly jig 60 in which the cam follower 4 and the forming roller 5 are moved to the radially outer side against the biasing force of the biasing member 6, so that the open state can be stably maintained. The cone cam 7 can be stably inserted into the radially inner side of the plurality of cam followers 4 arranged in the circumferential direction, and thus the assembly work between the capping head 10 and the cone cam 7 is facilitated.

In addition, in the capping system 100 according to the present embodiment, the transport direction D of the threaded can B discharged from the filler 110 and directed toward the capping device 120 extends along the tangent of the outer peripheral portion of the turret 121 when seen in the turret axis T direction.

With the capping system 100 according to the present embodiment, the threaded can B discharged from the filler 110 is smoothly supplied to the capping device 120 without rapidly changing the transport direction, that is, without being easily affected by a centrifugal force. Therefore, the processing speed of the capping can be stably increased, and thus the production efficiency can be further improved.

Here, other issues, solutions, and the like of the present embodiment will be described.

In the capping device of Japanese Unexamined Patent Application, First Publication No. 2003-146392 (hereinafter, referred to as Well-Known Document 1), the cone cam descends by being guided to the one-step descent portion of the guide bar for lower cam, so that the RO roller (thread forming roller) and the PP roller (tuck under forming roller) are pressed against the peripheral wall of the cap. Thereafter, the cone cam is guided to the upper step portion of the guide bar and is raised temporarily, thereby temporarily releasing the contact state between the RO roller and the PP roller with respect to the cap. Further, thereafter, the cone cam descends again by being guided to the two-step descent portion of the guide bar, so that the RO roller and the PP roller are pressed again against the peripheral wall of the cap.

Specifically, in the capping device of Well-Known Document 1, a first capping step of once capping the cap with the RO roller and the PP roller to form a thread portion and a tamper-evidence portion (tuck under forming portion), and then a second capping step of capping the cap again in the same manner as in the first capping step are executed. That is, in Well-Known Document 1, capping is performed via a double action, where the RO roller and the PP roller come into contact with the peripheral wall of the cap, roll on the peripheral wall, and then are spaced away from the peripheral wall, with this series of operations being performed twice.

As described above, in the related art, the formability of the thread portion and the temper-evidence portion is ensured via the double action.

In this type of threaded can, reducing thickness (weight reduction) is required for cost reduction and the like. However, as shown in FIG. 10 of Well-Known Document 1, in a case in which the four RO rollers are disposed at equal pitches in the circumferential direction and the two PP rollers are disposed at equal pitches in the circumferential direction, the mouthpiece portion, in which the thickness is reduced, is easily deformed into an elliptical shape or the like when seen in a cross-sectional view perpendicular to the can axis due to the lateral load during capping.

In addition, this type of capping device is required to achieve the compactness of the device and increase the processing speed of the capping to improve the production efficiency while ensure good accuracy of thread forming and good forming (tuck under forming) accuracy of the tamper-evidence portion.

The present embodiment has another object to provide a capping device and a capping system that can suppress deformation of a mouthpiece portion during capping to achieve reduced thickness, ensure good forming accuracy of a cap, and achieve compactness of the device or improve production efficiency by increasing a processing speed of capping.

With the capping device 120 according to the present embodiment, the six rollers 5 including the four thread forming rollers 5A and the two tuck under forming rollers 5B are disposed on the capping head 10 of the spindle assembly 80 around the center axis O at equal pitches. During capping, the mouthpiece portion 200 of the threaded can B is evenly pressed by the six rollers 5 in the circumferential direction around the center axis O (can axis), so that the mouthpiece portion 200 is prevented from being deformed into an elliptical shape or the like when seen in a transverse cross-sectional view.

As a result, it is possible to achieve reduced thickness of the threaded can B (particularly, reduced thickness of the mouthpiece portion 200), and also to achieve reduced thickness of the cap peripheral wall 301 according to the thickness of the mouthpiece portion 200. Therefore, it is possible to achieve weight reduction and cost reduction of the threaded can B. Even in a case in which the operation of each roller 5 to form the cap 300 is limited to one time (single action), good forming amount (processing accuracy) of each of thread forming and tuck under forming can be ensured.

By making the capping a single action, it is possible to shorten a length of circumference (total length) of the lower cam 124 extending around the turret axis T, and it is possible to reduce the diameter (turret diameter) of the turret 121, thereby achieving the compactness of the device.

Alternatively, compared to the double-action type capping device in the related art, the single-action type capping device 120 of the present embodiment can significantly increase the rotation speed around the turret axis T of the turret 121 when the turret diameter is the same.

As described above, according to the present embodiment, it is possible to suppress deformation of the mouthpiece portion 200 during capping to achieve reduced thickness, ensure good forming accuracy of the cap 300, and achieve compactness of the device or improve production efficiency by increasing a processing speed of capping.

In addition, in the present embodiment, the forming distal end load, in which the thread forming roller 5A presses the peripheral wall 301 of the cap 300, is 110 N or less, and the forming distal end load, which the tuck under forming roller 5B presses the lower end of the peripheral wall 301 of the cap 300, is 90 N or less.

In the configuration described above, the forming distal end load of the thread forming roller 5A is set to 110 N or less, and the forming distal end load of the tuck under forming roller 5B is set to 90 N or less, so that the lateral load (load from the radial direction orthogonal to the can axis) acting on the mouthpiece portion 200 during capping is sufficiently reduced. Even in the mouthpiece portion 200 in which the thickness is reduced, the deformation during capping is stably suppressed. In addition, even though the forming distal end load of each roller 5 is small as described above, in the present embodiment, the capping performance (such as thread depth dimension and tuck under forming dimension) equivalent to that of the double-action type capping device in the related art can be obtained via a single action.

In order to stably obtain the above-described operations and effects, the forming distal end load in which the thread forming roller 5A presses the peripheral wall 301 of the cap 300 is more preferably 100 N or less, and still more preferably 90 N or less. In addition, the forming distal end load in which the tuck under forming roller 5B presses the lower end of the peripheral wall 301 of the cap 300 is more preferably 80 N or less, and still more preferably 75 N or less.

In addition, in the present embodiment, the torque with which the thread forming roller 5A presses the peripheral wall 301 of the cap 300 around the axis A of the support shaft 31 is 3.0 N·m or less, and the torque with which the tuck under forming roller 5B presses the lower end of the peripheral wall 301 of the cap 300 around the axis A of the support shaft 31 is 2.5 N·m or less.

In the configuration described above, the torque around the support shaft 31 of the thread forming roller 5A is set to 3.0 N·m or less, and the torque around the support shaft 31 of the tuck under forming roller 5B is set to 2.5 N·m or less, so that the lateral load acting on the mouthpiece portion 200 during capping is sufficiently reduced. Even in the mouthpiece portion 200 in which the thickness is reduced, the deformation during capping is stably suppressed. In addition, even though the torque of each roller 5 is small as described above, in the present embodiment, the capping performance (such as thread depth dimension and tuck under forming dimension) equivalent to that of the double-action type capping device in the related art can be obtained via a single action.

In order to stably obtain the above-described operations and effects, the torque with which the thread forming roller 5A presses the peripheral wall 301 of the cap 300 around the axis A of the support shaft 31 is more preferably 2.5 N·m or less. In addition, the torque with which the tuck under forming roller 5B presses the lower end of the peripheral wall 301 of the cap 300 around the axis A of the support shaft 31 is more preferably 2.0 N·m or less.

In addition, in the present embodiment, the lower cam 124 is provided with only one set of the descent portion 124*c*, the forming portion 124*d*, and the ascent portion 124*e*.

In this case, the lower cam follower 91 is moved to the lower side by being guided to the descent portion 124*c* of the lower cam 124, and as a result, the thread forming roller 5A and the tuck under forming roller 5B come into contact with the peripheral wall 301 of the cap 300. In addition, while the lower cam follower 91 is guided to the forming portion 124*d* of the lower cam 124, the thread forming roller 5A forms a thread portion on the peripheral wall 301 of the cap 300, and the tuck under forming roller 5B performs the tuck under forming of the lower end of the peripheral wall 301 of the cap 300. In addition, the lower cam follower 91 is moved to the upper side by being guided to the ascent portion 124*e* of the lower cam 124, and as a result, the thread forming roller 5A and the tuck under forming roller 5B are spaced away from the peripheral wall 301 of the cap 300. The peripheral wall 301 of the cap 300 is formed well by the action of each roller 5.

In addition, in the present embodiment, four thread forming rollers 5A are provided in the capping head 10.

In this case, since a large number of the thread forming rollers 5A are ensured, even in a case in which the operation of each thread forming roller 5A to form a thread portion on the cap 300 is limited to one time (single action), the accuracy of thread forming can be well maintained.

It should be noted that the present invention is not limited to the above-described embodiment, and, for example, as will be described below, the configuration and the like can be changed without departing from the gist of the present invention. It should be noted that, in the showing of the modification example, the same components as in the above-described embodiment is denoted by the same reference numerals, and the differences will be mainly described below.

Figure 14:
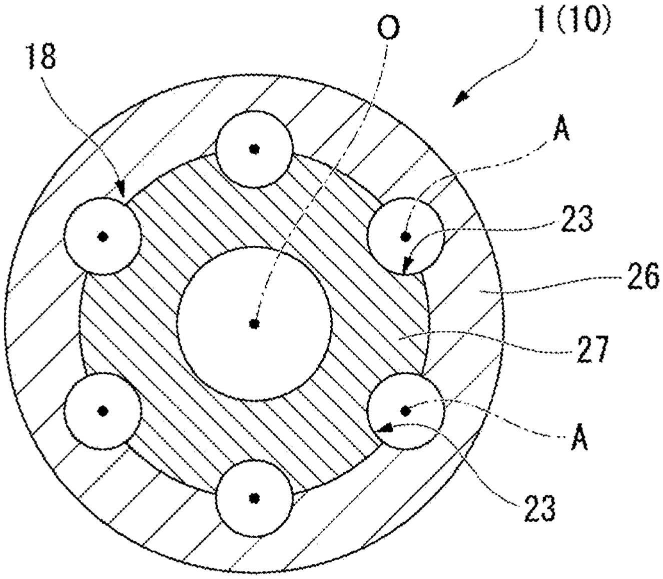
FIG. 14 is a cross-sectional view (transverse cross-sectional view) schematically showing a capping head body of a first modification example of the present embodiment.
Figure 15:
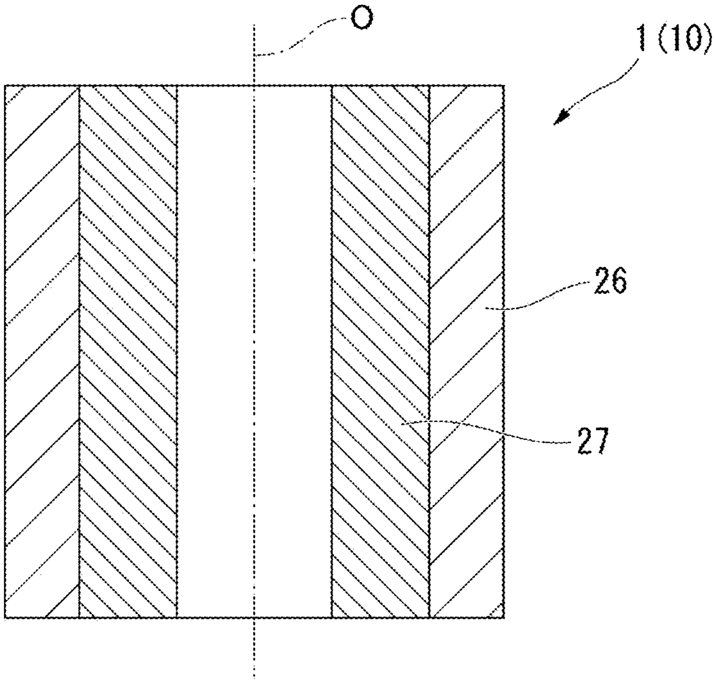
FIG. 15 is a cross-sectional view (longitudinal cross-sectional view) schematically showing the capping head body of the first modification example of the present embodiment.

FIGS. 14 and 15 are cross-sectional views schematically showing a first modification example of the body 1 of the capping head 10 described in the embodiment described above. Specifically, FIG. 14 shows a transverse cross-sectional view of the body 1 perpendicular to the center axis O, and FIG. 15 shows a longitudinal cross-sectional view of the body 1 along the center axis O.

In the first modification example shown in FIGS. 14 and 15, the body 1 has a double cylinder structure. That is, the body 1 includes an outer cylinder portion 26 and an inner cylinder portion 27 that fits radially inner side of outer cylinder portion 26. The outer cylinder portion 26 has a cylindrical shape extending in the up-down direction centered on the center axis O. The inner cylinder portion 27 has a cylindrical shape extending in the up-down direction centered on the center axis O. In this modification example as well, the swing shaft housing portion 18 is disposed between the outer peripheral portion and the inner peripheral portion of the body main portion (body 1).

The through-hole 23 is disposed in at least the inner cylinder portion 27 of the outer cylinder portion 26 and the inner cylinder portion 27. Specifically, in the shown example, the through-hole 23 is disposed over the inner cylinder portion 27 and the outer cylinder portion 26. More specifically, the outer peripheral wall having a cylindrical shape of the body main portion 11 is disposed in the outer cylinder portion 26, the spindle attachment portion 15 is disposed in the inner cylinder portion 27, and the swing shaft housing portion 18 in which the through-hole 23 is provided is disposed over the outer cylinder portion 26 and the inner cylinder portion 27. The body main portion 11, the spindle attachment portion 15, and the swing shaft housing portion 18 are connected to each other and fixed integrally.

Even by the first modification example, the same operations and effects as those in the embodiment described above can be obtained.

Figure 18:
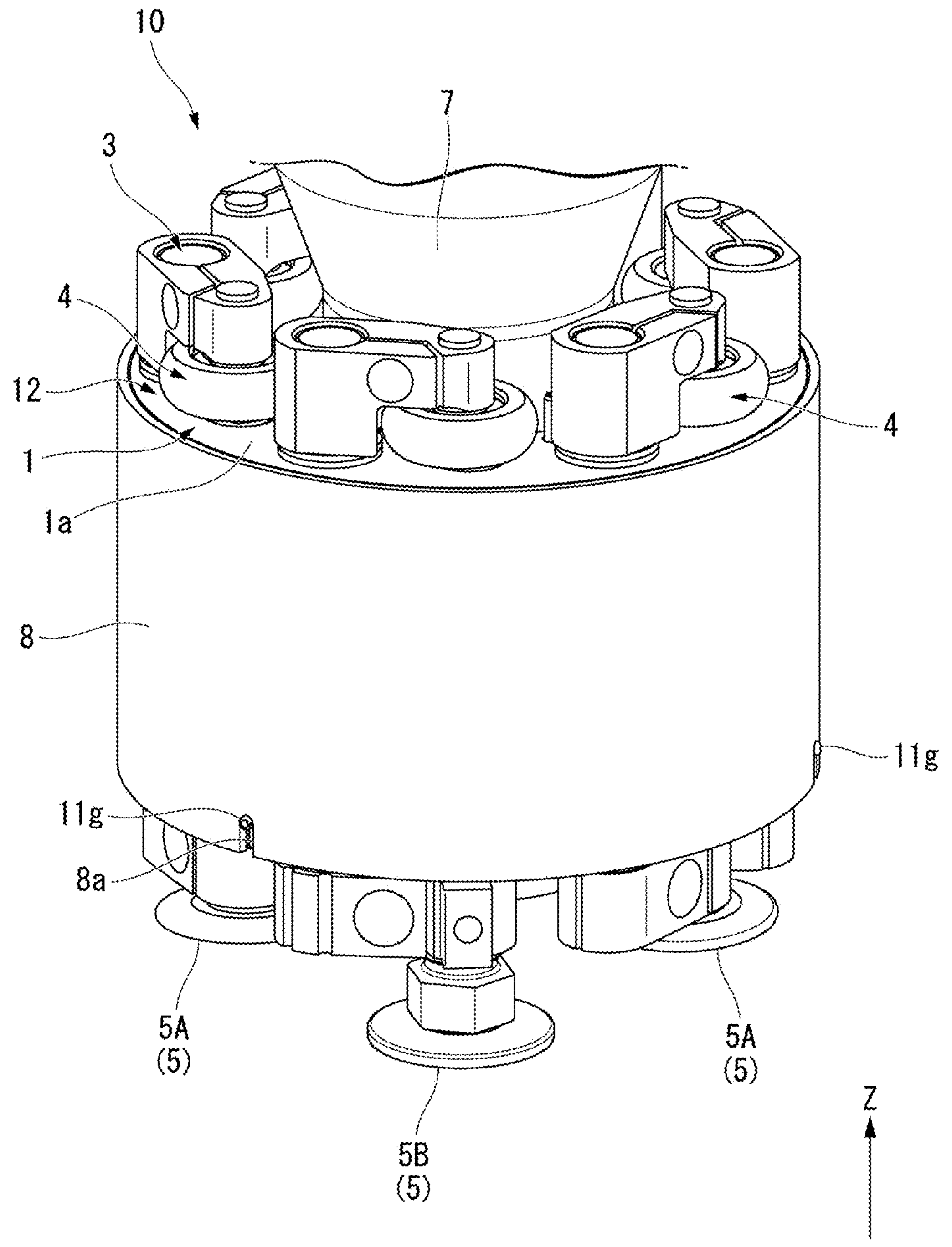
FIG. 18 is a perspective view showing a part of a capping head according to a second modification example of the present embodiment.
Figure 19:
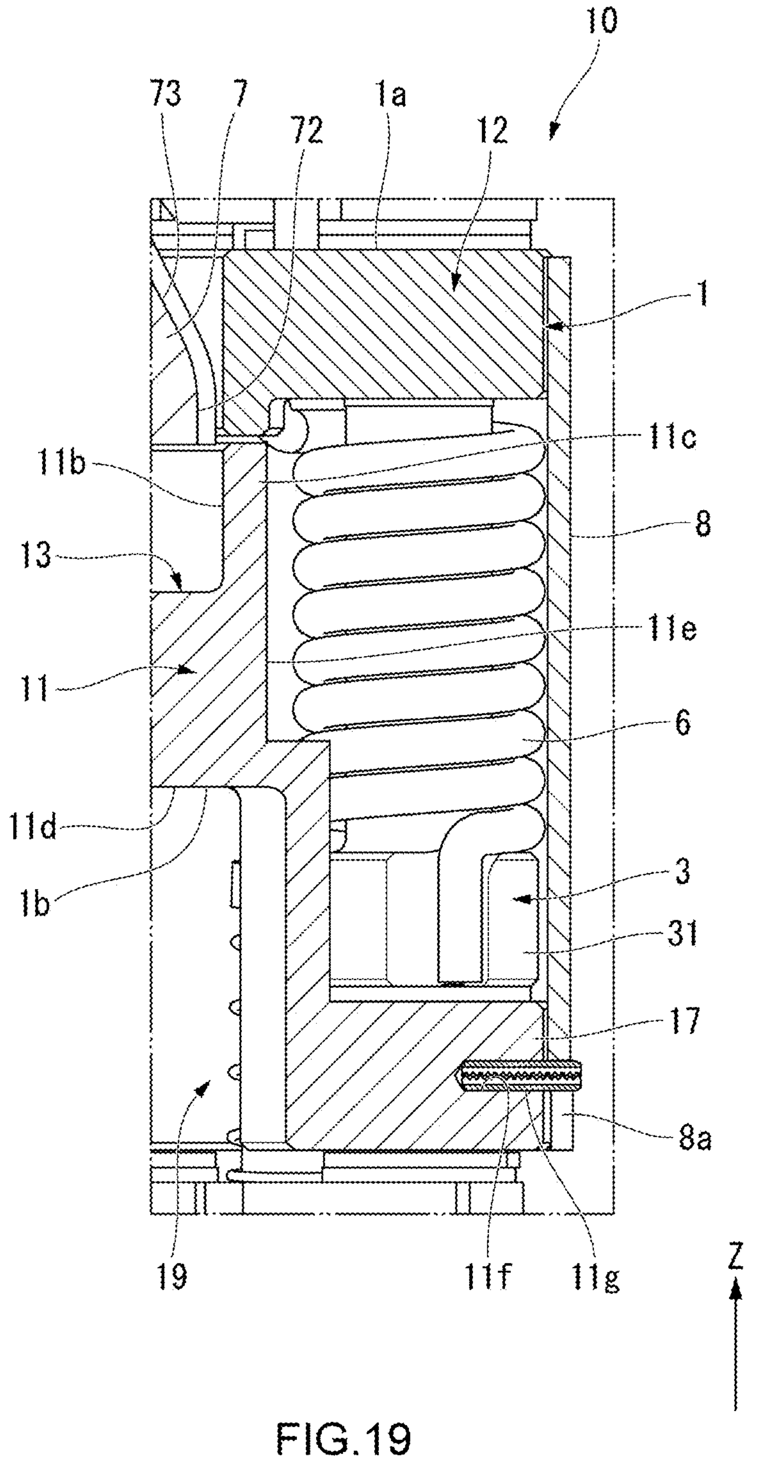
FIG. 19 is a cross-sectional view (longitudinal cross-sectional view) showing a part of the capping head of FIG. 18.

FIGS. 18 and 19 show a second modification example of the capping head 10 described in the above-described embodiment. As shown in FIGS. 18 and 19, in the second modification example, the capping head 10 includes the cover 8 having a cylindrical shape. In addition, the body 1 has the pocket 11*e*, the pin insertion hole 11*f*, and a locking pin 11*g*. In the second modification example, the body 1 does not have the skirt portion 11*h*.

As shown in FIG. 19, the pocket 11*e* has a recessed shape depressed from the outer peripheral surface 1*c* of the body 1 toward the radially inner side and extending in the up-down direction. The pocket 11*e* has a portion depressed from the outer peripheral surface of the peripheral wall portion 11*c* toward the radially inner side, and a portion connected to a lower side of this portion and depressed from an upper side portion of the outer peripheral surface of the support protrusion piece 17 toward the radially inner side. Although not shown, a plurality of the pockets 11*e* are provided and arranged the circumferential direction. The number of the pockets 11*e* is the same as the number of the support members (swing shafts) 3 and the same as the number of the biasing members 6.

An intermediate portion of the support shaft 31, which is located between the body flange 12 and the support protrusion piece 17 (lower side portion thereof) in the up-down direction, is disposed in the pocket 11*e*. In addition, each biasing member 6 is accommodated in each pocket 11*e*.

The pin insertion hole 11*f* is open to an outer peripheral surface of the lower side portion of the support protrusion piece 17 and extends in the radial direction. The pin insertion hole 11*f* has, for example, a circular hole shape. A plurality of the pin insertion holes 11*f* are provided at intervals from each other in the circumferential direction.

The locking pin 11*g* is inserted into the pin insertion hole 11*f*. The locking pin 11*g* has a columnar or cylindrical shape extending in the radial direction and has, for example, a cylindrical shape in the present embodiment. The locking pin 11*g* may be fixed to the pin insertion hole 11*f* by fitting, threading, or adhesion, or the like. The locking pin 11*g* has a portion that protrudes to the radially outer side from the pin insertion hole 11*f*. That is, the locking pin 11*g* has a portion that protrudes beyond the outer peripheral surface of the support protrusion piece 17 to the radially outer side. A plurality of the locking pins 11*g* are provided at intervals from each other in the circumferential direction. For example, three or more locking pins 11*g* are provided at equal pitches in the circumferential direction.

The cover 8 has a cylindrical shape centered on the center axis O and extends in the up-down direction. As shown in FIGS. 18 and 19, the cover 8 surrounds the body 1 from the radially outer side over the whole circumference in the circumferential direction. Specifically, the cover 8 surrounds the body main portion 11 and the body flange 12 from the radially outer side over the whole circumference in the circumferential direction. In addition, the cover 8 surrounds the peripheral wall portion 11*c*, the bottom wall portion 11*d*, the plurality of pockets 11*e*, the plurality of biasing members 6, the plurality of support protrusion pieces 17, the plurality of roller shaft accommodation pockets 19, the accommodation cylinder 16, and a part of the pressure block 2 from the radially outer side. In addition, the cover 8 covers a portion of each support member 3 that is disposed in the pocket 11*e* (intermediate portion of the support shaft 31) from the radially outer side.

The cover 8 includes a locking recess portion 8*a*. The locking recess portion 8*a* penetrates the peripheral wall of the cover 8 in the radial direction and extends in the up-down direction. The locking recess portion 8*a* is a notch-shaped or slit-shaped recess portion. The locking recess portion 8*a* is open to an outer peripheral surface, an inner peripheral surface, and a lower end surface of the cover 8. A plurality of the locking recess portions 8*a* are provided at intervals from each other in the circumferential direction. For example, three or more locking recess portions 8*a* are provided at equal pitches in the circumferential direction. The number of the locking recess portions 8*a* is the same as the number of the locking pins 11*g*.

A portion of the locking pin 11*g* that protrudes from the pin insertion hole 11*f* is inserted into the locking recess portion 8*a*. Specifically, the locking pin 11*g* faces a pair of inner surface portions facing in the circumferential direction among the inner surfaces of the locking recess portion 8*a*, which define the locking recess portion 8*a*, in the circumferential direction. In addition, the locking pin 11*g* comes into contact with the inner surface portion of the inner surface of the locking recess portion 8*a*, which is located at the upper end portion and faces downward, from the lower side.

The cover 8 is fitted over the body main portion 11 and the body flange 12, and the locking pin 11*g* is locked to the locking recess portion 8*a*, thereby fixing the cover 8 to the body 1. In addition, the cover 8 can be detached from the body 1 by moving the cover 8 to the upper side with respect to the body 1. That is, the cover 8 is detachably attached to the body 1.

The body 1 and the cover 8 are made of metal, for example, an aluminum alloy. Specifically, the body 1 and the cover 8 are made of, for example, duralumin.

According to the second modification example, the cover 8 suppresses the exposure of the peripheral wall portion 11*c*, the bottom wall portion 11*d*, the plurality of pockets 11*e*, the plurality of biasing members 6, the intermediate portion of the plurality of support shafts 31, the plurality of support protrusion pieces 17, the plurality of roller shaft accommodation pockets 19, the accommodation cylinder 16, and a part of the pressure block 2 (hereinafter, may be abbreviated as the biasing member 6 and the like) to the outside of the device. Therefore, the appearance of the device is improved. In addition, the cover 8 suppresses the entry of a content such as a beverage (particularly a content with sugar content that easily solidifies) or a liquid such as oil, which may scatter from the outside of the capping head 10 toward the body 1, into the body 1. Therefore, the maintainability is improved, and the performance (function) of each component such as the biasing member 6 and the like provided in the body 1 is well maintained.

In addition, in the second modification example, the body 1 and the cover 8 are made of a lightweight aluminum alloy. Therefore, it is possible to achieve weight reduction while ensuring the rigidity of the entire device.

In addition, in the above-described embodiment, an example is described in which the number of the forming rollers 5 provided in the capping head 10 is six, but the present invention is not limited to this. The number of the forming rollers 5 provided in the capping head 10 may be, for example, eight or more, that is, six or more forming rollers 5 may be provided.

In the above-described embodiment, an example is described in which the lower cam 124 of the capping device 120 has only one set of the front descent portion 124*a*, the first horizontal portion 124*b*, the descent portion 124*c*, the forming portion 124*d*, the ascent portion 124*e*, the second horizontal portion 124*f*, and the rear ascent portion 124*g*, but the present invention is not limited to this, and two sets of these portions may be provided and arranged in the turret circumferential direction. That is, in this case, the lower cam 124 is provided with two sets of the descent portion 124*c*, the forming portion 124*d*, and the ascent portion 124*e*. Then, the series of operations in which each roller 5 of the thread forming roller 5A and the tuck under forming roller 5B comes into contact with the peripheral wall 301 of the cap 300, rolls on the peripheral wall 301, and then is spaced away from the peripheral wall 301 is set to be performed twice. That is, in this case, the capping device 120 performs the capping via a double action.

In the embodiment described above, the cone cam 7 is described as an example of a cam with which the cam follower 4 of the capping head 10 engages, but the present disclosure is not limited to this. Although not shown, for example, a configuration may be adopted in which the plurality of cams, with which each cam follower 4 engages, are provided on the upper side of the body 1.

In the embodiment described above, an example is described in which the cone cam 7, the cam follower 4, and the biasing member 6 are used as the swinging means that swings the swing shaft 3 around its axis (shaft center axis A) to swing the forming roller 5 in the radial direction, but the present invention is not limited to this. As the swinging means, for example, a servo motor or the like that rotates the swing shaft 3 around its axis may be used.

In the embodiment described above, the threaded can B is described as an example of a can having a mouthpiece portion, but the present disclosure is not limited to this. As the can to be capped, for example, a non-threaded bottle can with no threads on the mouthpiece portion may also be used.

The present invention may combine the configurations described in the above-described embodiment and the modification example without departing from the gist of the present invention, and the addition, the omission, the replacement, and other changes of the configuration can be made. In addition, the present invention is not limited to the above-described embodiment, and is only limited by the scope of the claims.

EXAMPLES

Hereinafter, the present invention will be more specifically described with reference to Examples. The present invention is not limited to Examples.

<Capping Confirmation Test>

As Comparative Example 1 of the related art, a capping device was used in which a capping head including four forming rollers, specifically, two thread forming rollers and two tuck under forming rollers was used, and the series of operations in which each roller of the thread forming roller and the tuck under forming roller comes into contact with the peripheral wall 301 of the cap 300, rolls on the peripheral wall 301, and then is spaced away from the peripheral wall 301 was set to be performed twice (double action). Then, the cap 300 was subject to the capping onto a large number of the threaded cans B by using this capping device. It should be noted that, unlike the product according to the present invention, the capping head according to Comparative Example 1 is a capping head in the related art in which the body is not provided with a body recess portion or the like.

In Comparative Example 1, a set diameter of the thread forming roller was φ43.5 mm, and a set diameter of the tuck under forming roller was φ45.3 mm. It should be noted that the term "set diameter" corresponds to the inner diameter dimension (diameter dimension of the rotation trajectory of the roller inner end) of the rotation trajectory obtained by rotating the forming roller around the center axis of the capping head. According to the set diameter, a roller distal end load of the forming roller that presses the peripheral wall of the cap to the radially inner side, a contact length per contact of the forming roller with the peripheral wall of the cap (peripheral length around the cap), or the like is adjusted.

In addition, as Comparative Example 2 in the related art, a capping device was used in which the series of operations in which each roller of the thread forming roller and the tuck under forming roller comes into contact with the peripheral wall 301 of the cap 300, rolls on the peripheral wall 301, and then is spaced away from the peripheral wall 301 was set to be performed once (single action). The capping was performed using the capping device under the same condition as in Comparative Example 1 except for the above-described condition.

In addition, as Example 1 of the present invention, the cap 300 was subject to the capping onto a large number of the threaded cans B by using the capping head 10 and the capping device 120 described in the above-described embodiment. Specifically, the capping was performed by using the capping device 120 in which the capping head 10 including six forming rollers 5, specifically, four thread forming rollers 5A and two tuck under forming rollers 5B was used, and the series of operations in which each roller 5 of the thread forming roller 5A and the tuck under forming roller 5B comes into contact with the peripheral wall 301 of the cap 300, rolls on the peripheral wall 301, and then is spaced away from the peripheral wall 301 was set to be performed once (single action). In Example 1, a set diameter of the thread forming roller 5A was φ43.5 mm, and a set diameter of the tuck under forming roller 5B was φ43.5 mm.

In addition, as Example 2 of the present invention, the capping was performed by using the capping device 120 in which the capping head 10 including six forming rollers 5, specifically, three thread forming rollers 5A and three tuck under forming rollers 5B was used, and the series of operations in which each roller 5 of the thread forming roller 5A and the tuck under forming roller 5B comes into contact with the peripheral wall 301 of the cap 300, rolls on the peripheral wall 301, and then is spaced away from the peripheral wall 301 was set to be performed once (single action).

In Example 2, a set diameter of the thread forming roller 5A was φ43.0 mm, and a set diameter of the tuck under forming roller 5B was φ43.0 mm. The condition of Example 2 except for the above-described configuration was the same as in Example 1.

A predetermined number (a plurality) of the threaded cans B were randomly selected from among a large number of the threaded cans B capped with the cap 300 in each of Comparative Examples 1 and 2 and Examples 1 and 2. Then, for each threaded can B, the items "thread depth", "cap opening angle", "tuck under forming", and "thread length" were measured, and an average value (Ave), a maximum value (Max), a minimum value (Min), and a standard deviation (σ) were obtained.

Specifically, the "thread depth" (mm) was measured as follows.

Figure 16:
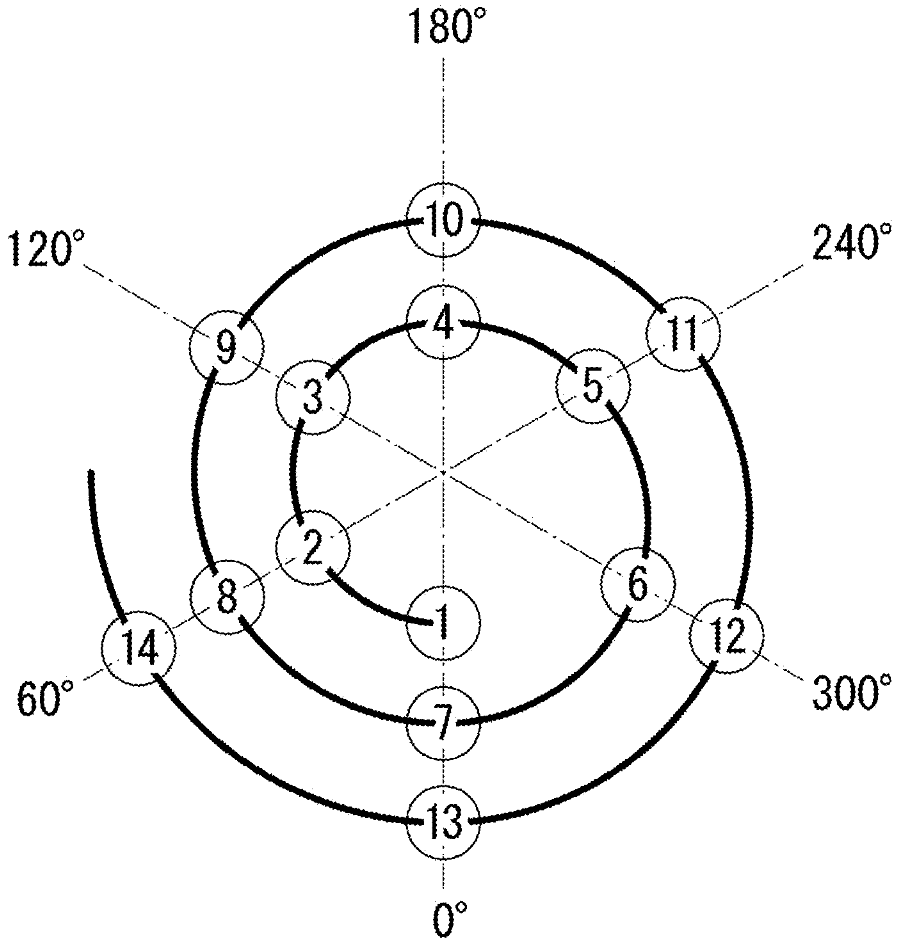
FIG. 16 is a schematic view of a thread showing a method of measuring a thread depth and showing the number of turns of the thread in an exploded manner on a plan.

FIG. 16 is a schematic view of a thread showing a method of measuring the thread depth and showing the number of turns of the thread in an exploded manner on a plan. As shown in FIG. 16, a thread starting point of the thread portion formed on the peripheral wall 301 of the cap is designated as No. 1, and from this thread starting point, the thread is numbered No. 1, 2, 3, . . . at 60° intervals around the cap center axis (can axis) toward a thread end point. Then, the thread depth was measured at seven points from No. 5 to No. 11, and the maximum value among these values was defined as the "thread depth".

In addition, the "cap opening angle" (°) is a rotation angle from the start of the rotation operation to the point at which all of a plurality of bridges of the peripheral wall 301 of the cap are broken in a case in which the cap 300 attached to the mouthpiece portion 200 is rotated in a cap opening direction around the can axis.

In addition, the "tuck under forming" was measured by an inspector's sensory test (numerical range: 1.0 to 5.0). (a) to (d) of FIG. 17 are cross-sectional (longitudinal cross-sectional) images showing the vicinity of the lower end of the peripheral wall 301 of the cap 300 after the capping, and are views showing the tuck under forming evaluation.

Specifically, (c) of FIG. 17 shows a state after the tuck under forming in a case in which the tuck under forming roller 5B comes into contact with the lower end of the peripheral wall 301 of the cap 300 at an appropriate position (height) in the up-down direction. In (c) of FIG. 17, there is no gap between the lower end of the peripheral wall 301 and the lower portion of the bulging portion 201 over the whole circumference. Such a state as shown in (c) of FIG. 17 is referred to as "appropriate (3.0)".

In addition, (a) of FIG. 17 shows a state after the tuck under forming in a case in which the tuck under forming roller 5B comes into contact with the lower end of the peripheral wall 301 of the cap 300 at a position higher than the appropriate position. In (a) of FIG. 17, a gap is generated between the lower end of the peripheral wall 301 and the lower portion of the bulging portion 201 over a half circumference to the whole circumference around the cap center axis. Such a state of (a) of FIG. 17 is referred to as "too sharp tuck under (1.0)".

In addition, (b) of FIG. 17 shows a state after the tuck under forming in a case in which the tuck under forming roller 5B comes into contact with the lower end of the peripheral wall 301 of the cap 300 at a position between the "appropriate" and the "too sharp tuck under" in the up-down direction. In (b) of FIG. 17, although no gap is generated between the lower end of the peripheral wall 301 and the lower portion of the bulging portion 201, a tongue piece 301*a* protrudes downward in a range of less than ¼ of the circumference around the cap center axis at the lower end of the peripheral wall 301. Such a state as shown in (b) of FIG. 17 is referred to as "peak of tuck-under (2.5)".

In addition, (d) of FIG. 17 shows a state after the tuck under forming in a case in which the tuck under forming roller 5B comes into contact with the lower end of the peripheral wall 301 of the cap 300 at a position lower than the appropriate position. In (d) of FIG. 17, a gap is generated between the lower end of the peripheral wall 301 and the lower portion of the bulging portion 201 over a half circumference to the whole circumference around the cap center axis. Such a state of (d) of FIG. 17 is referred to as "insufficient tuck-under (5.0)".

In the tuck under forming evaluation, within the numerical range of 1.0 to 5.0, a range of 2.5 to 3.5 was determined as being good tuck under forming, and a range of less than 2.5 and more than 3.5 was determined as being poor tuck under forming.

In addition, the "thread length" (mm) was obtained by using the thread length (average value) of the two turns of the thread portion formed on the peripheral wall 301 of the cap of Comparative Example 1 as a reference value (zero), and measuring a length of the circumference of the thread portion with respect to the reference value using a measure (ruler or tape measure).

The results of the capping confirmation test are shown in Table 1.

TABLE 1

| | Number of rollers | Set diameter (mm) | Number of forming times | | Thread depth | Cap opening angle | Tuck under forming | Thread length (with two turns as reference) | Evaluation | Note |
|---|---|---|---|---|---|---|---|---|---|---|
| Comparative Example 1 | Thread forming: 2 Tuck under forming: 2 | Thread forming: 43.5 Tuck under forming: 45.3 | 2 Times | Ave | 0.629 | 190.0 | 2.90 | 0.00 | Good | Small thread portion resistance |
| | | | | Max | 0.640 | 210 | 3.0 | 20.0 | | |
| | | | | Min | 0.606 | 175 | 2.5 | −12.0 | | |
| | | | | σ | 0.0141 | 14.6 | 0.22 | 12.02 | | |
| Comparative Example 2 | Thread forming: 2 Tuck under forming: 2 | Thread forming: 43.5 Tuck under forming: 45.3 | 1 Time | Ave | 0.526 | 363.0 | 2.10 | −5.80 | Poor | Hinging Insufficient tuck under forming |
| | | | | Max | 0.541 | 390 | 2.5 | 0.0 | | |
| | | | | Min | 0.491 | 345 | 2.0 | −12.0 | | |
| | | | | σ | 0.0200 | 16.4 | 0.22 | 4.32 | | |
| Example 1 | Thread forming: 4 Tuck under forming: 2 | Thread forming: 43.5 Tuck under forming: 43.5 | 1 Time | Ave | 0.630 | 227.0 | 3.00 | 17.80 | Good | Particularly good thread depth |
| | | | | Max | 0.638 | 270 | 3.0 | 34.0 | | |
| | | | | Min | 0.620 | 200 | 3.0 | −3.0 | | |
| | | | | σ | 0.0071 | 34.9 | 0.00 | 17.77 | | |
| Example 2 | Thread forming: 3 Tuck under forming: 3 | Thread forming: 43.0 Tuck under forming: 43.0 | 1 Time | Ave | 0.611 | 245.0 | 3.00 | 13.40 | Good | |
| | | | | Max | 0.623 | 255 | 3.0 | 19.0 | | |
| | | | | Min | 0.591 | 225 | 3.0 | 10.0 | | |
| | | | | σ | 0.0125 | 12.7 | 0.00 | 3.36 | | |

As shown in Table 1, in Comparative Example 1 in which the number of forming times via each roller was twice (double action), the evaluation was obtained as being good. It should be noted that term "small thread portion resistance" in the note column of the table indicates that the torque (resealing torque) required to attach the cap 300 to the mouthpiece portion 200 again after opening the cap 300 is small.

In addition, in Comparative Example 2 in which the number of forming times by each roller was once (single action), the evaluation was obtained as being poor. Specifically, the thread depth was too shallow, the cap opening angle was too large, it was determined as being poor tuck under forming, and the thread length was shorter than in Comparative Example 1. It should be noted that the term "hinging" in the note column of the table indicates that there is a bridge that does not break during cap opening, and this bridge acts like a hinge, resulting in the cap 300 remaining connected to the mouthpiece portion 200 (hinging phenomenon).

On the other hand, in Examples 1 and 2, regardless of the fact that the number of forming times by via each roller 5 was once (single action), both evaluations were obtained as being good. Among the Examples, in Example 1 in which four thread forming rollers 5A and two tuck under forming rollers 5B were used, the thread depth was ensured to be deeper than in Comparative Example 1 with double action, and thus particularly good result was obtained.

Specifically, in Example 1, although it is a single-action capping, the "thread depth" was ensured to be greater (deeper) compared to Comparative Example 1 of the double action, the result of the evaluation of "tuck under forming" is more favorable (all were "proper (3.0)"), and the thread length was also ensured to be longer.

<Confirmation of Roller Forming Distal End Load and the Like>

Here, the roller forming distal end load and the like of Example 1 and Comparative Examples 1 and 3 will be described in more detail with reference to Tables 2 and 3. Comparative Example 3 is the same as Comparative Example 1 in all conditions, except that the set diameter of the thread forming roller 5A is set to φ43.5 mm and the set diameter of the tuck under forming roller 5B is set to φ43.5 mm. In addition, "RO" shown in Tables 2 and 3 represents the thread forming roller 5A, and "PP" represents the tuck under forming roller 5B.

In addition, as described in the embodiment described above, the capping head 10 of Example 1 achieves greater compactness in various dimensions compared to the capping heads of Comparative Examples 1 and 3. Specifically, in Example 1, for example, the outer diameter dimension of the body 1, the dimension of each shaft radial direction of the upper arm 32 and the lower arm 33, the diameter dimension of the roller main body 52, the diameter dimension of the support shaft 31, and the like are smaller than those in Comparative Examples 1 and 3. In addition, in Example 1, the spring constant of the biasing member 6 is smaller than that in Comparative Examples 1 and 3.

TABLE 2

| | Number of rollers | Spring constant (Nmm/deg) | Set diameter (mm) | | Setup (N · m) | | Start of cap processing (N · m) | | End of cap processing (N · m) | |
|---|---|---|---|---|---|---|---|---|---|---|
| | | | RO | PP | RO Torque | PP Torque | RO Torque | PP Torque | RO Torque | PP Torque |
| Comparative Example 1 | RO: 2 PP: 2 | 32 | φ43.5 | φ45.3 | 3.6 | 3.0 | 3.414 | 2.754 | 3.376 | 2.683 |
| Comparative Example 3 | RO: 2 PP: 2 | | | φ43.5 | | | 3.414 | 2.814 | 3.376 | 2.744 |
| Example 1 | RO: 4 PP: 2 | 31 | | φ43.5 | 2.4 | 2.0 | 2.149 | 1.743 | 2.093 | 1.644 |

TABLE 3

| | Number of rollers | RO roller contact distance (mm) | | PP roller contact distance (mm) | | RO forming distal end load (N) | | PP forming distal end load (N) | |
|---|---|---|---|---|---|---|---|---|---|
| | | Start | End | Start | End | Start | End | Start | End |
| Comparative Example 1 | RO: 2 PP: 2 | 29.244 | 29.511 | 29.142 | 29.626 | 116.75 | 114.40 | 94.49 | 90.57 |
| Comparative Example 3 | RO: 2 PP: 2 | 29.244 | 29.511 | 29.142 | 29.626 | 116.75 | 114.40 | 96.58 | 92.62 |
| Example 1 | RO: 4 PP: 2 | 25.108 | 25.457 | 24.883 | 25.505 | 85.59 | 82.22 | 70.04 | 64.44 |

Among the items in Table 2, "Setup (N·m)" represents the torque setting values around each support shaft 31 of the thread forming roller 5A and the tuck under forming roller 5B before the cap peripheral wall 301 is subjected to the forming processing (that is, in a state in which each roller 5 is spaced away from the cap peripheral wall 301). Specifically, the torque of each of the rollers 5A and 5B, in a state in which the rolling element 42 of the cam follower 4 comes into contact with the large-diameter rolling surface 72 of the cone cam 7, is represented.

In addition, the term "start of cap processing (N·m)" in Table 2 represents each torque when each of the rollers 5A and 5B in the setup state described above rotates around the axis A of the support shaft 31 and comes into contact with the cap peripheral wall 301 (that is, at the start of processing), in a case in which the diameter (outer diameter) dimension of the cap peripheral wall 301 before forming is set to φ 38 mm.

In addition, the term "end of cap processing (N·m)" in Table 2 represents the torque when the thread depth reaches 0.6 mm (that is, at the end of processing) for the thread forming roller 5A, and represents the torque when the diameter dimension of the lower end of the cap peripheral wall 301 reaches φ35.9 mm (that is, at the end of processing) for the tuck under forming roller 5B.

In addition, the term "RO roller contact distance (mm)" in Table 3 represents a distance (at the start of processing and at the end of processing) between a contact point between the roller main body 52 of the thread forming roller 5A and the cap peripheral wall 301 and a shaft center axis A of the support shaft 31 that supports the thread forming roller 5A, when seen from the axis direction (lower side) of the center axis O, as shown in FIG. 4.

In addition, the term "PP roller contact distance (mm)" in Table 3 represents a distance (at the start of processing and at the end of processing) between a contact point between the roller main body 52 of the tuck under forming roller 5B and the cap peripheral wall 301 and a shaft center axis A of the support shaft 31 that supports the tuck under forming roller 5B, when seen from the axis direction, as shown in FIG. 4.

In addition, the term "RO forming distal end load (N)" in Table 3 represents a load (at the start of processing and at the end of processing) at the contact point (distal end) on the outer peripheral edge of the roller main body 52 of the thread forming roller 5A that comes into contact with the cap peripheral wall 301.

In addition, the term "PP forming distal end load (N)" in Table 3 represents a load (at the start of processing and at the end of processing) at the contact point (distal end) on the outer peripheral edge of the roller main body 52 of the tuck under forming roller 5B that comes into contact with the cap peripheral wall 301.

As shown in Table 2, in Comparative Examples 1 and 3, each RO torque at "start of cap processing" and at "end of cap processing" exceeds 3.0 N·m, whereas in Example 1, each RO torque is 3.0 N·m or less, and specifically, 2.5 N·m or less.

In addition, in Comparative Examples 1 and 3, each PP torque at "start of cap processing" and at "end of cap processing" exceeds 2.5 N·m, whereas in Example 1, each PP torque is 2.5 N·m or less, and specifically, 2.0 N·m or less.

In addition, as shown in Table 3, in Comparative Examples 1 and 3, the "RO forming distal end load" exceeds 110 N, whereas in Example 1, the "RO forming distal end load" is 110 N or less, and specifically, 90 N or less.

In addition, in Comparative Examples 1 and 3, the "PP forming distal end load" exceeds 90 N, whereas in Example 1, the "PP forming distal end load" is 90 N or less, and specifically, 75 N or less.

As described above in <Capping Confirmation Test> and in Table 1, the capping performance of Example 1 is excellent compared to that of Comparative Examples.

INDUSTRIAL APPLICABILITY

With the capping head body, the capping head, the spindle assembly, the capping device, and the capping system according the present invention, the shape of the body can be simplified, the strength of the body can be increased, and weight reduction can be achieved. Therefore, the industrial applicability is achieved.

REFERENCE SIGNS LIST

1: Body
1*c*: Outer peripheral surface (outer peripheral wall)
2: Pressure block
3: Swing shaft
4: Cam follower
5: Forming roller
5A: Thread forming roller
5B: Tuck under forming roller
6: Biasing member
7: Cone cam (cam)
10: Capping head
11: Body main portion
12: Body flange
15: Spindle attachment portion
18: Swing shaft housing portion
23: Through-hole
23*a*: Main body hole portion
23*b*: Flange hole portion
23*c*: Accommodation hole portion
23*d*: Bearing hole portion
24, 25: Bearing member
31: Support shaft
32: Upper arm
32*a*: Upper clamp portion
33: Lower arm
33*a*: Lower clamp portion
36: Deformation assist groove
80: Spindle assembly
81: Elevation shaft
83: Upper cam follower
85: Spindle
86: Spindle gear
90: Elevation cylinder
91: Lower cam follower
100: Capping system
110: Filler
120: Capping device
121: Turret
122: Fixed gear
123: Upper cam
124: Lower cam
200: Mouthpiece portion
300: Cap
301: Peripheral wall
A: Shaft center axis (axis of swing shaft)
B: Threaded can (can)
D: Transport direction
O: Center axis
T: Turret axis

The invention claimed is:

1. A capping head body used for a capping head that attaches a cap to a mouthpiece portion of a can having a bottomed cylindrical shape, the capping head body comprising:

a body main portion having a cylindrical shape;

a spindle attachment portion disposed inside the body main portion and attached to a spindle; and a swing shaft housing portion disposed between an outer peripheral portion and an inner peripheral portion of the body main portion, wherein the swing shaft housing portion is disposed around a periphery of the spindle attachment portion, and has a through-hole into which a swing shaft that swings a forming roller toward a peripheral wall of the cap is inserted, and the through-hole penetrates the body main portion in an up-down direction.

2. A capping head that attaches a cap having a topped cylindrical shape to a mouthpiece portion of a can having a bottomed cylindrical shape, the capping head comprising:

the capping head body according to claim 1;

a forming roller disposed on a lower side of the body; and a swing shaft configured to swing the forming roller toward a peripheral wall of the cap, wherein the body main portion, the spindle attachment portion, and the swing shaft housing portion are connected to each other.

3. The capping head according to claim 2, further comprising:

a cam follower disposed on an upper side of the body and configured to engage with a cam; and a biasing member configured to bias the cam follower and the forming roller toward a radially inner side via the swing shaft, wherein the biasing member surrounds a part of the swing shaft in an up-down direction around an axis of the swing shaft, and is accommodated in the through-hole.

4. The capping head according to claim 3, wherein the biasing member is accommodated in the through-hole without being entirely exposed to an outer peripheral portion of the body main portion.

5. The capping head according to claim 3, wherein a plurality of the through-holes are provided at intervals from each other in the circumferential direction, each of the through-holes has an opening portion that is open to an upper end surface of the body main portion, and a dimension of the opening portion along the circumferential direction is reduced toward the radially inner side.

6. The capping head according to claim 5, wherein the opening portion has a triangular hole shape when seen from above.

7. The capping head according to claim 5, wherein the body has a body recess portion depressed downward from an upper surface of the body and configured to accommodate at least a lower end portion of the cam, and a radially inner end portion of the opening portion is open to an inner peripheral surface of the body recess portion.

8. The capping head according to claim 3, wherein the body has the body main portion, and a body flange having an annular shape fixed to an upper end portion of the body main portion, the through-hole has a main body hole portion configured to penetrate the body main portion in the up-down direction, and a flange hole portion configured to penetrate the body flange in the up-down direction, and the biasing member is disposed in the main body hole portion.

9. The capping head according to claim 8, wherein the main body hole portion has an accommodation hole portion in which the biasing member is disposed, and a bearing hole portion disposed at a lower end portion of the main body hole portion, and the swing shaft is rotatably supported by the body via a pair of bearing members that are provided in the flange hole portion and the bearing hole portion.

10. The capping head according to claim 8, wherein the biasing member is a torsion coil spring extending spirally around an axis of the swing shaft, and the biasing member has both end portions in the up-down direction with an upper end portion being locked to the body flange and a lower end portion being locked to the swing shaft.

11. The capping head according to claim 2, wherein at least a part of the body is made of any one of an aluminum alloy, an engineering plastic, or an FRP.

12. The capping head according to claim 2, further comprising:

a pressure block disposed on the lower side of the body and configured to press a top wall of the cap.

13. The capping head according to claim 2, wherein six or more forming rollers are provided and arranged in the circumferential direction, a plurality of the forming rollers include a plurality of thread forming rollers configured to form a thread portion to be threaded with the mouthpiece portion on a peripheral wall of the cap, and at least one tuck under forming roller configured to tuck under forming a lower end of the peripheral wall of the cap onto the mouthpiece portion, and the number of the thread forming rollers is larger than the number of the tuck under forming rollers.

14. The capping head according to claim 13, wherein positions of the thread forming rollers adjacent to each other in the circumferential direction are displaced from each other in the up-down direction.

15. The capping head according to claim 3, wherein a plurality of the forming rollers are provided and arranged in the circumferential direction, a plurality of the biasing members are provided in the same number as the number of the forming rollers and are arranged in the circumferential direction, and a plurality of the through-holes are provided in the same number as the number of the biasing members and are arranged in the circumferential direction.

16. The capping head according to claim 3, wherein the swing shaft has a support shaft extending in the up-down direction, an upper arm configured to connect the support shaft and the cam follower, and a lower arm configured to connect the support shaft and the forming roller, the upper arm has an upper clamp portion configured to surround the support shaft around its axis and being deformable to press an outer peripheral surface of the support shaft, the lower arm has a lower clamp portion configured to surround the support shaft around its axis and being deformable to press the outer peripheral surface of the support shaft, and at least one of the upper clamp portion or the lower clamp portion has a deformation assist groove disposed on a clamp portion peripheral surface and extending in the up-down direction.

17. A spindle assembly comprising:

the capping head according to claim 2;

an elevation shaft extending in the up-down direction and to which a pressure block configured to press a top wall of the cap is attached;

a spindle having a cylindrical shape, into which the elevation shaft is inserted, and to which the body is attached; and an elevation cylinder having a cylindrical shape and into which the elevation shaft and the spindle are inserted, wherein the elevation shaft has an upper cam follower configured to move the elevation shaft in the up-down direction, the spindle has a spindle gear configured to rotate the spindle around a center axis, and the elevation cylinder has a cam having a cylindrical shape, and a lower cam follower configured to move the elevation cylinder in the up-down direction.

18. A capping device comprising:

a turret configured to rotate around a turret axis;

the spindle assembly according to claim 17 disposed on an outer peripheral portion of the turret;

a fixed gear configured to mesh with the spindle gear and extending around the turret axis;

an upper cam extending around the turret axis and with which the upper cam follower engages; and a lower cam extending around the turret axis and with which the lower cam follower engages.

19. A capping system comprising:

a filler configured to fill a can with a content; and the capping device according to claim 18 to which the can discharged from the filler is supplied, wherein a transport direction of the can discharged from the filler and directed toward the capping device extends along a tangent of the outer peripheral portion of the turret when seen in a turret axis direction.

* * * * *